(12) United States Patent
Dorogusker et al.

(10) Patent No.: US 12,069,328 B2
(45) Date of Patent: Aug. 20, 2024

(54) AUDIENCE AND ARTIST ENGAGEMENT INTERFACES

(71) Applicant: Block, Inc., Oakland, CA (US)

(72) Inventors: Jesse Dorogusker, Palo Alto, CA (US); Pål Berg, Hyggen (NO); Agustina Sacerdote, Mill Valley, CA (US); Tait Svenson, Lafayette, CA (US); Kirupa Pushparaj, Palo Alto, CA (US); Anders Herning, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/953,974

(22) Filed: Sep. 27, 2022

(65) Prior Publication Data
US 2023/0024373 A1 Jan. 26, 2023

Related U.S. Application Data

(63) Continuation of application No. 17/725,474, filed on Apr. 20, 2022.
(Continued)

(51) Int. Cl.
*H04N 21/2743* (2011.01)
*G06F 3/16* (2006.01)
(Continued)

(52) U.S. Cl.
CPC ......... *H04N 21/2743* (2013.01); *G06F 3/165* (2013.01); *G06Q 20/123* (2013.01);
(Continued)

(58) Field of Classification Search
CPC .......... H04N 21/47815; H04N 21/251; H04N 21/2668
See application file for complete search history.

(56) References Cited

U.S. PATENT DOCUMENTS 6,699,127 B1   3/2004   Lobb
6,921,336 B1   7/2005   Best
(Continued)

FOREIGN PATENT DOCUMENTS

WO   2022226122 A1   10/2022

OTHER PUBLICATIONS

International Search Report and Written Opinion for International Application No. PCT/US2022/025642, mailed Jun. 30, 2022.
(Continued)

*Primary Examiner* — Caroline H Jahnige
(74) *Attorney, Agent, or Firm* — IP Spring

(57) ABSTRACT

The present technology pertains to artist and audience engagement interfaces and differentiated experiences determining a first segment of user accounts, determining a second segment of user accounts, providing media content to the first segment of user accounts and the second segment of user accounts, monitoring engagement of a user account included in the first segment of user accounts with the media content, based on the engagement of the user account transferring the user account from the first segment of user accounts to the second segment of user accounts and providing additional engagement options to the user account, receiving a communication from the user account included in the second segment of user accounts over a communication channel with the artist, and surfacing the received communication to the first segment of user accounts and the second segment of user accounts.

17 Claims, 34 Drawing Sheets

Related U.S. Application Data

(60) Provisional application No. 63/177,323, filed on Apr. 20, 2021.

(51) Int. Cl.

| | | |
|---|---|---|
| *G06Q 20/12* | (2012.01) | |
| *G06Q 30/0283* | (2023.01) | |
| *G06Q 30/0601* | (2023.01) | |
| *G06Q 50/00* | (2024.01) | |
| *H04L 51/52* | (2022.01) | |
| *H04L 65/612* | (2022.01) | |
| *H04N 21/2187* | (2011.01) | |
| *H04N 21/236* | (2011.01) | |
| *H04N 21/2385* | (2011.01) | |
| *H04N 21/239* | (2011.01) | |
| *H04N 21/478* | (2011.01) | |
| *H04N 21/61* | (2011.01) | |

(52) U.S. Cl.
CPC ..... *G06Q 30/0283* (2013.01); *G06Q 30/0641* (2013.01); *G06Q 50/01* (2013.01); *H04L 51/52* (2022.05); *H04L 65/612* (2022.05); *H04N 21/2187* (2013.01); *H04N 21/23614* (2013.01); *H04N 21/2385* (2013.01); *H04N 21/2393* (2013.01); *H04N 21/47815* (2013.01); *H04N 21/6125* (2013.01); *G06Q 2220/00* (2013.01)

(56) References Cited

U.S. PATENT DOCUMENTS

| | | | |
|---|---|---|---|
| 8,595,232 B1 | 11/2013 | Azarm et al. | |
| 8,632,409 B2 | 1/2014 | Wolfson et al. | |
| 9,727,912 B1 | 8/2017 | Poursartip et al. | |
| 9,786,005 B1 | 10/2017 | Poursartip et al. | |
| 9,805,338 B1 | 10/2017 | Ghosn et al. | |
| 9,892,458 B1 | 2/2018 | Shearer et al. | |
| 10,230,996 B1 | 3/2019 | Abreu et al. | |
| 11,176,607 B1 | 11/2021 | Bekmann et al. | |
| 11,317,153 B2 | 4/2022 | Webb et al. | |
| 11,321,786 B1* | 5/2022 | Zamer | G06Q 50/01 |
| 11,385,858 B2 | 7/2022 | Kallai et al. | |
| 11,645,035 B2 | 5/2023 | Vercellotti et al. | |
| 2002/0038221 A1* | 3/2002 | Tiwary | G06Q 30/02 705/1.1 |
| 2003/0229900 A1 | 12/2003 | Reisman | |
| 2006/0026293 A1 | 2/2006 | Virdi et al. | |
| 2007/0094585 A1 | 4/2007 | Ando et al. | |
| 2007/0136679 A1 | 6/2007 | Yang | |
| 2007/0200871 A1 | 8/2007 | Lee | |
| 2009/0063983 A1 | 3/2009 | Amidon et al. | |
| 2009/0083665 A1 | 3/2009 | Anttila et al. | |
| 2009/0165000 A1 | 6/2009 | Gyorfi et al. | |
| 2010/0049588 A1 | 2/2010 | Debow | |
| 2010/0081116 A1 | 4/2010 | Barasch et al. | |
| 2010/0169977 A1 | 7/2010 | Dasher et al. | |
| 2010/0251031 A1 | 9/2010 | Nieh et al. | |
| 2010/0260487 A1 | 10/2010 | Zbeda | |
| 2010/0318204 A1 | 12/2010 | Daisy | |
| 2011/0019167 A1 | 1/2011 | Pines et al. | |
| 2011/0107220 A1 | 5/2011 | Perlman | |
| 2011/0134034 A1 | 6/2011 | Daniel | |
| 2011/0191674 A1 | 8/2011 | Rawley et al. | |
| 2011/0221692 A1 | 9/2011 | Seydoux et al. | |
| 2013/0103592 A1 | 4/2013 | Shenk et al. | |
| 2014/0180826 A1 | 6/2014 | Boal | |
| 2015/0026035 A1 | 1/2015 | Showalter | |
| 2015/0222977 A1 | 8/2015 | Angel | |
| 2015/0302625 A1 | 10/2015 | Greco et al. | |
| 2016/0275186 A1 | 9/2016 | Wansley et al. | |
| 2016/0358161 A1 | 12/2016 | Cobban et al. | |
| 2016/0379621 A1 | 12/2016 | Marti et al. | |
| 2017/0238039 A1 | 8/2017 | Sabattini | |
| 2017/0289589 A1 | 10/2017 | Koumchatzky et al. | |
| 2018/0040064 A1 | 2/2018 | Grigg et al. | |
| 2018/0192108 A1 | 7/2018 | Lyons et al. | |
| 2018/0211342 A1* | 7/2018 | Hoareau | H04L 65/60 |
| 2018/0329992 A1* | 11/2018 | Shapira | H04L 67/10 |
| 2019/0172155 A1 | 6/2019 | Byron et al. | |
| 2019/0394507 A1 | 12/2019 | Hardee et al. | |
| 2020/0005284 A1 | 1/2020 | Vijayan | |
| 2020/0134585 A1 | 4/2020 | Xu et al. | |
| 2020/0135163 A1 | 4/2020 | Lovitt et al. | |
| 2020/0186576 A1* | 6/2020 | Gopal | H04L 65/403 |
| 2020/0329333 A1 | 10/2020 | Norris et al. | |
| 2021/0030308 A1 | 2/2021 | Grace et al. | |
| 2021/0060404 A1 | 3/2021 | Wanke et al. | |
| 2021/0099762 A1 | 4/2021 | Bernstein et al. | |
| 2021/0141589 A1 | 5/2021 | Taylor et al. | |
| 2021/0201339 A1 | 7/2021 | Ahlgren et al. | |
| 2021/0279030 A1 | 9/2021 | Morsy et al. | |
| 2021/0357892 A1* | 11/2021 | Srivastava | G06Q 20/1235 |
| 2021/0360348 A1 | 11/2021 | Luyten et al. | |
| 2022/0070524 A1 | 3/2022 | Yer et al. | |
| 2022/0182722 A1 | 6/2022 | Bolivar et al. | |
| 2022/0246135 A1 | 8/2022 | Kinoshita et al. | |
| 2022/0327225 A1 | 10/2022 | Lyren | |
| 2022/0337439 A1 | 10/2022 | Mccoy et al. | |
| 2022/0337898 A1 | 10/2022 | Dorogusker et al. | |
| 2022/0337969 A1 | 10/2022 | Seefeldt et al. | |
| 2022/0374503 A1 | 11/2022 | Goldston et al. | |
| 2022/0417579 A1 | 12/2022 | Dorogusker et al. | |
| 2023/0037770 A1 | 2/2023 | Dorogusker et al. | |
| 2023/0040545 A1 | 2/2023 | Dorogusker et al. | |

OTHER PUBLICATIONS

Report Information from Dialog, dated Jul. 3, 2021 (Year: 2021), 30 pages.

\* cited by examiner

AUDIENCE AND ARTIST ENGAGEMENT INTERFACES

CROSS-REFERENCE TO RELATED APPLICATIONS

This application is a continuation and claims the benefit of U.S. application Ser. No. 17/725,474, filed on Apr. 20, 2022, and claims priority to U.S. provisional application No. 63/177,323, filed on Apr. 20, 2021, the contents of both are expressly incorporated by reference herein in its entirety.

TECHNICAL FIELD

Media content providers offer copyright-compliant content from large catalogs. Interaction with media that users consume through such services is typically limited to creating, editing, storing and playing media.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1A:
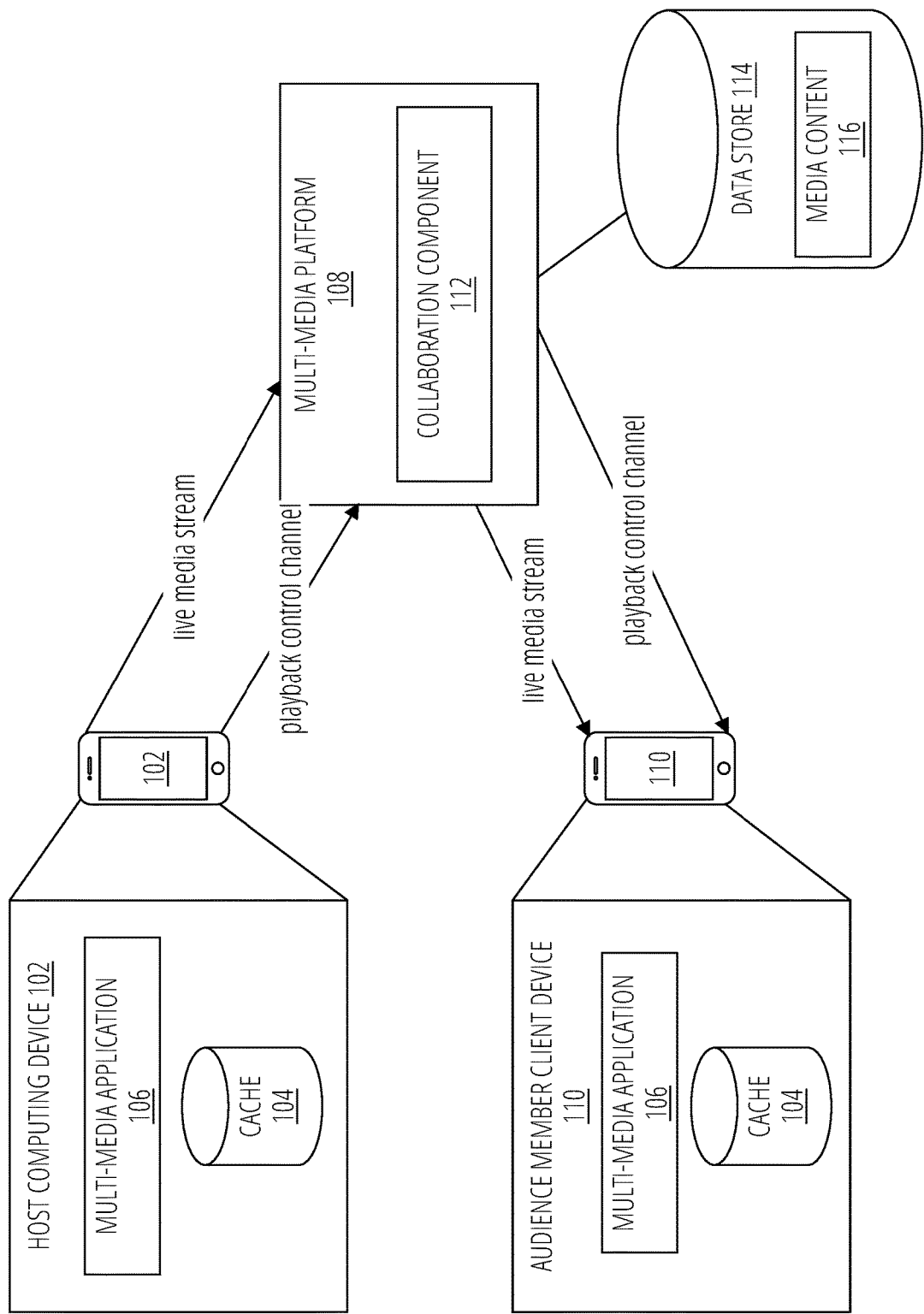
FIG. 1A and FIG. 1B illustrate an example environment associated with a multi-media platform in accordance with some aspects of the present technology.

Disclosed herein are multi-media platforms that support modification of data streams, such as music, in near real-time collaborative media experiences, lending, machine-learning driven social engagement, and distributed ledger-driven licensing and media content management models. In some embodiments, the present technology pertains to a multi-media platform configured to provide a playback experience whereby a host operating a client device, such as the client device executing the multi-media platform, can host a live playback stream. A live playback stream can include the playing of recorded digital media content in a playlist to a group of client devices in a simultaneous manner. Additionally, a live playback stream can also include live media, provided by the client device of the host. The live media can include video streams, live performances of music, dance, theater, etc. In some implementations, the live media can include commentary, e.g., textual, audio and/or visual information pre-recorded or recorded in near real-time. In this fashion, a host is able to modify a playback stream in near real-time with their live media.

The present technology exists in a context of a multi-media platform where media content is stored in a central data center and is available to access, e.g., play, stream or download to client devices, streaming on connected devices such as a particular speaker, etc. In this context, the present technology provides mechanisms to intelligently multiplex recorded media content from a first source with the live media from a second source, and playback in near real time.

In some embodiments, the recorded media content, e.g., stored in the central data store, is configured to be downloaded onto an audience member client device such that recorded media content can be played back locally on the audience member client device. Meanwhile, the live media is recorded by the client device of the host for transmission to the audience member client device. In some embodiments, the present technology utilizes an alternative infrastructure, such as a server to playback the recorded media content, and multiplex the live media received from the client device of the host with the recorded media content, whereby the pre-multiplexed live playback stream is sent to the audience member client device without storing the recorded media content locally on the audience member client device.

When the multiplexing takes place at the audience member client devices, the present technology provides for higher quality media content playback than if the media content were multiplexing were to have taken place at the client device of the host. The present technology can send media content to the audience member client device prior to playback to be cached, allowing for transmission of higher quality media content. When the multiplexing occurs at the audience member client device, there is potential that the audience member client device can actually receive higher quality media content than experienced by the host. This occurs because every client device could receive the highest quality media content that their subscription provides. Second, the present technology makes more efficient use of network bandwidth. In the instance where media content that is part of the live playback stream has previously been downloaded and cached by one or more connecting client devices, greater efficiency is achieved as there is no need to re-transmit the media content. Since many people tend to repeatedly engage in media programming that matches their tastes, it is likely that some media content will repeatedly be encountered. Therefore, it is likely that some media content that is part of the live playback stream has already been downloaded and cached by audience member client devices.

When the multiplexing takes place at the multi-media platform, the present technology still provides higher quality media than multiplexing everything at the client device of the host. When multiplexing happens at the multi-media platform, the quality of media content is limited by the network bandwidth between the multi-media platform and the audience member client device. But when multiplexing happens on the client device of the host, the quality of media content is limited by the subscription of the host, and bandwidth between the client device of the host and the multi-media platform, and the bandwidth between the multi-media platform and the audience member client device. At each hop, quality can only degrade. Additionally, the connection between the client device of the host and the multi-media platform needs to download and upload media content so it might be the most bandwidth-constrained link. The present technology also provides more efficient use of network bandwidth than multiplexing everything at the client device of the host. If the recorded media content and the live media were multiplexed at the client device of the host then the recorded media content would need to be downloaded to the client device of the host from the multi-media platform before playback. Thereafter, the multiplexed live playback stream including the recorded media would need to be transmitted back to the multi-media platform to be distributed to the connecting client devices.

The present technology also synchronizes the recorded media content with the live media, e.g., during playback, so that the two sources can be multiplexed at a location other than the client device of the host that controls the live playback stream. In one implementation, this is achieved by inserting the live media at predefined time stamps of the recorded media content. The predefined time stamps may be host-defined or system-generated generated based on data analysis of past behavior. In some cases, the host may be notified with prompts to provide content that can be inserted in those specific time stamps of the recorded media content.

Techniques described herein provide for sharing media experiences within the multi-media platform. In some embodiments, the present technology disclosed herein includes an infrastructure for users to collaborate on experiences (such as digital concerts, opining on a podcast in near-real-time, sharing music playlists with friends and family, and so on). Such experiences can also include specific e-commerce triggers, e.g., where an artist offers a specific listener custom merchandise or concert tickets. Accordingly, while streaming music, the listener can engage in an e-commerce transaction with the artist. The live media in this case can be customized for each of the listeners, where one listener receives an option to buy tickets to one concert, while another listener receives an option to buy merchandise (e.g., via a payment link on the music platform or other associated payment platform).

As used herein a user can any entity utilizing the present technology, such as engaging with the multi-media platform discussed herein. In the context of the present technology, a user can take on one or more roles. For example, a user can operate with the multi-media platform in a role of a host, artist, or audience member. However, any one particular user can be a host in one context and an audience member in another context. An artist can take on multiple roles at once. For example, an artist can also take the role of a host simultaneously.

In some embodiments, hosts can apply "mix rules" to apply to transitions between live media content and recorded media content, and achieve some of the engagement described above. In other embodiments, hosts can apply "mix rules" between live media content or recorded media content, such as two songs in a playlist. Audience members can also apply "mix rules" or "filters" to annotate the media (e.g., apply voiceovers, narratives, etc., in real-time or near real-time as the media is being streamed). Mix rules can define or control one or more aspects of the playback of the songs to which they are applied, including, but not limited to, sound effects, tempo, pitch, volume, and fade-in and fade-out times. Mix rules can also assign specific interactive features to portions of the media such that engagement with the interactive features triggers actions. For example, a mix rule can be assigned to media that allows an artist to be paid or tipped, or a fan to receive specific merchandise as described above. Mix rules can be predefined by the user, system generated, or even generated in collaboration with one or more users.

In some embodiments, machine-learning techniques can be used to analyze the media content being accessed at any given moment, gauge the reaction (e.g., explicit or implicit) of the audience and modify the playlist or audio based on real-time or near real-time audience feedback. In some implementations, as described herein, the modification of the playlist includes annotation with live media, mixing with other media content, and so on.

Techniques described herein provide systems and methods for creating lending offers within the context of a media streaming service. In some embodiments, the present technology described herein analyzes data related to the consumption of media content (e.g., commentary, live media, recorded media content, engagement with the live media, streaming count, streaming artists, engagement with advertising content, and the like) to provide lending offers, such as cash advance, to the artists. In some examples, the present technology disclosed herein generates metrics that predict the success of media, artists, etc., based on which the lending offer may change.

Techniques described herein provide for applying distributed ledger technology and non-fungible tokens (NFT) to media licensing, media assignments, and media residuals. In some embodiments, the present technology disclosed herein maintains the digital rights associated with media and tracks digital rights associated with the media content as the rights move from one user to another. In some embodiments, the present technology provides advantages of lowering the friction in transactions involving media and providing a more efficient marketplace for media content. Previously, transactions involving rights to public uses of media content were infrequent and generally negotiated by sophisticated parties. However, increases in computing power and the multi-media platform have made it so a wider group of users can create new media content that are either derivative works of other media content (song remixes), or that utilize a sample of a media content to create an entirely new work (using an audio sample in a new song, using a video clip in a social media post, creating a meme from a digital image, etc.). The implementations described herein allow for speedy transactions that acquire the necessary rights to use existing media content or portions of media content to create new ones. Further, as the volume of such transactions increases, the present technology provides an infrastructure that can support an efficient marketplace (in market economics terms). In such an environment, the present technology can also provide various machine learning tools to help suggest values for these media content and samples of media content. As the value of media content can be dependent on social trends, machine learning tools can help artists to receive fair compensation for their media content in a dynamic marketplace.

In some embodiments, techniques described herein can utilize machine-trained models to determine data associated with audience members. For example, the machine-trained models can determine mixing rules that dictate multiplexing of the recorded media content with live media. In some examples, a virtual assistant or other bot can use machine-trained models to automate communications between specific users associated with the service provider described herein, for example between an artist and an audience member engaging in an e-commerce transaction. In some examples, the machine-trained models can be utilized by a computing component to generate recommendations that can be used to streamline communications as described herein. As an example, a communication can be received and analyzed using a machine-trained model as described herein. In some examples, the communication can first be parsed using natural language processing, image processing, or the like. In some embodiments, after the communication is parsed, an expression (e.g., temporal expression, geographical/location expression, a commercial expression, etc.) can be identified in the communication and the expression can be used to determine a response to the communication.

In some embodiments, techniques described herein can utilize stored and/or determined permissions and/or rules to route communications to users such as certain artists, audience members, hosts, and/or devices. Based on the rules, certain users can access media content or distribute such media content. Further, based on the rules, certain users may be able to control the live playback streams. In some cases, a user may be able to assign access conditionally or provisionally to another user, e.g., for a predefined item. In this manner, the recorded media content stays the same, but the live media content is switched between two users or multiple users.

Techniques described herein support optimized switching between communication channels and/or services/platforms based on context. In some embodiments, the contextual analysis can be through model interpretation of temporal terms. This is to say that in the use case of live playback streams, the multiplexing may switch between various client devices or users based on context. For example, if a playlist includes a variety of songs from a variety of artists, in some implementations, the control of live media may switch from artist A to artist B based on the song that is currently playing.

From a user's perspective, messages from different services/platforms can also be consolidated on one interface and, in some examples, can be accessed via a software developer kit (SDK) platform and/or application programming interface (API). Disparate services/platforms (e.g., first-party or third-party) can utilize SDKs or APIs to exchange communications via techniques described herein. Further, techniques described herein allow authorization triggers to be set such that certain communications are automatically routed to certain users based on the context of the communications. For example, if a user requests a coupon, a computing device can send an authorization request to a manager (e.g., via a chat interface, a push notification, an email, a text message, etc.), and can transition control back to the original user after the coupon request is granted. Thus, in some examples, for each communication, there can be a customized tree of interaction that dictates the flow of information between the two users (and all user entities). This tree can vary based on each interaction and each customer-user relationship. Such a tree can be stored as a rule.

Techniques described herein offer various improvements over existing communication technologies. For instance, techniques described herein are directed to a consolidated communication user interface, wherein communications sent and/or received via different communication channels and/or service provider platforms can be accessed via a single access point. In some embodiments, such a consolidated communication user interface provides an improved user experience and reduces interactions with a user computing device.

With existing techniques, users receive communications from different platforms and different communication channels. Such communications can be difficult to manage as they can be stored in different locations corresponding to the various platforms and/or communication channels. As described herein, a consolidated communication user interface allows communications to be converted into a "standardized format" for presentation via a dashboard, or other user interface, of a user computing device. A communication incoming from a communication channel and/or platform can be converted by a network-based communication management component from its existing format into a standardized format for storage and/or presentation via a user interface (e.g., a consolidated communication user interface). Such a converted communication can be stored in the standardized format in a network-based storage device (e.g., a data store) and can be presented via the consolidated communication user interface.

Moreover, in some embodiments, techniques described herein can utilize the centralized nature of a network-based service provider and its ability to provide multiple services for users associated therewith. The centralized nature of the network-based service provider enables the service provider to access data across multiple platforms associated with the multiple services and to determine context based at least in part on that information.

Further, techniques described herein are directed to using machine learning and/or artificial intelligence to intelligently determine which communication channels and/or platforms to route communications between artists and subscribers. In some examples, such machine learning and/or artificial intelligence can be used to analyze content of an incoming communication (e.g., using natural language processing, image processing, and/or the like) and to intelligently generate a response to the incoming communication. In some embodiments, models can be trained using machine learning and/or artificial intelligence using communications and/or other communications transmitted via the service provider. That is, in some examples, communications sent and/or received can be used as training data to train a model that can be used for determining context of future incoming communications. In some examples, such a response can be automatically sent (e.g., without requiring additional input from a user) and/or a response can be associated with a recommendation for responding to the incoming communication. In some examples, the machine learning and/or artificial intelligence can be used to facilitate a payment transaction, such as tipping an artist. The use of such machine learning and/or artificial intelligence can provide an improved user experience and can reduce interactions with a user computing device. That is, such intelligence can reduce user interaction with a computing device by automating and/or semi-automating parts of communications. Additionally, in some examples, machine-learning and/or artificial intelligence, as described herein, provide improvements to virtual assistants (e.g., bots) such that virtual assistants can understand requests/queries and respond to said requests/queries with more accuracy.

In some embodiments, techniques described herein can provide improvements to existing systems with respect to media quality, bandwidth utilization, access control, security, and/or computing efficiency. As described herein, techniques can use rules, which can be stored on and/or determined by a network-based computing system to control access to certain communications and/or operations (e.g., sending communications), which can provide security and efficiency to systems as described herein. Techniques described herein can utilize a technology-based solution of filtering communications using stored and/or determined permission(s) and/or rule(s) to overcome problems in existing systems. Various embodiments will now be described in further detail with the help of one or more figures.

The processes herein are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

Figure 1B:
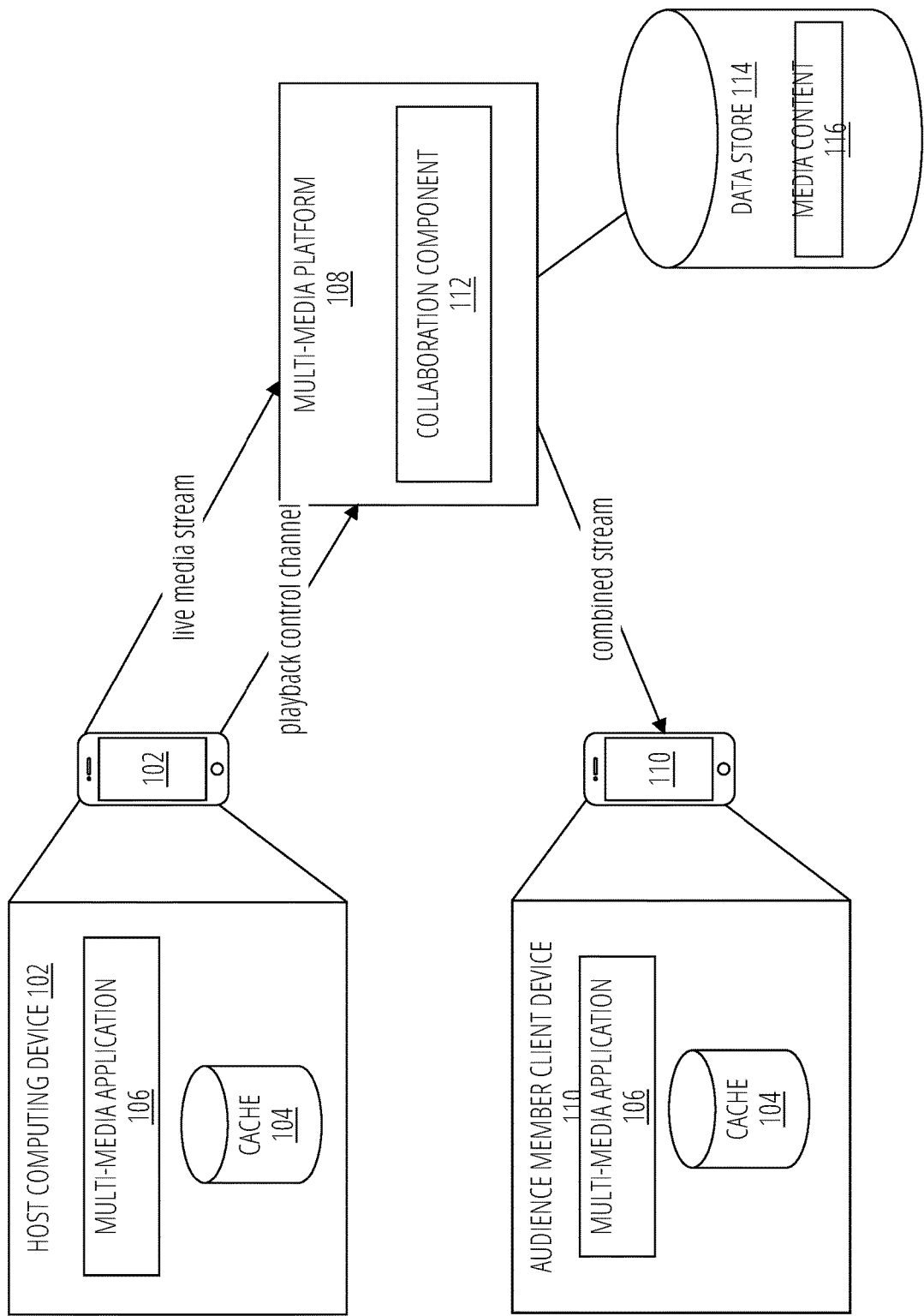

Turning now to the figures, FIG. 1A and FIG. 1B illustrate an example system for or facilitating a live playback stream by a multi-media platform. A live playback stream can include the playing of recorded digital media content in a playlist to a group of client devices in a simultaneous manner. Additionally, a live playback stream can also include live media, provided by the client device of the host. The live media can include video streams, live performances of music, dance, theater, etc. In some implementations, the live media can include commentary, e.g., textual, audio and/or visual information pre-recorded or recorded in near real-time. In this fashion, a host is able to modify a playback stream in near real-time with their live media.

In some embodiments, a host can operate a computing device, such as a host computing device 102, to utilize services offered by the multi-media platform 108. The host computing device 102 can be configured to communicate with the multi-media platform 108 over one or more networks. In some examples, the host computing device 102 can have one or more applications stored thereon that can specially configure the host computing device 102 to communicate with the multi-media platform 108. For example, host computing device 102 can have a multi-media application 106 running thereon. In some examples, multi-media application 106 can be provided by the multi-media platform 108 (e.g., to access one or more services associated therewith) to access media content. In some examples, the multi-media application 106 can be web browser based application or a standalone application downloaded from the Internet or an App store. In yet another example, the multi-media application 106 can be an instant application having a subset of functionalities of the full multi-media application where the subset is determined based on context. In one example, the subset can include streaming content and payment functionality. In another example, the subset can include streaming content and lending functionality.

The host computing device 102 can be operated by a user having a user account with the multi-media platform 108. In some embodiments, the user account can be associated with artists having artist accounts, media labels, publishers, or other users subscribed to a streaming media service provided by the multi-media platform 108.

In some embodiments, the host computing device 102 can be used to host a live playback stream wherein a host can control public playback of media content for an audience. The audience can be one or more users connected (audience member) to the live playback stream through multi-media application 106 operating on an audience member client device 110.

Any user account can be a host user account or audience member user account or artist account depending on their context. When a user account is hosting a live playback stream, the user account is a host user account. When the user is connected to live playback stream, they are an audience member. Even artist accounts can be an audience member or host user account. None of the user roles (e.g., host, audience member, or verified artist) are mutually exclusive. Any user of the multi-media platform 108 can take on one or more of these user roles according to the context in which the user is engaging with the multi-media platform 108. Likewise, while different devices (e.g., host computing device 102 and audience member client device 110) are separately illustrated, the devices are not necessarily distinct. They can all run the same version of the multi-media application 106, and all include the same functionality when their respective user controls them to engage in such functionality. Accordingly, a device that is a host computing device 102 in one context can be an audience member client device 110 in another context.

Both the host computing device 102 and audience member client device 110 also include a cache 104. The cache 104 is a temporary memory used by a computing device for fast access to data. In some embodiments, the cache 104 can be used to temporarily store media content that have been downloaded or streamed from the multi-media platform 108. In some instances, the media content can have been previously downloaded or streamed from a previous playback of the media content. In some instances, portions of the media content might be downloaded by the multi-media application 106 in anticipation of playback. For example, when media content are in a playlist or scheduled for playback as part of a live playback stream, the multi-media application 106 can download several media content (or portions thereof) in advance to ensure responsive playback in the event that a user skips to a subsequent media content abruptly. Once media content (or portions thereof) have been stored in the cache 104, they can remain there until available storage space in the cache 104 has been consumed, at which point, the oldest data in the cache 104 will be overwritten. The cache 104 can also be used to store other data that the multi-media application 106 might desire quick access to in addition to media content.

While not shown, the host computing device 102 and audience member client device 110 can also include one or more persistent storage devices such a non-volatile memory, such as that used to store the multi-media application 106. This persistent storage provides for more persistent storage of data and applications. In some embodiments, media content that has been favorited or downloaded through explicit action by a user can be stored in persistent storage. When media content are persistently stored, the multi-media application 106 can also look to the persistent storage in the same way as it utilizes the cache to find local copies of media content and portions thereof. As used herein, references to checking the cache for local copies or media content includes checking the persistent storage as well.

In some embodiments, multi-media platform 108 is a Software as a Service (SaaS) platform hosted on the Internet. The host computing device 102 and the audience member client devices 110 can connect to the multi-media platform 108 over the Internet.

The multi-media platform 108 is configured to support services related to media content. In some embodiments, the multi-media platform 108 can provide access to a collection of media content 116 stored in the data store 114, whereby the host computing device 102 and the audience member client devices 110 can download or stream media content 116 for playback. In some embodiments, the media content can be recorded media content. In some embodiments, the multi-media platform 108 can allow sharing and/or editing of media (e.g., mixing, and/or remixing music) within the context of a media streaming service. In some embodiments the the media content 116 can also include recordings of live media stream and live playback streams as addressed in more detail below. While the term "streaming service" is used herein, the provision of media content by the multi-media platform 108 need not conform to any particular data transfer technique or protocol unless otherwise stated. For example, media content 116 can be requested by host computing device 102 or multi-media application 106 in advance and cached prior to playback of the media content. Media content can be songs, videos, vlogs, podcasts, interviews, mixes of songs such as remixes, covers, playlists, etc. The multi-media platform 108 can also provide other services as described herein. The media content 116 can also be stored along with various metadata pertaining to the media content. In some examples, the metadata can include, artist name, title, album name, track number, playback length, associated artwork, rating information, analytical and descriptive data describing at least one of a tempo, genre, or mood of the media content, user information, and artist information, etc.

The data store 114 can be configured to store data that is accessible, manageable, and updatable. In some examples, the data store 114 can be integrated with the multi-media platform 108. In other examples, the data store 114 can be located remotely from the multi-media platform 108 and can be accessible to the multi-media platform 108. The data store 114 can comprise multiple databases and/or servers connected locally and/or remotely via a network. One example of data stored by the data store 114 is a collection of media content 116, e.g., recorded media and in some instances, live media.

The media content 116 is stored in a least a highest quality version of a recorded media content to which the multi-media platform 108 has access. In some embodiments, the multi-media platform 108 can downsample the media content to a lower quality when required by network bandwidth requirements or a quality of service defined by the terms of a user account. In some embodiments, the media content 116 are stored in a variety of quality levels to provide quicker transmission of the media content 116 to client devices.

In particular, one service provided by the multi-media platform 108 is to facilitate live playback streams. In a live playback stream a host user account can control public playback of media content for the benefit of audience members. The public playback can include designating what media content to be played back by the audience member client device 110, how and whether the media content are mixed and what transitions to apply be media content or portions of media content, etc. In some embodiments, the media content for the live playback stream can be preconfigured using a playback queue.

In some embodiments, the live playback stream also includes a live performance component as well. The live performance can include commentary, just as a DJ might provide on a radio broadcast, but the live performance is not limited to such. The live performance could be a video performance capturing any live audio or visual component.

The multi-media platform 108 can facilitate the live playback stream through a collaboration component 112. The collaboration component 112 can facilitate the live playback stream by advertising the live playback stream to client devices so that they can learn about and connect to the live playback stream and can connect the audience member client devices 110 to a particular live playback stream.

A live playback stream can include multiple data streams. A host computing device 102 can transmit a playback control channel and a live media stream to the collaboration component 112 at the multi-media platform 108.

The playback control channel is a data channel used to transmit information including an identification of recorded media content to be played back during the live playback stream, playback controls, instructions regarding various effects to be applied to the recorded media content during playback, and multiplexing information to be used to multiplex the live media stream with the playback of the recorded media content. The data regarding playback controls of the playback control channel includes playback synchronization information for the playback of the recorded media content such as play, skip, and pause commands. The instructions also provide various effects to be applied to the recorded media content during playback including data describing custom mixing or transitions to apply to the recorded media content. The multiplexing information maps the audio captured by the microphone to a time-domain associated with a currently playing recorded media content.

The live media stream can include audio or audio-video media of a live performance. The data encoding the live commentary in the live media stream is audio captured by a microphone, camera, or other device of the host computing device 102. The live media stream can be a recording of any live performance.

The live media stream can include encoded markers as reference points along with the live performance recording. The playback control channel can reference the encoded markers to indicate where that portion of the live performance corresponds to the playback of the recorded media content.

Users who are connected to a live playback stream provided by host computing device 102 can listen to and experience the media content in a manner that is the same as or similar to the host. For example, the audience members can experience the playback of the same media content as is being played back on the host computing device 102 and follow along as the host controls the media content playback.

As illustrated in FIG. 1A, the host computing device 102 can transmit the live media stream and the playback control channel to the collaboration component 112 which can relay the live media stream and the playback control channel to the audience member client devices 110. The audience member client devices 110 can then playback the media content as instructed by the playback control channel and play the live media stream at the same time as instructed by the encoded markers in the playback control channel. In this way, the audience member client devices 110 are responsible for combining the media content that are played back with the live media stream.

As noted above, the present technology provides for higher quality media content playback than if the media content were streamed to the audience member client device 110. The present technology can send media content to the audience member client device prior to playback to be cached, allowing for transmission of higher quality media content. Second, the present technology makes more efficient use of network bandwidth. It is likely that one or more media content that are part of the live playback stream have previously been downloaded and cached by one or more audience member client devices 110. When this occurs, there is no need to re-transmit the media content. Since many people tend to repeatedly engage in media programming that matches their tastes, it is likely that some media content will repeatedly be encountered. Therefore it is likely that some media content that are part of the live playback stream have already been downloaded and cached by audience member client devices.

As illustrated in FIG. 1B, it is also possible that the multi-media platform 108 can be responsible for playing back the media content as defined by the playback control channel and play the live media stream at the same time as instructed by the encoded markers in the playback control channel and multiplexing the sources of media. The collaboration component 112 can then stream a combined stream to the audience member client devices 110 for playback for the benefit of the audience member.

When the multi-media platform 108 is responsible for the multiplexing of the sources as illustrated in FIG. 1B, the present technology still provides higher quality media than multiplexing everything at the host computing device 102. When multiplexing happens at the multi-media platform, the quality of media content is limited by the network bandwidth between the multi-media platform and the audience member client device. But when multiplexing happens on the client device of the host, the quality of media content is limited by the subscription of the host, and bandwidth between the client device of the host and the multi-media platform, and the bandwidth between the multi-media platform and the audience member client device. At each hop, quality can only degrade. Additionally, the connection between the client device of the host and the multi-media platform needs to download and upload media content so it might be the most bandwidth-constrained link. The present technology also provides more efficient use of network bandwidth than multiplexing everything at the client device of the host. If the recorded media content and the live media were multiplexed at the client device of the host then the recorded media content would need to be downloaded to the client device of the host from the multi-media platform before playback. Thereafter, the multiplexed live playback stream including the recorded media would need to be transmitted back to the multi-media platform to be distributed to the audience member client devices.

In some embodiments, the present technology also supports multiple host computing devices 102 co-hosting a live playback stream. In such embodiments, the host computing device 102 both provide their own live media stream. In some embodiments, the live media streams of the multiple host computing devices 102 are joined by a conferencing service, such as an audio or video conferencing service, and are joined into a single live media stream that is sent to the multi-media platform 108. In some embodiments, an additional host can be temporary, such as a short appearance by a guest host. The possibility of multiple host computing devices 102 is supported in the embodiments illustrated in both FIG. 1A and FIG. 1B.

In some embodiments, users can apply "mix rules" to be applied during a transition between two songs in a playlist. The mix rules can be defined and included as part of the playback control channel. Users can also apply "mix rules" or "filters" to annotate the media (e.g., apply voiceovers, narratives, etc., in real-time or near real-time as the media is being streamed). Mix rules can define or control one or more aspects of the playback of the songs to which they are applied, including, for example, tempo, pitch, sound effects, volume, and fade-in and fade-out times. Mix rules can also assign specific interactive features to portions of the media such that engagement with the interactive features triggers actions. For example, a mix rule can be assigned to media that allows an artist to be paid or tipped. Mix rules can be predefined by the user, system generated, or even generated in collaboration with one or more users.

In some implementations, mix rules can be based on the user's biometrics, mood, voice, or emotional state analysis. Mix rules can also be "crowdsourced." Crowdsourcing mix rules refers to deriving mix rules based on mix information generated by users of the multi-media platform 108. Mix rules and mix information are the same type of information (e.g., parameters and values of parameters for modifying and/or manipulating playback of content items). As used herein, "mix information" is used to refer to user-generated mix rules (e.g., parameters and values specifying the user-generated mix rules) that are received or accessed by the media streaming service, and from which "mix rules" can be crowdsourced.

In some embodiments, machine-learning techniques or other data analysis techniques can be used to analyze the media being played back as part of a live playback stream and gauge the reaction (e.g., explicit or implicit) of the audience. Insights gained from the data analysis techniques can be surfaced on the host computing device 102 and used by the host user account to modify the queue of media content for playback or the live performance based on these insights.

Figure 2:
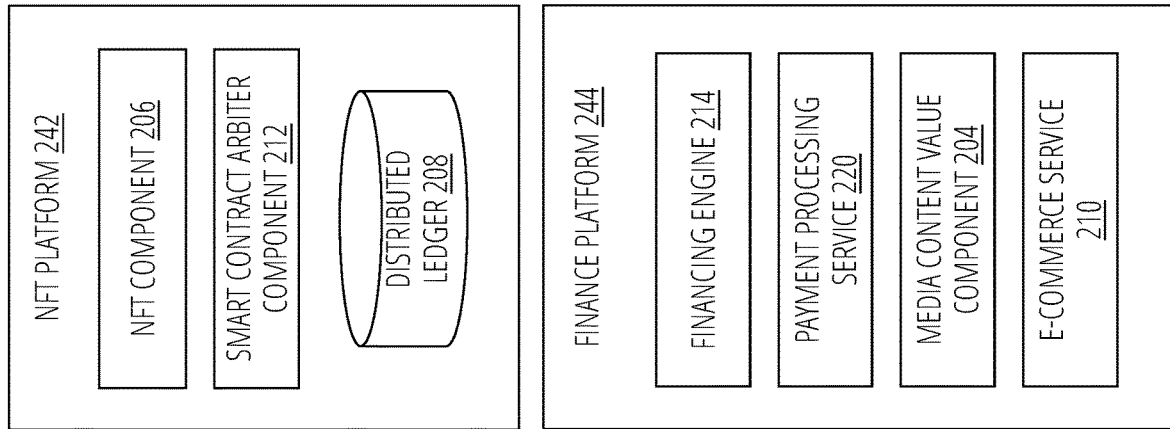
FIG. 2 illustrates an example system of functional components in accordance with some aspects of the present technology.
Figure 2:
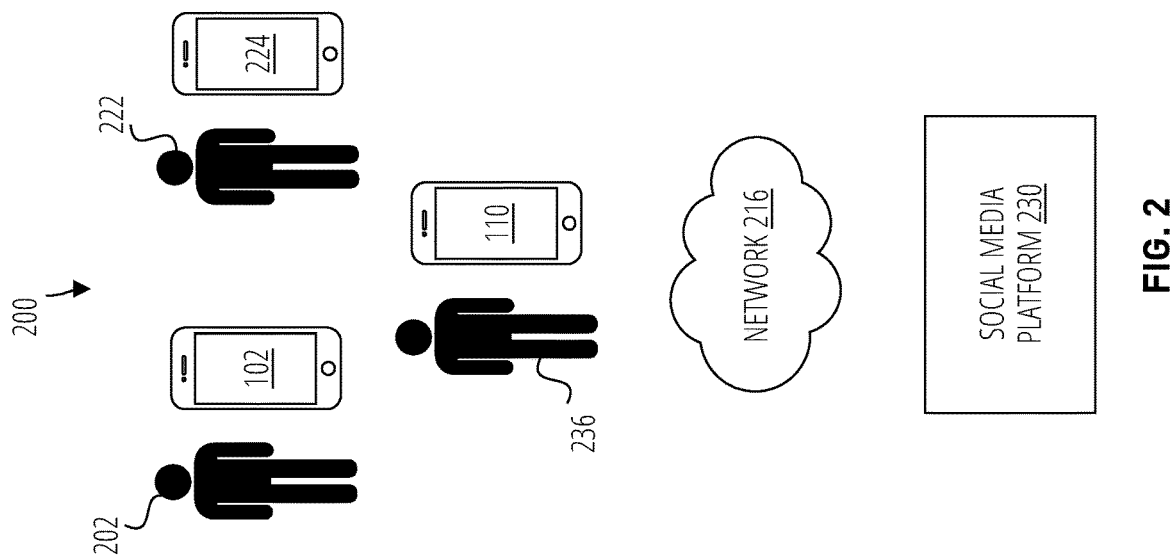
Figure 2:
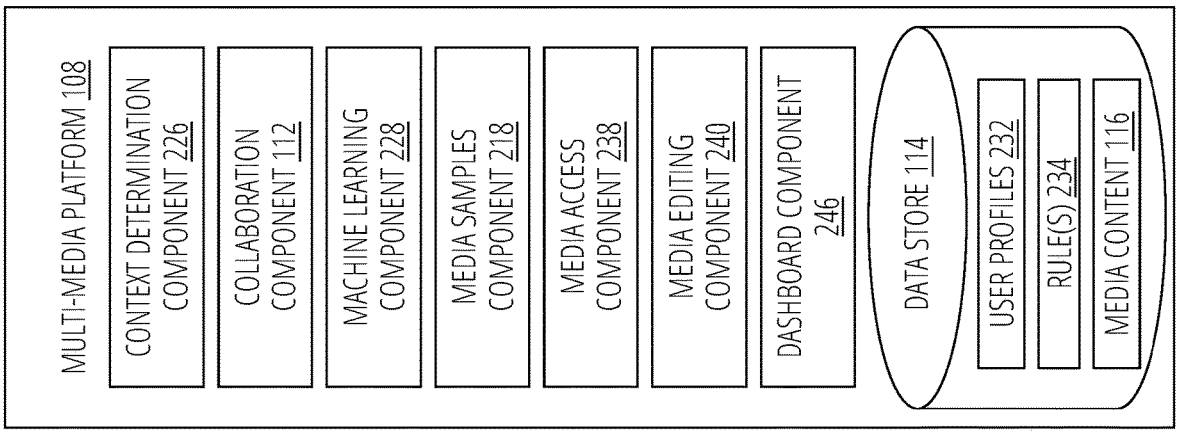

FIG. 2 illustrates an example environment for performing techniques described herein, according to an embodiment of the present subject matter.

In some embodiments, the environment 200 can include a multi-media platform 108, an NFT platform 242, a finance platform 244, and a social media platform 230 and user devices (host computing device 102, audience member client device 110, and artist computing device 224). While FIG. 2 illustrates these several platforms, it will be appreciated by those of skill in the art that one or more of these platforms might not be needed to perform some functions supported by the environment illustrated in FIG. 2. Furthermore, while FIG. 2 illustrates a logical arrangement of various components, e.g., components 202 to 244, that can perform various respective functions, that the present the present technology is not limited to the arrangement illustrated. For example, one or more services depicted as being part of the finance platform 244 could be part of the multi-media platform 108. It will also be appreciated by those of ordinary skill in the art that one or more other platforms or components can exist.

As used herein, a platform can comprise computing components (e.g., software and a surrounding ecosystem of resources) associated with service(s) provided by the service provider, e.g. multi-media platform 108. The multi-media platform 108 is an entity that is a digital service provider (DSP) hosting media content (e.g., songs, videos, vlogs, podcasts, interviews, mixes of songs such as remixes, covers, playlists, etc. shown in 130) or otherwise making available such media content. In addition, the digital service provider may support payments functionality to allow users of the DSP to pay/rent/use the media content, and also allow DSP to pay third parties (such as right holders of the media content) for the media content. The multi-media platform 108 may store and track use of media content (e.g., in terms of streaming count, revenue collected, artist content, engagement statistics). In some examples, the multi-media platform 108 can configure a dashboard using the dashboard component 246 to display statistics related to engagement with media content and its usage to users and/or artists. Such a dashboard can be configurable to the artist or user accessing it. In some examples, the artist can target merchandise relevant to the user, e.g., by converting data from dashboard to a marketplace hosted by the multi-media platform 108 or a third party in a frictionless manner. The multi-media platform 108 may allow the artist to receive payments instantly for the use of media content. For example, the artist can be paid directly, before making payments to publishers or labels. In one implementation, the multi-media platform 108 may configure the platform to allow artists to receive tips directly from the user interface of the multi-media application 106, e.g., directly from streams or marketplace sales. In some examples, the multi-media platform 108 may use data analytics and machine learning to predictively or pre-emptively determine what type of situations are likely to generate tips and present tipping options accordingly or have analytics driven tip suggestions (how much to tip, where to place the tipping button, etc), and even customize sender/recipient tipping profiles (e.g., identifiers or usernames for P2P platforms, financial service providers such as account information to encourage tipping behavior). In one example, the server can determine who the intended recipient of the tip should be on a payment transaction such that the right artist (out of all the artists associated with the song—vocalists, musicians etc.) are getting those tips. The recipients can be highlighted using identifiers (e.g., monetary indicator prefixing alphanumeric user name) on social network platforms ("hey send artist $5 for our performance tonight") and/or on the multi-media application 106 based on the context of engagement or usage of media content on the music service.

While the environment 200 also illustrates one example of each of the multi-media platform 108, the NFT platform 242, the finance platform 244, the social media platform 230 the host computing device 102, the audience member client device 110, and the artist computing device 224, it will be appreciated that there can be any number of such platforms and devices. In the case of the platforms and services, each of these represents any number of instances of such platforms and services. Likewise, there can be any number devices in any category of user devices (host computing device 102, audience member client device 110, and artist computing device 224).

In some embodiments, the multi-media platform 108, the NFT platform 242, the finance platform 244, and the social media platform 230 can all be provided by the same service provider or parent entity. In some embodiments, one or more of the multi-media platform 108, the NFT platform 242, the finance platform 244, and the social media platform 230 can be provided by one or more third-party entities, and the components within the various platforms can interact to take advantage of services provided by other components shown in FIG. 2 by calling application programming interfaces (APIs) offered by the components.

The multi-media platform 108 can provide one or more services surrounding the streaming, playback, management, sharing, editing (e.g., mixing and/or remixing media, adding annotations to media), or social engagement around media content, etc. In some embodiments, the 108 can include a media access component 238 that is configured to provide functionality around the accessing, e.g., browsing, broadcasting, streaming, and playback, of media content such as those media content 116 stored at data store 114. While the term streaming is used herein, the provision of media content by the multi-media platform 108 need not conform to any particular data transfer technique or protocol unless otherwise stated. Furthermore, the multi-media platform 108 includes a streaming user facing service or an artist facing service or a third party (such as a label or publisher) facing service, or a combination thereof.

In some implementations, media content can be requested by host computing device 102 or artist computing device 224 in advance and cached prior to playback of the media content. In some embodiments, the streaming and playback of media content can be a social experience that can be facilitated by collaboration component 112, which supports social or collaborative media content experiences, such as social playback, live playback streams, or collaborative media editing. In some embodiments, the collaboration component 112 allows snippets or previews of the media to be shared with users. In some embodiments, the collaboration component 112 can also generate data based on collaboration from users (artists, hosts, audience members, labels etc.) to adjust the shared experience. The collaboration component 112 may leverage machine learning for its social recommendations, as well as collaborative playlists, large-scale group chat, and behavior-based music programming, and implement algorithms to help with discovery of like artists, listeners, or media and to then inform the shared experience. The collaboration data includes engagement with a current playlist, activities before the current shared experience and even after (e.g., where did a user of an audience member client device navigate after playing the shared playlist or live playback stream).

The multi-media platform 108 can also include a media editing component 240 configured to provide user interfaces and functionality surrounding functions to allow users of the multi-media platform 108 to edit media content to make their own versions or remixes of media content. In some embodiments, one way to edit media content is to extract a sample of media content for incorporation into another media content. A media samples component 218 can be configured to provide functionality to assist in the creation and management of media content samples. In some embodiments, media samples component 218 can be configured to access a library of existing samples. In some embodiments, media samples component 218 can be configured to automatically suggest samples from selected media content.

In some embodiments, users can apply "mix rules" to be applied during a transition between two songs in a playlist. Users can also apply "mix rules" or "filters" to annotate the media (e.g., apply voiceovers, narratives, etc., in real-time or near real-time as the media is being streamed). Mix rules can define or control one or more aspects of the playback of the songs to which they are applied, including, for example, tempo, pitch, sound effects, volume, and fade-in and fade-out times. Mix rules can also assign specific interactive features to portions of the media such that engagement with the interactive features triggers actions. For example, a mix rule can be assigned to media that allows an artist to be paid or tipped. Mix rules can be predefined by the user, system generated, or even generated in collaboration with one or more users. In some implementations, mix rules can be based on the user's biometrics, mood, voice, or emotional state analysis. Mix rules can also be "crowdsourced." Crowdsourcing mix rules refers to deriving mix rules based on mix information generated by users of the multi-media platform 108. Mix rules and mix information are the same type of information (e.g., parameters and values of parameters for modifying and/or manipulating playback of content items). As used herein, "mix information" is used to refer to user-generated mix rules (e.g., parameters and values specifying the user-generated mix rules) that are received or accessed by the media streaming service, and from which "mix rules" can be crowdsourced.

The context determination component 226 can determine context data associated with communications occurring in collaborative experiences on multi-media platform 108 or communications occurring on social media platform 230 surrounding media content. In some embodiments, the context determination component 226 can determine one or more of a date associated with a communication, a time associated with the communication, a topic associated with the communication, content of the communication, a user preference of a user associated with the communication, a customer preference of a customer associated with the communication, a communication channel via which the communication was received, a service/platform via which the communication was received, etc. In some embodiments, the context determination component 226 can determine a date based at least in part on a timestamp associated with the communication and/or a time based at least in part on a timestamp associated with the communication.

In some embodiments, the context determination component 226 can determine a user preference (e.g., shopping habits or listening behavior) based at least in part on using a user identifier associated with the communication to access a user profile of the user profiles 232. In some embodiments, the content context determination component 226 can determine a user preference based at least in part on determining that a user is similar to other users associated with the service provider (e.g., using a similarity algorithm or the like) of which one or more preferences are known. In some embodiments, the context determination component 226 can determine a customer preference based at least in part on using a customer identifier associated with the communication to access a customer profile of the user profiles 232. In some embodiments, the context determination component 226 can determine a customer preference based at least in part on determining that a customer is similar to another one or more customers associated with the service provider (e.g., using a similarity algorithm or the like) of which one or more preferences are known.

In some examples, the context determination component 226 can determine a topic and/or content of the communication based at least in part on analyzing data associated with a communication (including historical communications and communications received by other similar users and/or creating a priority tree based on the history of such communications) and information related to the parties (e.g., users and/or customers) involved in the communication. Communications can be received in the form of questions (e.g., "when does this album release?"), requests to add/change playlists, questions regarding concert details, etc. In some examples, the context determination component 226 can utilize natural language processing, image processing, and/or other machine-trained models to determine content of the communication. In some examples, the context determination component 226 can utilize a classifier or other model to determine semantic meaning of the communication and can determine a topic of the communication based at least in part on such a determination. In some examples, a communication can be translated into a particular language for processing and, any responses can be translated back to the original language associated with the incoming communication.

In some examples, the context determination component 226 can determine that a communication is associated with a temporal expression. In some embodiments, the context determination component 226 can utilize a machine-trained model (e.g., a classifier, etc.) to detect a temporal expression in the contents of a communication. In some examples, rule-based approaches or probabilistic semantic parsing can be used to detect a temporal expression in a communication. In some embodiments, the context determination component 226 can partition a communication based on identified temporal expressions and can model the communication with an expression representative of the communication. In some embodiments, a multi-stage pipeline can be used to label and parse communications. In some examples, labels can be determined by artificial neural networks, such as transformers, using an information extraction head. In some examples, parsing can be performed using a rule-based context free grammar (CFG) parser. In some examples, semantic role labeling and parsing, such as (text) span labeling or dependency labeling, can be used to discover the context in a sentence. In some embodiments, techniques described herein can identify labelled spans by fine-tuning the artificial neural networks with an information extraction head, and parse spans using a rule-based CFG parser. In some embodiments, temporal expressions can be associated with labels indicating inclusionary or exclusionary preferences. The context determination component 226 can utilize heuristic pragmatics to determine which preferences to update or keep. In some examples, a previously presented candidate time can be used as a reference time, and date and time preferences can be updated independently. In some embodiments, the context determination component 226 can compose one or more temporal expressions associated with a communication into an aggregated expression, which can be combined with grammar and backed with logical formalism, to compose a long, complex temporal expression, and which can be used for determining a response and/or otherwise negotiating time. Such context determination (e.g., of temporal expressions) can be used to negotiate time, as described herein, which can be useful for scheduling or rescheduling appointments, reservations, and/or the like.

Machine learning techniques as described herein can be applied to additional or alternative implementations beyond the negotiation of time for scheduling or rescheduling events, appointments, reservations, and/or the like. For instance, in some examples, the context determination component 226 can determine that a communication is associated with a geographical and/or location-based expression (e.g., the communication is location-related). As an additional or alternative example, in some examples, the context determination component 226 can determine that a communication is associated with a commercial expression (e.g., the communication is transaction-related). As described above with reference to temporal expressions, in some examples, rule-based approaches or probabilistic semantic parsing can be used to detect such expressions in a communication. In some embodiments, the context determination component 226 can partition a communication based on identified commercial expressions and model the communication with an expression representative of the communication. As described above, in some embodiments, a multi-stage pipeline can be used to label and parse communications. In some examples, labels can be determined by artificial neural networks, such as transformers, using an information extraction head. In some examples, parsing can be performed using a rule-based CFG parser. In some examples, semantic role labeling and parsing, such as (text) span labeling or dependency labeling, can be used to discover the context of a sentence. In some embodiments, techniques described herein can identify labeled spans by fine-tuning the artificial neural networks with an information extraction head and parse spans using a rule-based CFG parser.

The machine learning component 228 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. Machine-trained models described above can be generated and/or trained by the machine learning component 228 and stored for use at run time.

In some embodiments, the machine learning component 228 can utilize stored communication data associated with communications or other communications received and/or sent by the multi-media platform 108 as training data for training, using machine learning, a model for determining temporal expressions in communications. Such temporal expressions can be used for determining recommendations with respect to responses to communications. In some embodiments, the machine learning component 228 can receive new training data based at least in part on recommendations previously output by the machine-trained models and can modify weights or other aspects of the machine-trained models to improve the accuracy thereof. That is, in some embodiments, communication data associated with communications received and/or sent by the multi-media platform 108, recommendations generated based thereon, new product or service integrations, etc. can be associated with new training data that, when analyzed by the machine learning component 228, cause improvements to features associated with the machine-trained models. As such, techniques described herein enable such machine-trained models to improve over time.

In some embodiments, the context determination component 226 can utilize a machine-trained model (e.g., a classifier, a neural network, etc.) to determine which communication channel(s) and/or platform(s) to route communications and apply mix rules. Techniques described herein provide systems and methods for modifying media (e.g., mixing, and/or remixing music) within the context of a multi-media platform 108.

In some examples, the multi-media platform 108 includes an artist portal displayed via a dashboard component 246. The dashboard component 246 can configure a dashboard to display statistics related to engagement with media content and its usage by users and/or artists. Such a dashboard can be configurable to an artist user account or other user. In some examples, the artist can target merchandise relevant to the user, e.g., by converting data from the dashboard to an e-commerce service 210. The multi-media platform 108 may allow the artist to receive payments instantly for the use of media content through integration with payment processing service 220. For example, the artist can be paid directly before paying publishers or labels. In some embodiments, the multi-media platform 108 may allow artists to receive tips directly from the user interface of a multi-media application operating on client devices, e.g., directly from streams or marketplace sales.

In some embodiments, the multi-media platform 108 can generate the consolidated communication user interface and can send instructions for presenting the consolidated communication user interface via the host computing device 102 or artist computing device 224. In some embodiments, the multi-media platform 108 can aggregate communications and/or other contextual data (e.g., appointments, receipts, feedback received, orders, fulfillment actions, payments, etc.) based at least in part on such communications and/or other contextual data being associated with the same token or identifier. That is, communications and/or other contextual data associated with the same token or identifier can be consolidated into a conversation. Representations of conversations can be presented via the dashboard component 246.

In some examples, recommendations related to communication channels and/or platforms for routing communications can be surfaced via the consolidated communication user interface. In some examples, the multi-media platform 108 can utilize such a recommendation to perform an operation without input from the host 202 (e.g., automatically). For instance, the multi-media platform 108 can send a response via the second communication channel and/or second platform without receiving an instruction to do so from the host 202.

In some embodiments, the multi-media platform 108 can generate personalized analytics for users (e.g., here are the top 10 genres and 30 songs played most this entire year; or here is what users in San Francisco loved as their top 10 songs this year, etc.). The multi-media platform 108 exposes APIs/SDKs to report out out what the San Francisco audience listens to as music during dinner time or give you the real-time report of the top 10 songs your city is listening to right now; or even offer interactive games. The multi-media platform 108 also supports "skins" or user interface themes for user interface so users can customize how their app looks and other visual features that can be adjusted, audio-adjustment tools (e.g., adjust frequencies, bass, treble, etc.) users can add on to adjust how their music is played, etc.

In some embodiments, the multi-media platform 108 can be associated with one or more data store 114, which can store data including, but not limited to, user profiles 232, rule(s) 234, and media content 116.

The data store 114 can be configured to store data that is accessible, manageable, and updatable. While, in FIG. 2, the data store 114 is shown as part of the multi-media platform 108, this may just be a logical association. The data store 114 can be located in any data center and can be accessible to the multi-media platform 108. The data store 114 can comprise multiple databases and/or servers connected via the network 216.

The network 216 can be one or more networks including a local area network, or wide area network, and can be a public network or a private network. The network 216 can utilize any type of communication technology including wired or wireless communications, tunnels, VPNs, etc. The network may be an ad hoc network that is instantiated between two or more devices as needed or can be an infrastructure network that is persistently available to devices. The network 216 can connect any of the devices and platforms illustrated in FIG. 2. For example, the network 216 can connect host computing device 102, audience member client device 110, and artist computing device 224 together in a peer-to-peer network or can connect these devices through a service or platform such as multi-media platform 108 or social media platform 230.

The network 216 can also connect various components within a platform, such as multi-media platform 108 with other services provided by the platform. For example, the media access component 238 can be connected to data store 114 via network 216, and the media samples component 218 can be connected to media content value component 204 via network 216, etc.

In some embodiments, the data store 114 can store user profiles 232. The user profiles can store information pertaining to user accounts of the multi-media platform 108. In some embodiments, some user accounts can pertain to artists whose media content are accessible through the multi-media platform 108. In some embodiments, artist user accounts can be associated with additional privileges as compared to general user accounts. In such instances, the artist user accounts can be verified that the artist account is associated with one or more media content accessible through the multi-media platform 108.

The user profiles 232 can store preference information and conclusions drawn by context determination component 226 as addressed above.

The user profiles 232 can also store permissions associated with the user account. The permissions can indicate which users are permitted to send and/or receive communications. In some examples, such permissions can be particular to an individual user, a user, a title or role associated with a user (e.g., digital rights associated with a title of artist, label, publisher, or the like). In some examples, permissions can be particular to device codes (e.g., codes provisioned to users to grant temporary access to a functionality). The permissions can provide security and/or access control to individual communications. That is, in some examples, the permissions can enable the multi-media platform 108 to selectively present communications to certain users while restricting access of other users to certain communications. In some examples, the multi-media platform 108 can utilize the permissions to restrict how users are able to interact and/or respond to communications, and/or access media. In some embodiments, permissions can be set via a settings user interface.

User profiles can store, or otherwise be associated with, data associated with users through their user accounts (host user account, artist account, audience member user account). For instance, a user profile can store, or otherwise be associated with, information about a user (e.g., name of the user, geographic location of the user, operating hours of the user, streaming statistics, user preferences (e.g., learned or user-specified), identifier(s) of the user (which can be associated with different communication channels and/or platforms), etc.), a user category classification (subscriber level, artist level, etc., hardware (e.g., device type) used by the user, transaction data associated with the user (e.g., transactions conducted by the user, payment data associated with the transactions, items associated with the transactions, descriptions of items associated with the transactions, itemized and/or total spends of each of the transactions, parties to the transactions, dates, times, and/or locations associated with the transactions, etc.), loan information associated with the user (e.g., previous loans made to the user, previous defaults on said loans, etc.), risk information associated with the user (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, messaging data, etc. A user profile can securely store bank account information as provided by the user. In some examples, a user profile can include user preferences with respect to which communication channel(s) and/or platform(s) they prefer to use for communication, which identifier(s) associated with communication channel(s) they prefer to use for communication, etc. In some examples, historical communication data associated with a user (e.g., communications sent, communications received, responses, response time, etc.) can be associated with a user profile.

User profiles 232 can store user data including, but not limited to, user information (e.g., name, phone number, address, banking information, identifier(s) (e.g., associated with different communication channels and/or platforms), etc.), user preferences (e.g., learned or customer-specified), purchase history data (e.g., identifying one or more items purchased (and respective content information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, messaging data, etc. In some examples, a user profile can include user preferences with respect to which communication channel(s) and/or platform(s) they prefer to use for communication, which identifier(s) associated with communication channel(s) they prefer to use for communication, etc. In some examples, historical communication data associated with a user (e.g., communications sent, communications received, responses, response time, etc.) can be associated with a user profile.

The platforms multi-media platform 108, social media platform 230, NFT platform 242, and finance platform 244 in the environment illustrated in FIG. 2 exist to provide one or more services to users of these platforms. Most often the users of the platforms will have a user account with one or more of these services. The users illustrated in FIG. 2 will be addressed in the context of multi-media platform 108 wherein most often the users will have a user account with multi-media platform 108. However, it should be appreciated that the multi-media platform 108 can support some embodiments wherein a user might not have an account with the multi-media platform 108.

As illustrated in FIG. 2, users can have one or several roles in the context of the multi-media platform 108. Users take a role of an audience member 236, a host 202, and/or an artist 222. None of the user roles (e.g., host 202, audience member 236, or artist 222) are mutually exclusive. Any user of the multi-media platform 108 can take on one or more of these user roles according to the context in which the user is engaging with the multi-media platform 108. In this way the role is dynamic and in one implementation, can even change within the context of a single communication between a host and audience member.

FIG. 2 also shows the users being associated with respective client devices. The host 202 is associated with a host computing device 102, the artist 222 is associated with an artist computing device 224, and the audience member 236 is associated with an audience member client device 110. While different devices (e.g., host computing device 102, artist computing device 224, and audience member client device 110) are separately illustrated, the devices are not necessarily distinct. They can all run the same version of a multi-media application that is associated with the multi-media platform 108 (or any other application provided by any of the other platforms), and all include the same functionality when their respective user controls the devices to engage in such functionality. Accordingly, a device that is a host computing device 102 in one context can be an artist computing device 224 or audience member client device 110 in another context.

The multi-media application can be used to send and/or receive communications. Such communications can include text communications, email communications, social media communications, first-party application communications (e.g., communications exchanged via an application associated with the multi-media platform 108), third party application communications (e.g., communications exchanged via an application associated with a party other than the multi-media platform 108 and accessible through one or more dedicated API connection points), payments, requests to change playlists or performance, etc.

The host computing device 102, audience member client device 110, and the artist computing devices 224 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc.

Most often users will interact with the multi-media platform 108 in the context of an audience member 236. An audience member 236 is a user that is consuming services of multi-media platform 108 to receive media content for playback or their own editing of media content.

In some embodiments, a user account can host a collaborative media experience or a public playback experience. In a collaborative media experience, a host can engage with one or more other specific user accounts through collaboration component 112 to jointly control playback or editing of media content. In a public playback experience or more user accounts acting as a host 202 can host a playback experience that user accounts acting as audience members can join to experience the playback led by the host 202.

Hosts 202 can leverage machine learning for social recommendations, as well as collaborative playlists, large-scale group chat, and behavior-based music programming, and implement algorithms to help find people who are listening to the same media as host 202. In some implementations, the media may have digital rights that restrict the playback of media on third-party platforms where the playlist was shared. In some embodiments, the collaboration component 112 allows digital rights to be conditionally/provisionally shared with other users, even if they are not subscribers of multi-media platform 108. In another example, collaboration component 112 allows digital rights or identity verification can be obtained via friction-less onboarding of the users onto the multi-media platform 108, for example, via third-party platform credentials, or phone number, linked payment information and the like.

The collaboration component 112 allows the users to experience the same playback of a media content as that of the host 202 through live playback streams. In some cases, the multi-media platform 108 may attribute playbacks of a media content included in a live playback stream hosted by host 202 as being attributed to the user account of host 202 to maintain an accurate accounting of playbacks of the media content. For example, if 10 audience members are listening to a media content instance included in the live playback stream hosted by host 202, the media service may count 11 playbacks of the media content and attribute it to originating from host 202.

In the context of sharing, the collaboration component 112 allows streaming users, such host 202, artist 222, to share the media content they are currently experiencing (listening to or watching) with other users (e.g., audience member 236). Users who are connected to the channel or following host 202 or users with whom host 202 shares the playlist (e.g., on the same media content supported by multi-media platform 108) can experience the playlist in a manner same as or similar to the host 202. For example, the audience member 236 can listen to the same song the host 202 is listening to and synced at the exact moment of song/cadence or structure of the song, or follow along as the host 202 skips or interacts with the song. In this manner, the media content is effectively synced with all instances where the media content is playing, or alternatively the media content is synched with respect to one user such that any other audience member 236 joining in the playlist is synced to the moment user host 202 is experiencing. This kind of collaborative streaming may leverage machine learning for its social recommendations, as well as collaborative playlists, large-scale group chat, and behavior-based music programming, and implement algorithms to help you find people who are listening to the same media that the user host 202 is. In some implementations, the media may have digital rights that restrict the playback of media on third-party platforms where the playlist was shared. In one example, the collaboration component 119 allows digital rights to be conditionally/provisionally shared with other users, even if they are not subscribers of multi-media platform 108. In another example, collaboration component 112 allows digital rights or identity verification can be obtained via frictionless onboarding of the users onto the multi-media platform 108, for example, via third-party platform credentials, or phone number, linked payment information and the like. In one example, the collaboration component 112 allows snippets or previews of the media to be shared with audience member 236. In yet another example, the collaboration component 112 allows the audience member 236 to be synced to the same instance of the song that the host 202 is listening to, thus allowing digital rights to be managed only once, i.e., with respect to the usage of host 202. In some cases, the media service may attribute audience member 236 of host 202 listening to the song and streaming count as host 202's thus if 10 connected users are listening to the song instance of host 202, the media service may count it as 11 counts of streaming and attribute it to originating from the host computing device 102.

The collaboration data includes engagement with the current playlist, activities before the current shared experience and even after (e.g., where did they go after playing the playlist). For example, based on real-time or near-real time engagement to the experience, audience member 236 or if the sharing user is host 202, modify the playlist. The data can also reflect segmentation of data, demographics, location, etc., to better customize the playlist. Such data can also be used to train machine learning models, to allow users, such as artists, to get tipped and paid in real time, get feedback in real time or near real time on media or portions of media or playlists, generate customized fan experiences based on the collaboration data. In some aspects the feedback can be multi-way to allow the customer audience member 236 to send a communication to a host 202 or artist 222 via computing devices and receive response. In at least one example, the audience member client device 110 can send a communication to the host computing device 102 or the artist computing device 224 via the multi-media platform 108 or social media platform 230. In some examples, the audience member client device 110 can send a communication to the host computing device 102 or the artist computing device 224 directly. In at least one example, the communication can be associated with a user identifier identifying the user and a customer identifier identifying the customer. In some examples, the customer identifier can be a device identifier or the like. In some examples, the customer identifier can be particular to the type of communication channel through which the communication is transmitted (e.g., a customer identifier can be a phone number if the communication channel is a text communication, an email address if the communication channel is an email, etc.). In at least one example, the communication can be sent via a first communication channel, which can comprise a text communication, an email communication, a communication sent via a first-party application, a communication sent via a third-party application, a social media communication, and/or the like. "Communications," as used herein, can refer to any object, which can be associated with textual elements, graphical elements, image elements, video elements, sound elements, and/or the like, that can be transmitted via a communication channel. In some examples, communications can be associated with attachments, coupons, and/or embedded functionality (e.g., deeplinks, hyperlinks, payment links, etc.). While not described in detail, in at least one example, the audience member client device 110 or host computing device 102 can initiate a conversation via a phone call. In some examples, the audience member client device 110 or the host computing device 102 can initiate the conversation via a first platform associated with a first service, such as a feedback service, a payment service, a fan experience service (offer a limited edition merchandise, provide a preview to an unreleased song/or the like) etc., as described above.

In some embodiments, a host 202 can operate a computing device, such as a host computing device 102, to utilize services offered by the multi-media platform 108. While a single host 202 is illustrated, any number of users can be present in the environment.

In some embodiments, one or more artists 222 (also referred to as artist account), such as an artist 222, can operate respective computing devices, such as an artist computing device 224. Artist accounts can be endowed with additional privileges beyond that of an audience member 236 or host 202. For example, an artist account may have privileges to interact with audience member 236 that are fans of an artist account, and may also be able to access statistics related to the accessing of media content for which their user artist account is an attributed artist.

Artist accounts can also receive data to help build their brand or to make additional revenue. Data gathered by context determination component 226, context determination component 226, and machine learning component 228 can be used to train machine learning models, to allow users, such as artists, to get tipped and paid in real-time, get feedback in real-time or near real-time on media or portions of media or playlists, generate customized fan experiences based on the collaboration data. In some aspects, the feedback can be multi-way to allow the artist 222 to send a communication to an audience member 236 and receive a response. In some embodiments, these communications can be supported by the multi-media platform 108 or the social media platform 230.

In addition, the multi-media platform 108 may support payments functionality to pay artist accounts to allow users of the multi-media platform 108 to pay/rent/use the media content and allow multi-media platform 108. The multi-media platform 108 may store and track the use of media content (e.g., in terms of streaming count, revenue collected, artist content, engagement statistics).

In some examples, the multi-media platform 108 may use data analytics and machine learning to predictively or pre-emptively determine what type of situations are likely to generate tips and present tipping options accordingly or have analytics-driven tip suggestions (how much to tip, where to place the tipping button, etc.), and even customize sender/recipient tipping profiles (e.g., $cashtags or usernames for peer to peer payment platforms, financial service providers such as account information to encourage tipping behavior).

In some embodiments, the multi-media platform 108 can determine who the intended recipient of the tip should be on a payment transaction such that the right artist (out of all the artists associated with the song—vocalists, musicians, etc.) are getting those tips. The recipients can be highlighted using $cashtags on social network platforms ("hey send artist $5 for our performance tonight") and/or on the multi-media application based on the context of engagement or usage of media content on the music service.

FIG. 2 also illustrates platforms that can provide services that are ancillary to the services of the multi-media platform 108. While these platforms are illustrated as separate from the 108, these platforms can be part of the multi-media platform 108, or one or more of the components of these platforms can be included in the multi-media platform 108.

In some embodiments, the system illustrated FIG. 2 is under the management of a common service provider as that of the multi-media platform 108. In some embodiments, the components of the system illustrated in FIG. 2 can be under the management of several different third-party service providers. Each of the components may be accessible to each other through one or more APIs. Regardless of whether the components illustrated in FIG. 2 are under the management of a common party or third parties, each of the components illustrated in FIG. 2 may communicate with any other component illustrated in FIG. 2 to provide one or more of the functions addressed herein.

The finance platform 244 can provide one or more financial-related services. For example, the 244 includes a financing engine 214 configured to provide financing such as loans or advances to artist accounts so that the artist accounts may use the financing to create additional media content and or produce experiences or merchandise for purchase by other users of the multi-media platform 108. In some embodiments, the financing engine 214 is configured to work with other services illustrated in FIG. 2 to generate financing terms. In some embodiments, the financing terms are based on expected revenues from sales of media content, performances of media content, sales of merchandise in e-commerce service 210, licensing of media content through sales of non-fungible tokens (NFT), etc. In some embodiments, the financing engine 214 is also configured to work with a payment processing service to extract a portion of payments received by an artist account, thereby allowing the artist account having financing from financing engines to repay the financing.

In some embodiments, artist accounts may be associated with an E-commerce web page offered by e-commerce service 210 that can offer merchandise and experiences for sales to other user accounts of multi-media platform 108. The payment processing service 220 can provide payment processing for carrying out transactions by the e-commerce service 210 and multi-media platform 108.

The payment processing service 220 can also be configured to pay royalties to artist accounts wherein the royalties are associated with the playback of media content associated with the artist account.

The environment illustrated in FIG. 2 also includes the NFT platform 242 for supporting services associated with offering media content and merchandise as a non-fungible token (NFT). In some embodiments, the artist accounts may elect to embody the value of one or more of their media content in a non-fungible token. "Non-fungibility" refers to the uniqueness or non-interchangeability of individual units of an asset. For example, NFTs cannot be replaced with other tokens of the same type. An example format for an NFT on the Ethereum blockchain is a token standard referred to as ERC-721. The ERC-1155 standard offers semi-fungibility. Unlike ERC-721, where the unique identifier represents one asset, the unique identifier of the ERC-1155 token represents a whole class of fungible assets, any number of which the user can transfer to others. Components based on the ERC-998 standard are the templates according to which NFTs can be either non-fungible or fungible assets. While Ethereum is a popular choice for NFT marketplaces, there are non-Ethereum NFT marketplaces as well, belonging to other blockchain networks like Cosmos, Polkadot, International Blockchain Consulting (IBC), Interledger, Binance Smart Chain, etc. Each of the NFT marketplaces operates slightly differently and has its specific instructions, standards, formats, and/or the like. For example, some of the NFTs are curated while others are self-service based. Creating NFTs on some platforms have substantial transaction fees to mint, while some marketplaces do not support specific file formats or sizes of assets. Some platforms are user-friendly, while others have a complex user interface that takes significant training.

The NFT component 206 can be configured to generate (or mint) an NFT for one or more media content in near real time, according to user's preferences (e.g., specific blockchain, expiration time, user's preferences, user's location (e.g., if it is detected that a user is operating in a wallet on a different blockchain) and the context of the conversation (or live media content) between the host and the audience member. The NFT component 206 can be configured to capture a unique description of the media content and/or to provide a persistent link or reference to the media content associated with the NFT. The NFT component 206 can also be used to create a smart contract used to govern the behavior of the NFT. For example, a smart contract can govern instances when the NFT can be transferred to another party or when a media content can be divided into a smaller portion such as a sample, or when and how the media content can be performed.

When the NFT includes a smart contract chaincode, (e.g., such as system chaincode available in Hyperledger Fabric 1.0), the governing of the smart contract can be provided by the smart contract arbiter component 212. The smart contract arbiter component 212 can be used to determine that one or more conditions referenced in a smart contract have been satisfied. The smart contract arbiter component 212 can otherwise be configured to interpret and execute the code defining a smart contract. Through a plurality of smart contracts or chain code, the distributed ledger 208 can maintain a consensus between different blockchains with relation to user's wallets and underlying NFTs, route an incoming transaction to one of the blockchain(s), e.g., based on context data, and then enable processing of the transaction on the blockchain.

The distributed ledger 208 is configured to store NFTs. In some embodiments, the distributed ledger 208 can be a blockchain network, particularly a blockchain network that supports smart contracts. One such blockchain network is the ETHEREUM network.

In some embodiments, the present technology includes creating and maintaining a datastore for the media content (and related digital rights such as mechanical rights, publisher rights, master rights, synchronization rights, etc., held by one or more parties such as labels, publishers, artists, etc., parties who have invested in the media content) and/or a record of interactions with the media content. In some embodiments, such rights are stored in distributed ledger 208 and can be associated with an NFT and smart contract.

In some embodiments, media content are amenable to being divided into smaller components called samples. For example, a sample of a music content might include a portion of the music track, e.g., a short segment of the music track or a particular sound extracted from the music track. The media samples component 218 can be configured to determine potential portions of a media content that might be have a distinct value. In some embodiments, the media samples component 218 utilizes machine learning algorithms trained to identify potential samples from a media content. For example, in one implementation, the media samples component 218 integrates with third party application to measure engagement of the media content (and specific portion of the media content) to then determine value.

In some embodiments, e-commerce service 210 can function as a marketplace for transferring one or more NFTs embodying a value of a media content. In some embodiments, the media content value component 204 can be used to determine a current value or a spot price for a media content or a sample of a media content. In some embodiments, the media content value component 204 utilizes data retrieved from an e-commerce service 210, multi-media platform 108, social media platform 230, and other sources. In some embodiments, the media content value component 204 can also predict a future value of a media content.

The system illustrated in FIG. 2 also includes a social media platform 230. The social media platform 230 is configured to facilitate artist accounts for engaging with fans. In some embodiments, the social media platform 230 is configured to integrate with a variety of existing social networks such as FACEBOOK, TWITTER, INSTAGRAM, VRCHAT, TIKTOK, etc. In some embodiments, the social media platform 230 is also configured to collect data regarding engagement with media content of an artist on one or more social networks.

While not illustrated in FIG. 2, one or more of the multi-media platform 108, the NFT platform 242, the finance platform 244, and the social media platform 230 can also include a gift card service (e.g., for ordering and/or selling gift cards or other stored value cards), a loyalty service (e.g., for managing loyalty rewards and/or redemptions), an invoice service (e.g., for managing invoices for services rendered and/or goods purchased), an estimate service (e.g., for managing estimates for services to be rendered and/or goods to be purchased), a contracts service (e.g., for managing contracts between the user and other entities), a reservation service (e.g., for managing reservations), a chat service (e.g., for facilitating communications between the user and other entities), a feedback service (e.g., to receive feedback about various aspects of a business), a directory service (e.g., for maintaining contact information of contacts of the user), an appointment service (e.g., for managing appointments), a payroll service (e.g., for making payroll payments to workers of the user), etc.

In some embodiments, individual of the services can be associated with their own platforms and, in some examples, can utilize SDKs to communicate with centralized communication components described herein.

In some examples, the multi-media platform 108 or social media platform 230 can receive a communication. The multi-media platform 108 or social media platform 230 can determine where to route the communication (e.g., send the communication) based at least in part on the user identifier associated with the communication. In some examples, the multi-media platform 108 of social media platform 230 can associate a token, or other identifier, with the communication. The token, or other identifier, can be associated with the sending entity (e.g., the artist 222 and/or artist computing device 224). Messages associated with the same token, or other identifier, can be consolidated into a conversation (or "transcript") representative of all communications between the audience member 236 and the artist 222. In some examples, a conversation can be threaded such that communications associated with a same customer and/or same event/interaction can be grouped together. In some embodiments, a conversation, as described herein, can be represented in a consolidated communication user interface. In some examples, the media access component 238 can convert the communication into a "standardized format." The converted communication can be stored (e.g., in the data store 114) and, in some examples, can be presented via a consolidated communication user interface. In at least one example, the host 202, the artist 222, or the audience member 236 can access the consolidated communication user interface via an application, web browser, or the like. The media access component 238 can consolidate communications received by the the host 202, the artist 222, or the audience member 236 via different communication channels and/or platforms catered for different media content into a single access point (e.g., the consolidated communication user interface) such that the the host 202, the artist 222, or the audience member 236 can view and/or respond to communications via interaction with the single access point. In some examples, communications can be arranged by entity (e.g., customer, vendor, etc.), which can be based at least in part on tokens, or other identifiers, as described above. In some examples, communications can be arranged based on date, time, communication channel, content, rules, and/or the like. In some examples, communications can be arranged based on priority, characteristic(s) of the sender (e.g., customer), etc.

In some examples, the multi-media platform 108 can utilize context data to generate a response or a recommendation for the response or even provide an array of responses to choose from. That is, in some embodiments, the multi-media platform 108 can utilize context data to generate personalized loyalty or rewards, that may or may not be surfaced on a peer-to-peer service associated with multi-media platform 108. For example, the multi-media platform 108 can recommend actions to incentivize a user or other users to engage more with the media/content based on an audience member 236 attending a virtual or in-person live experience(s), their taste in music, shopping, and behavioral habits, and such context data. In some embodiments, based on data pertaining to digital experiences, the in-person experience can be configured to engage more with "loyal" users. An artist can provide personalized experiences for "true" fans (e.g., shout outs) or on a digital platform, surface true fans on an online list. "Fandom" can be determined based on the engagement with media, how many times the user has engaged with the content, previous live streams, offline streams, downloads, record catalog that shows the details, NFT purchases, how many times they have tipped, how many times they have shared the content, the merchandise that they have purchased, etc. Such data can be obtained via multi-media platform 108 and/or social media platform 230.

In some examples, the multi-media platform 108 can be used to see who leaves, who engages with data, and who the loyal users are that are more likely to invest in the content. Such data of loyal users can be surfaced to the artists targeted with customized offers. As some examples, the loyal users can be targeted with custom rewards, e.g., specific coupons to use on artist merchandise, or an offer to have direct follower/fan interaction using live chats, post-promotion videos, etc., or other social networking capabilities through the marketplace or otherwise. In some cases a loyal user may be offered augmented reality objects to scan, e.g., in concert venues, to get fan interaction offers such as limited edition merchandise, merchandise access, reserve specific seats, move to the front of the line, meet the artists, passing sync control to the users, etc. A heat map can be generated to show loyal users, new users, and others to adjust the playlists.

In some embodiments, machine-learning techniques can be used to analyze the media being played at any given moment, gauge the reaction (e.g., explicit or implicit) of the audience and modify the playlist or audio based on real-time or near real time audience feedback.

In some embodiments, the multi-media platform 108 can be an open-source toolkit that operates as an SDK to allow developers to build apps or tools that frame over the media service to support music mixing and sharing of live music experiences (e.g., NFL player sharing live what music he is listening to in his locker room to pump up for an upcoming game or country artist sharing live what she listens to as her calm-down meditative music while she is doing yoga). The multi-media platform 108 can offer a first set of built-in filters that a user can apply to music they are listening to create a jazzed, club-vibe, mediative, or cover-song version of the music leveraging artificial intelligence and predictive learning to analyze the notes, tones, frequencies in the music and apply the type of DJ features real-life DJs would have applied to songs with similar notes and frequencies. In some embodiments, multi-media platform 108 can present filters for the type of DJing (seaside waves, yoga, club, work concentration) and see how DJs have mixed songs like these with others based on ML and by analyzing the underlying DSP parameters and comparing to others in that set. In another example, multi-media platform 108 picks the "filter" first and then recommends songs that can be mixed. So if the user is playing an Adele song, and there are 10 inbuilt filters. Each filter is based on AI study of thousands of songs. The filter would compare this song and from the notes, tones, frequency, and other DSP parameters determine similar songs or parts of the song and how DJing was applied by a jazz DJ (separate ML training); a pop concert DJ (separate ML model); a rave DJ (separate ML training data set) and apply it accordingly to various segments of the song to get the Auto DJ effect, thus creating a filter bank for songs and music.

FIG. 3A, FIG. 3B, FIG. 3C, FIG. 3D, FIG. 3E, and FIG. 3F illustrates aspects of an example method for facilitating a live playback stream by a multi-media platform. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures and systems described in the examples herein, although the methods may be implemented in a wide variety of other environments, architectures and systems.

Figure 3A:
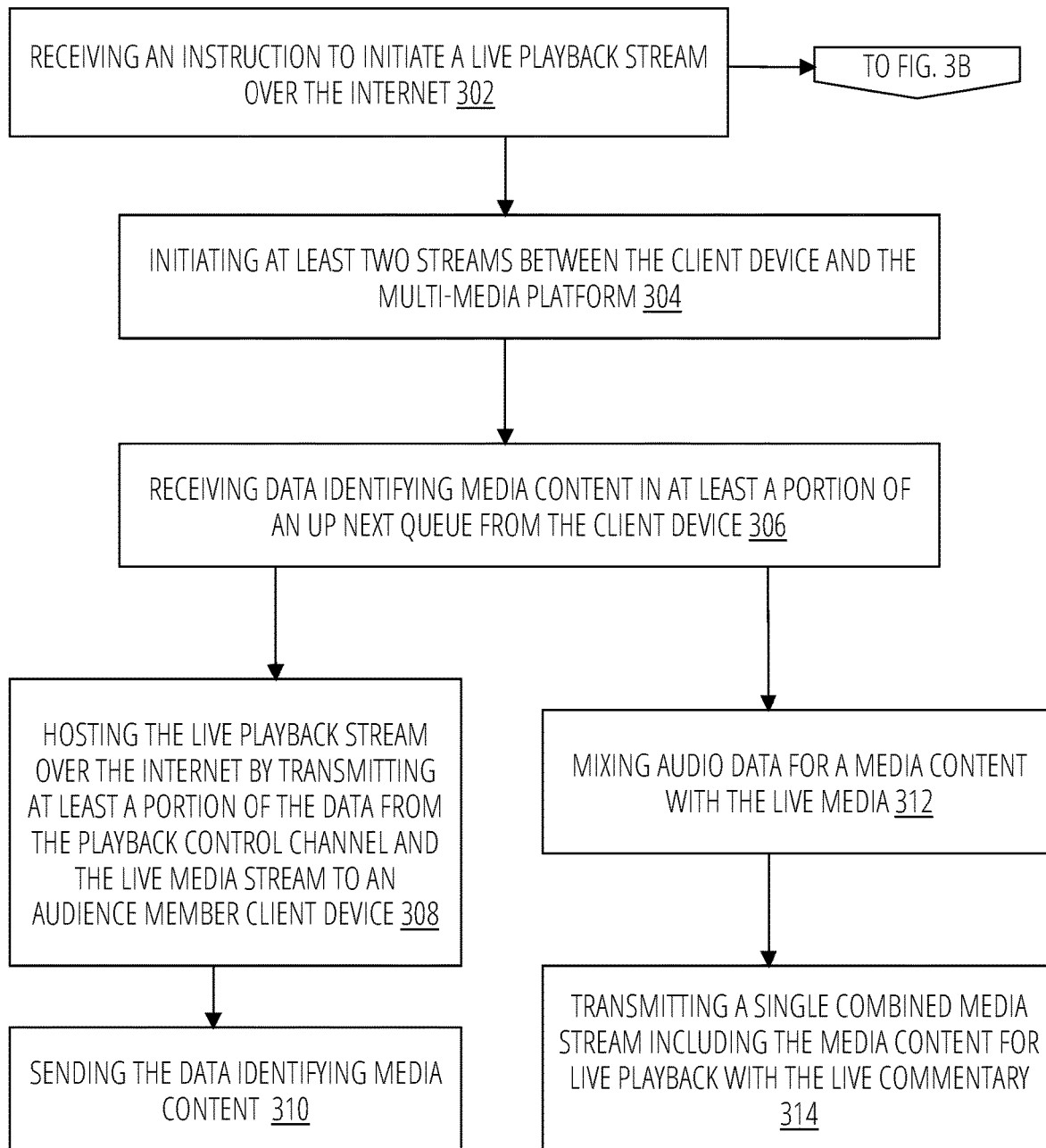
FIG. 3A, FIG. 3B, FIG. 3C, FIG. 3D, FIG. 3E, FIG. 3F, and FIG. 3G illustrates aspects of an example method for facilitating a live playback stream by a multi-media platform.

FIG. 3A illustrates an example method for initiating, controlling, and transmitting the live playback stream. The method illustrated in FIG. 3A reflects a need in the art to allow users and artists to host live playback streams, wherein a host user account can provide a public show to playback recorded media content along with live media. In some embodiments, the live media can include a live performance such as providing commentary. During a live playback stream, a client device of the host user account controls public playback of recorded media content and is a source of live media such as commentary. In some embodiments, a live playback stream can have the format of a radio show transmitted over the Internet.

The present technology can have several advantages over other live performances transmitted over the Internet. In some embodiments, the present technology provides the presentation of high-quality recorded media content to audience member client device. In another example, the present technology can also result in more efficient usage of network resources. In yet another example, the present technology can automatically address copyright concerns associated with public presentations of recorded media content.

The present technology exists in a context of a multi-media platform wherein media content are stored in a data center and are available for streaming or download to client devices. In this context, a live playback stream that includes playback of recorded media content and live media presents a particular technological challenge. Specifically, a technological challenge is posed by multiplexing playback of recorded media content from a first source with the live media from a second source.

In some embodiments, the recorded media content are configured to be downloaded by an audience member client device and played back locally on the audience member client device. Meanwhile, the live media is recorded by the client device of the host and needs to be transmitted to the audience member client device. In some embodiments, the present technology utilizes an alternative infrastructure, such as utilizing a server to playback the recorded media content and using the server to multiplex live media received from the client device of the host and streaming the pre-multiplexed live playback stream to audience member client device.

While technologically challenging, the present technology provides some advantages. When the multiplexing takes place at the audience member client devices, the present technology provides for higher quality media content playback than if the media content were streamed to the audience member client device. The present technology can send media content to the audience member client device prior to playback to be cached, allowing for transmission of higher quality media content. Second, the present technology makes more efficient use of network bandwidth. It is likely that one or more media content that are part of the live playback stream have previously been downloaded and cached by one or more audience member client devices. When this occurs, there is no need to re-transmit the media content. Since many people tend to repeatedly engage in media programming that matches their tastes, it is likely that some media content will repeatedly be encountered. Therefore it is likely that some media content that are part of the live playback stream have already been downloaded and cached by audience member client devices.

When the multiplexing takes place at the multi-media platform the present technology provides higher quality media than multiplexing everything at the client device of the host. As addressed above, when the multiplexing occurs at the audience member client device, there is potential that audience member client device can actually receive higher quality media content than experienced by the host. This occurs because every client device could receive the higher quality media content than their subscription provides for. When multiplexing happens at the multi-media platform, the quality of media content is limited by the network bandwidth between the multi-media platform and the audience member client device. But when multiplexing happens on the client device of the host, the quality of media content are limited by the subscription of the host, and bandwidth between the client device of the host and the multi-media platform, and the bandwidth between the multi-media platform and the audience member client device. At each hop, quality can only degrade. Additionally, the connection between client device of the host and the multi-media platform needs to download and upload media content so it might be the most bandwidth-constrained link. The present technology also provides more efficient use of network bandwidth than multiplexing everything at the client device of the host. If the recorded media content and the live media were multiplexed at the client device of the host then the recorded media content would need to be downloaded to the client device of the host from the multi-media platform before playback. Thereafter, the multiplexed live playback stream including the recorded media would need to be transmitted back to the multi-media platform to be distributed to the audience member client devices.

The present technology also addresses the problem of how to synchronize the playback of the recorded media content with the live media so that the two sources can be multiplexed at a location other than the client device of the host that controls the live playback stream.

Techniques described herein provide for sharing media experiences within the multi-media platform. In some embodiments, the present technology disclosed herein includes an infrastructure for users to collaborate on experiences (such as digital concerts, opining on a podcast in near-real-time, sharing music playlists with friends and family, and so on).

Both of these possible architectures also address common copyright issues associated with public presentations of recorded media content. In other live performances over the Internet, a performer might playback a media content on their client device in association with their live performance. However, since the client device is not aware that the recorded media content are being transmitted to other users over the Internet, there is no way for the client device to discern that a different royalty rate such as that associated with a public performance of recorded media content should be paid to an artist or recording label. In contrast, the present technology is aware of the intent to transmit the recorded media content over the Internet for playback to a public audience since the host user account declares that intent. Furthermore, the multimedia platform responsible for broadcasting the live playback stream is the same platform responsible for providing the media content and maintaining an accounting for payment of appropriate royalties. Accordingly, the present technology has the benefit that the multimedia platform can automatically account for the public playback of any media content properly.

These and other advantages will be apparent to those of ordinary skill in the art from the descriptions herein.

According to some examples, the method illustrated in FIG. 3A includes receiving an instruction to initiate a live playback stream over the Internet at block 302. For example, the collaboration component 112 illustrated in FIG. 1A may receive an instruction to initiate a live playback stream from a client device of the host user account.

The host user account can be a general user account or can be an artist account. An artist account is a user account that has been verified to be associated with one or more recorded media content available for playback from the multi-media platform. In contrast, a general user account is any user account that is not a verified artist user account.

According to some examples, the method includes initiating at least two streams between the client device and the multi-media platform at block 304. For example, the collaboration component 112 illustrated in FIG. 1A may initiate at least two streams between the client device and the multi-media platform 108. One stream is a playback control channel between the multi-media platform and the client device for transmitting data regarding playback controls pertaining to recorded media content. Another stream is a live media stream for transmitting data encoding live commentary.

The playback control channel is a data channel used to transmit information including an identification of recorded media content to be played back during the live playback stream, playback controls, instructions regarding various effects to be applied to the recorded media content during playback, and multiplexing information to be used to multiplex the live media stream with the playback of the recorded media content. The data regarding playback controls of the playback control channel includes playback synchronization information for the playback of the recorded media content such as play, skip, and pause commands. The instructions also provide various effects to be applied to the recorded media content during playback including data describing custom multiplexing or transitions to apply to the recorded media content. The multiplexing information maps the audio captured by the microphone to a time-domain associated with a currently playing recorded media content.

The live media stream can include audio or audio-video media of a live performance. The data encoding the live commentary in the live media stream is audio captured by a microphone of the client device. While the live media stream implies that the live performance is commentary to accompany the playback of the recorded media content, it is not limited to commentary. The live media stream can be a recording of any live performance.

The live media stream can include encoded markers as reference points along with the live performance recording. The playback control channel can reference the encoded markers to indicate where that portion of the live performance corresponds to the playback of the recorded media content.

According to some examples, the method includes receiving data identifying media content in at least a portion of an up next queue from the client device at block 306. For example, the collaboration component 112 illustrated in FIG. 1A may receive data identifying recorded media content in at least a portion of an up next queue from the client device. The up next queue is controlled by the host user account and includes at least one recorded media content planned for playback during the live playback stream.

As will be addressed further below, the host can populate a queue of recorded media content for playback during the live playback stream. The recorded media content in the up next queue can be identified by unique identifiers and meta data describing the title of the media content and the performing artist.

The collaboration component 112 can receive a list of recorded media content identified by their unique identifiers or other metadata as part of the playback control channel.

The collaboration component 112 does not need to receive the actual recorded media content from the client device of the host. Instead, the multi-media platform 108 already stores or otherwise has access to the recorded media content. Generally, the multi-media platform 108 also has access to the recorded media content in its highest quality available as compared to any of the other devices (audience member client devices, host devices, etc.) in the system.

As addressed above, the present technology can be practiced by multiplexing the playback of the recorded media content and the live media on an audience member client device (as illustrated by block 308 and block 310) or at the multi-media platform 108 (as illustrated by block 312 and block 314).

According to some examples, the method includes hosting the live playback stream over the Internet by transmitting at least a portion of the data from the playback control channel and the live media stream to a connecting client device at block 308. For example, the collaboration component 112 illustrated in FIG. 1A may host the live playback stream over the Internet by transmitting at least a portion of the data from the playback control channel and the live media stream to an audience member client device.

In embodiments wherein the playback of the recorded media content and the live media are multiplexed on the audience member client devices, the method includes sending the data identifying recorded media content at block 310. For example, the collaboration component 112 illustrated in FIG. 1A may send the data identifying recorded media content to the audience member client devices, whereby the audience member client device can determine whether any of the identified media content are already stored or cached at the audience member client device, and request the media content not stored on the audience member client device from the multi-media service.

The recorded media content can be played back at the audience member client device and the live media can be multiplexed using data from the playback control channel on an instance of the multi-media application running on an audience member client device of a user account connected to the live playback stream.

In embodiments wherein the playback of the recorded media content and the live media are multiplexed at the multi-media platform 108, the method includes multiplexing audio data for a media content with the live media, at block 312. For example, the multi-media platform 108 illustrated in FIG. 1B may multiplex audio data for a media content with the live media.

According to some examples, the method includes transmitting a single combined media stream including the recorded media content for live playback with the live media at block 314. For example, the multi-media platform 108 illustrated in FIG. 1B may transmit a single combined media stream including the recorded media content for live playback with the live media.

Figure 3B:
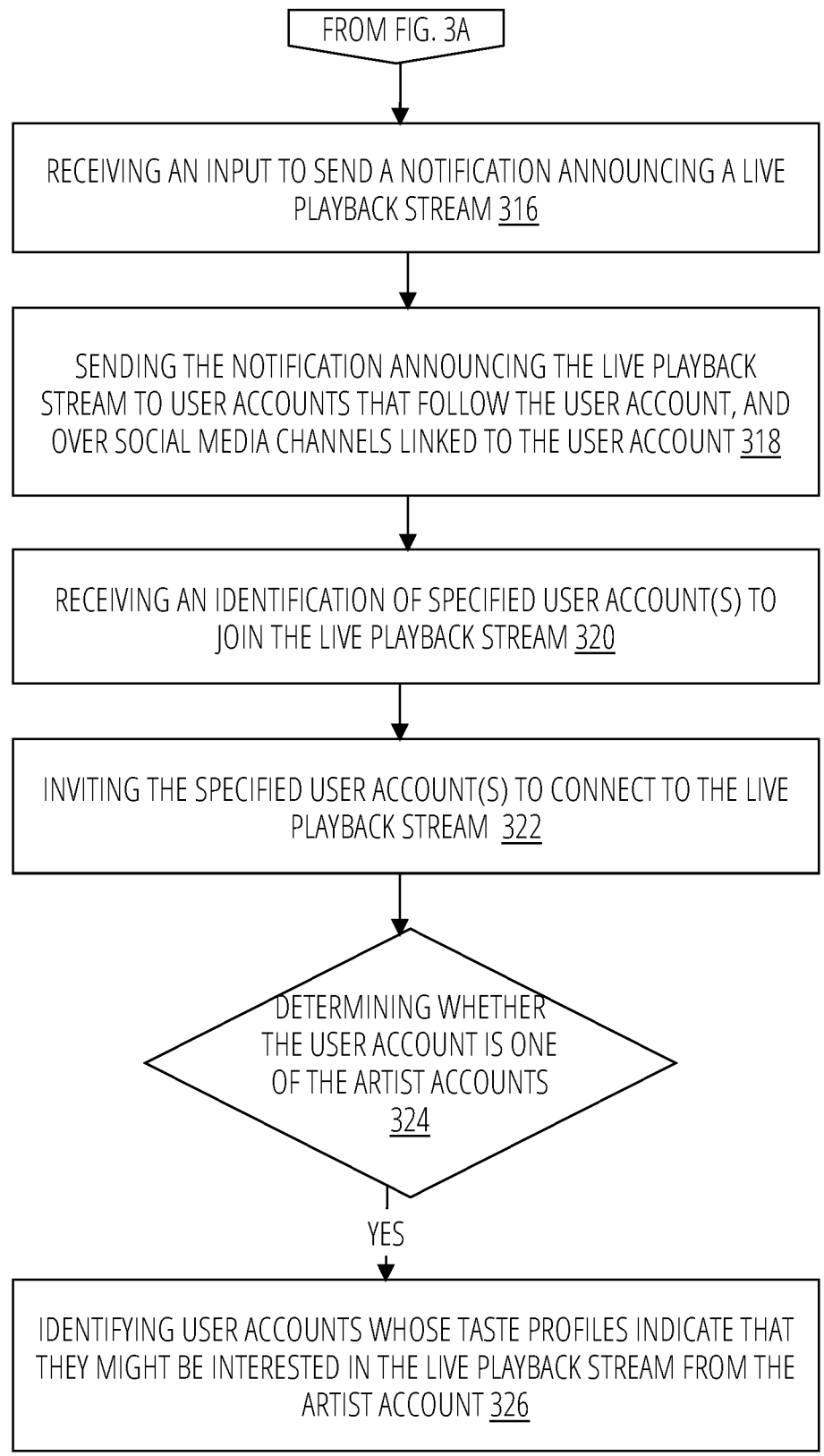

FIG. 3B illustrates an example method for announcing a live playback stream and otherwise inviting potential audience members to join the live playback stream using their client device.

How far a particular user account can reach to invite audience members can be a function of whether their account is an artist account or a general user account. While all user accounts can access any of their followers in a network of the multi-media platform 108 and any social media accounts that are linked to the multi-media platform 108, only artist accounts should be able to reach user accounts (or those without user accounts of the multi-media platform) that are not within their network. According to some examples, the method includes receiving an input to send a notification announcing a live playback stream at block 316. For example, the context determination component 226 illustrated in FIG. 1A may receive a communication from host computing device 102 indicative of a user interface input received by a multi-media application operating on the host computing device 102 to send a notification announcing a live playback stream. The multi-media application is associated with the multi-media platform 108.

According to some examples, the method includes sending the notification announcing the live playback stream to user accounts that follow the user account, and over social media channels linked to the user account at block 318. For example, the collaboration component 112 illustrated in FIG. 1A may send the notification announcing the live playback stream to user accounts that follow the user account, and may send notifications over social media channels linked to the user account. While the sending of the notification can be in response to the request to send the notification illustrated as block 316, the sending of the notification can also occur automatically after a user account sends the instruction to initiate the live playback stream at block 302.

In some embodiments, the multi-media platform 108 can maintain its own social features, such as the ability to follow certain user accounts to be notified when they begin a live playback stream or to receive information or notifications about posts from certain user accounts. Thus, when a host user account initiates a live playback stream, the multi-media platform 108 can notify user accounts that have a social connection or followers on the multi-media platform. Additionally, the multi-media platform 108 can be linked to other social networks and third party platforms, such as FACEBOOK, INSTAGRAM, TWITTER, TICKTOCK, YOUTUBE, DISCORD, VRCHAT, REC ROOM, HORIZONS, etc., and can send messages through linked user accounts on these platforms utilizing one or more APIs provided by the social media networks.

Additionally, a user account that is about to initiate a live playback stream can also invite users. According to some examples, the method includes receiving an identification of specified user account(s) to join the live playback stream at block 320. For example, the multi-media platform 108 illustrated in FIG. 1A may receive an identification of specified user account(s) to invite to the live playback stream. According to some examples, the method includes inviting the specified user account(s) to connect to the live playback stream at block 322. For example, the multi-media platform 108 illustrated in FIG. 1A may invite the specified user account(s) to connect to the live playback stream.

As noted above, an artist account may be able to reach potential audience members that are outside their social network or that have not otherwise followed the artist. In some instances, users of the multi-media platform 108 have a specific interest in being exposed to new media content and artists, which can be promoted by informing other users of instances when an artist account initiates a live playback stream. Additionally, artists, especially up-and-coming artists have a strong interest in obtaining new fans. To this end, artists may pay for the service of informing users outside of the artist's social network of the live playback stream. In some embodiments, the artist can agree to share a portion of royalties that come from user accounts that connect to the live playback stream that subsequently playback media content from the artist.

Accordingly, the method illustrated in FIG. 3B can include determining whether the user account is one of the verified artist user accounts at decision block 324. For example, the multi-media platform 108 illustrated in FIG. 1A may determine that the user account is one of the general user accounts.

One privilege that can be afforded to an artist account can be reaching new audience members. According to some examples, the method includes identifying user accounts whose taste profiles indicate that they might be interested in the live playback stream from the artist account at block 326. For example, the multi-media platform 108 illustrated in FIG. 1A may identify user accounts whose taste profiles indicate that they might be interested in the live playback stream from the artist account. As will be addressed further herein, the multi-media platform 108 can maintain taste profiles as part of a user profile that indicates artists that the user account favors and attributes of media content that the user account favors.

According to some examples, multi-media platform 108, illustrated in FIG. 1A, may collect information associated with user accounts. The information associated with user accounts can include media content preference information, social channel information, and/or purchase information. The media content preference information is derived from explicit data provided by user inputs indicating an affinity for an artist or a media content and implicit data such as playback engagement data, including skip counts, play counts, and purchases. The social channel information is received from one or more social platforms and can include data about social contacts and follower information, topic engagement, and content engagement. The purchase information can be received from one or more payment networks indicating spending pertaining to engagement with media content or artists.

According to some examples, the method includes comparing a media content preference of the user account with other accounts to identify other accounts with similar media content preferences. The method further includes comparing the media content in the queue of media content with the media content preferences of other user accounts to identify other user accounts whose media content preferences indicate that they would enjoy joining the live playback stream.

The method includes analyzing the information associated with the user accounts to generate the media content preference information, including one or more representations of an affinity of a user of a user account for a media content. The method further includes analyzing the information associated with the user accounts to generate an artist affinity profile. The artist affinity profile includes a score of an affinity for a particular artist for a user of a user account.

According to some examples, the multi-media platform 108 illustrated in FIG. 1A may compare scores in the artist affinity profiles in respective user accounts. The multi-media platform 108 may determine user accounts from the population of user accounts having the strongest affinity for the particular artist.

Using this data, the multi-media platform 108 can identify user accounts that might be interested in the live playback stream hosted by the artist account and can invite these user accounts to join the live playback stream. According to some examples, the method includes inviting the user accounts from the population of user accounts having the strongest affinity for the particular artist to an event hosted by the artist.

In some embodiments, the multi-media platform 108 can invite users using the techniques addressed above to invite users to live playback streams and events other than live playback streams. For example, the multi-media platform 108 can invite users to an event hosted by the artist, such as a live chat or video conference. In some embodiments, the event can occur outside of the multi-media platform, such as a social media platform, video conferencing platform, chat platform, etc.

In some embodiments, a live playback stream may have more than one host. A host can be any user account that can at least have some control over the media content to be played during the live playback stream and/or can join in the live performance portion of the live playback stream. In some implementations, identification of the host is based on the metadata, e.g., artist name, of the media content, and/or the sequence in which the media content is played. Further, the host may be associated with specific access levels (e.g., verified status, or identity verification) to be able to host. In such implementations of a plurality of hosts, the switching of control from one host to another in a seamless manner without any user intervention. In case of shuffling or otherwise change in sequence, the control automatically changes.

Figure 3C:
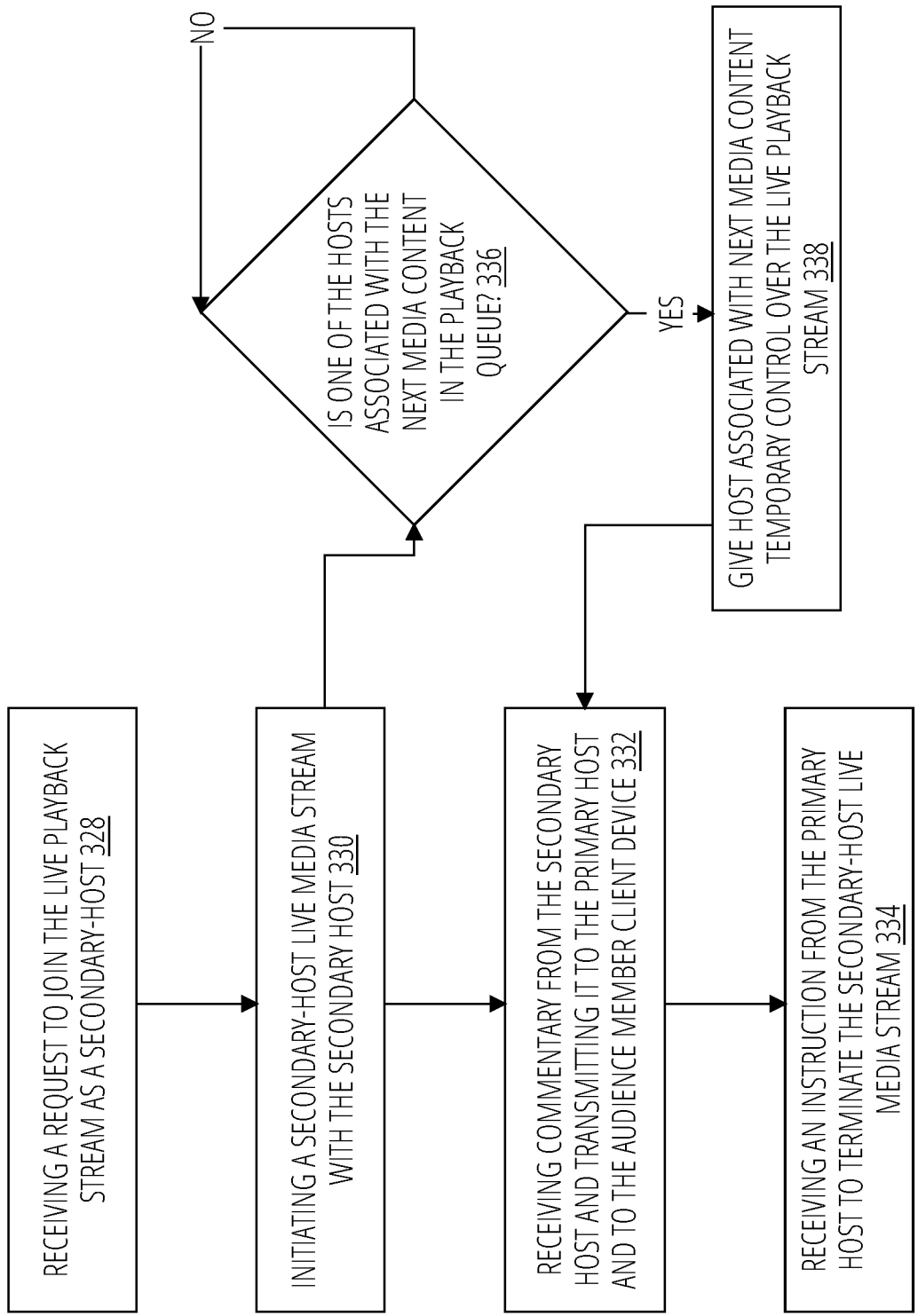
Figure 3D:
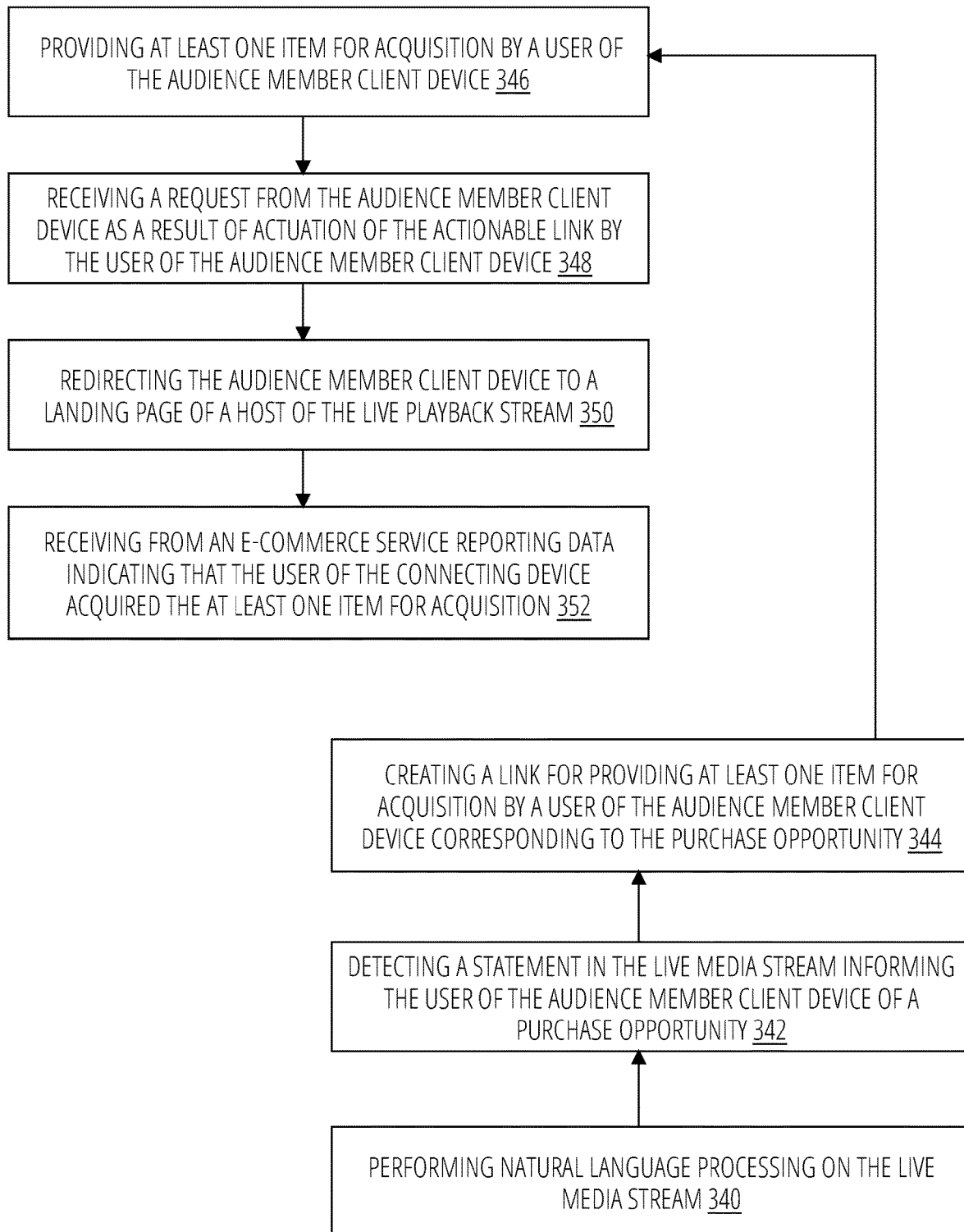
Figure 3E:
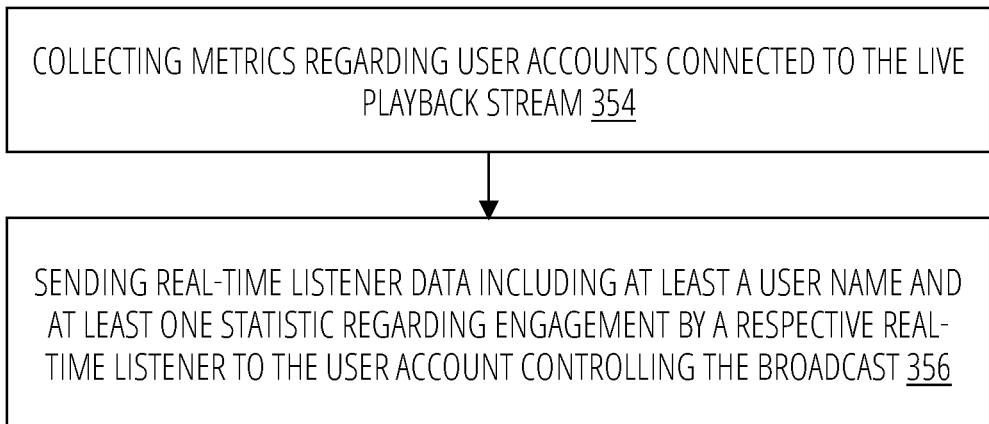

The method illustrated in FIG. 3C can be performed at any time during the live playback stream.

According to some examples, the method includes receiving a request to join the live playback stream as a secondary host at block 328. For example, the collaboration component 112 illustrated in FIG. 1A may receive a request to join the live playback stream as a secondary host. The request to join the live playback stream as the secondary host can include a token identifying the live playback steam and a rights object issued by either the client device of a primary host (when the primary host invites the secondary host) of the live playback stream or the multi-media platform 108 (such as when the primary host and the secondary host are preconfigured prior to initiation of the live playback stream).

According to some examples, the method includes initiating a secondary host live media stream with the secondary host at block 330. For example, the collaboration component 112 illustrated in FIG. 1A may initiate a secondary host live media stream with the secondary host.

The secondary host live media stream is an additional live media stream that is the same as described with respect to FIG. 3A for the primary host and can be multiplexed into the live playback stream in the same manner. One difference, however, is that the secondary host live media stream also needs to be transmitted to the primary host client device so that they can hear the audio of their co-host. According to some examples, the method includes receiving commentary from the secondary host and transmitting it to the primary host and to the audience member client device at block 332. For example, the collaboration component 112 illustrated in FIG. 1A may receive commentary from the secondary host and transmit it to the primary host and to the audience member client devices.

Alternatively, rather than utilizing multiple live media streams, the primary host and the secondary host can be joined in a video or audio conference using a conferencing service, and the conferencing service can transmit a single live media stream.

In some embodiments, the secondary host may be a guest host joining the live playback stream for a short interval. The secondary host might also be one of the users of one of the audience member client devices that has been invited to be a secondary host for a brief interval, much like a call-in listener on a radio program. In such instances, the primary host may limit the privileges of a secondary host, such as limiting the secondary host to only providing commentary as part of the live performance, and the primary host can terminate the secondary host privileges.

According to some examples, the method includes receiving an instruction from the primary host to terminate the secondary host live media stream at block 334. For example, the collaboration component 112 illustrated in FIG. 1A may receive an instruction from the primary host to terminate the secondary host live media stream.

In some embodiments, one or more hosts (the primary host or secondary hosts) might be associated with some of the recorded media content in the live playback queue. For example, one or more of the hosts might have added the recorded media content to the live playback queue or one or more of the hosts might be an artist that performs the recorded media content in the playback queue. In such embodiments, the collaboration component 112 can assist in coordinating the multiple hosts. For example, the collaboration component 112 can determine whether one of the hosts are associated with the next recorded media content in the playback queue at decision block 336. When collaboration component 112 determines that one of the hosts is associated with the next recorded media content, the collaboration component 112 can temporarily provide that host control over the live playback stream so that the host can control the live media stream and/or control the effects and multiplexing of the recorded media content. In some implementations, the collaboration component 112, using machine learning, identifies portion of the recorded media where another host, primary or secondary, to whom the control is transferred may provide recorded media. Accordingly, the collaboration component 112 can create placeholders for the hosts to provide commentary. If the hosts provide live media, e.g., commentary, the live media is multiplexed with the recorded media in the predefined timestamp, however if the hosts do not provide live media, the placeholders are removed so that there is no lag from an audience's perspective.

The temporary control can take the form of temporarily granting a secondary host one or more privileges of a primary host. The temporary control can take the form of allowing the host associated with the next media content control over whether other hosts can transmit over the live media stream, and controlling certain instructions that can be transmitted over the playback control channel.

In some embodiments, it may be desirable to provide information or a link to an audience member client device for display in the multi-media application as their users are consuming a live playback stream.

Such embodiments can be desirable when a host of the live playback stream has a website that they use to sell merchandise. This can be prevalent with artist accounts that have recorded media content, tickets, and other merchandise to sell. However, even general user accounts hosting live playback streams can have websites that sell merchandise. A general user account can become popular and may have many followers. In some embodiments, a general user account could become an artist account if the general user account becomes a popular personality t0 follow on the multi-media platform 108.

According to some examples, the method includes providing at least one content for acquisition by a user of the audience member client device at block 352. For example, the multi-media platform 108 illustrated in FIG. 1A may provide at least one content for acquisition by a user of the audience member client device. The content for acquisition is to be displayed as an actionable link in a user interface at the connecting device. The content for acquisition can be an content available from a webpage or online store associated with an artist account or general user account. In some embodiments, while a general user account hosts the live playback stream, the context determination component 226 can cause the multi-media platform 108 to provide a link to an content for acquisition that is sold by another user or even an artist that does not have an artist account with the multi-media platform 108 when the context determination component 226 associates the context of the live playback stream with the content for acquisition. The multi-media platform 108 can provide the content for acquisition using the playback control channel or another communication stream between the multi-media platform 108 and the audience member client devices.

According to some examples, the method includes receiving a request from the audience member client device as a result of the actuation of the actionable link by the user of the audience member client device at block 348. For example, the multi-media platform 108 illustrated in FIG. 1A may receive a request from the audience member client device as a result of the actuation of the actionable link by the user of the audience member client device.

According to some examples, the method includes redirecting, e.g., using a URL, scannable code, QR code, other identifier, etc., the audience member client device to a landing page associated with the host of the live playback stream at block 350. For example, the multi-media platform 108 illustrated in FIG. 1A may redirect the audience member client device to a landing page, e.g., store page, forum page, web application, concert page, artist website, etc., of the live playback stream host. The store page of the host of the live playback stream includes the at least one content for acquisition. As noted above, in some embodiments, the store page could also be associated with other user accounts or even entities that do not have a user account with the multi-media platform 108.

In some embodiments, the store page can be hosted by an e-commerce service. In some embodiments, the e-commerce service can communicate with the multi-media platform 108. In some embodiments, the e-commerce service and the multi-media platform 108 can communicate using one or more APIs. In some embodiments, the e-commerce service and the multi-media platform 108 can be part of a larger entity that can bring together e-commerce service functionality and the multi-media platform 108 functionality for users of both services as addressed with respect to FIG. 1A. According to some examples, the method includes receiving reporting data from an e-commerce service indicating that the user of the audience member client device acquired the at least one content for acquisition at block 346. For example, the multi-media platform 108 illustrated in FIG. 1A may receive from an e-commerce service reporting data indicating that the user of the audience member client device acquired the at least one content for acquisition. In some cases, the landing page can be informational providing the user with information regarding the media content with no actionable links. In another case, the landing page can be customized based on historical data and context specific to the host and the audience member.

In some embodiments, the multi-media platform 108 can automatically be responsible for providing links to items for acquisition. According to some examples, the method includes performing machine learning analysis, e.g., natural language processing, on the live media stream at block 340. For example, the context determination component 226 illustrated in FIG. 1A may perform natural language processing on the live media stream to interpret a contextual cue that is relevant to one or more items for acquisition.

According to some examples, the method includes detecting a statement in the live media stream informing the user of the audience member client device of a purchase opportunity at block 342. For example, the context determination component 226 illustrated in FIG. 2 may detect a statement in the live media stream informing the user of the audience member client device of a purchase opportunity. For example, a host of the live playback stream might make a reference to an upcoming concert, and the context determination component 226 can detect the reference to the concert tickets and can map the reference to concert tickets to tickets for purchase that can be provided as the content for acquisition to the connecting client devices. In another example, the host can refer to a recorded media content and the context determination component 226 can detect this reference and map the reference to the media content at an e-commerce service. In another example, the context determination component 226 can identify a recorded media content for playback in the live playback stream and identify an content for acquisition related to the recorded media content. In some embodiments, the host of the live playback stream might not have any relationship with the web page of the e-commerce service. For example, the host could be a general user account that has chosen to feature an artist in the live playback stream and the context determination component 226 can cause an content for acquisition to be presented in the multi-media application playing the live playback stream.

According to some examples, the method includes creating a personalized link for providing at least one content for acquisition by a user of the audience member client device corresponding to the purchase opportunity at block 344. For example, the context determination component 226 illustrated in FIG. 2 may provide a link for providing at least one content for acquisition by a user of the audience member client device corresponding to the purchase opportunity. The at least one content for acquisition can include tickets to a live show, a media content, merchandise, etc. In some implementations where the user provides explicit authorization, the links may merely serve as notifications and the item can be automatically purchased on behalf of the audience member, e.g., based on audience member's preferences. This can be for timed events. In some embodiments, the link can be personalized based on attributes of the audience member derived from their user profile, communication between the audience member and the specific artist/host (or like artists/hosts) and/or past transaction behavior. The link or landing page can be thus modified on a per audience basis such that audience member A sees option to buy merchandize, whereas audience member B sees an option for concert tickets.

According to some examples, the method includes collecting metrics regarding user accounts connected to the live playback stream at block 354. For example, the multi-media platform 108 illustrated in FIG. 1A may collect metrics regarding user accounts connected to the live playback stream.

According to some examples, the method includes sending real-time listener data including at least a user name and at least one statistic regarding engagement by a respective real-time listener to the user account controlling the broadcast at block 356. For example, the multi-media platform 108 illustrated in FIG. 1A may send real-time listener data including at least a user name and at least one statistic regarding engagement by a respective real-time listener to the user account controlling the broadcast.

Figure 3F:
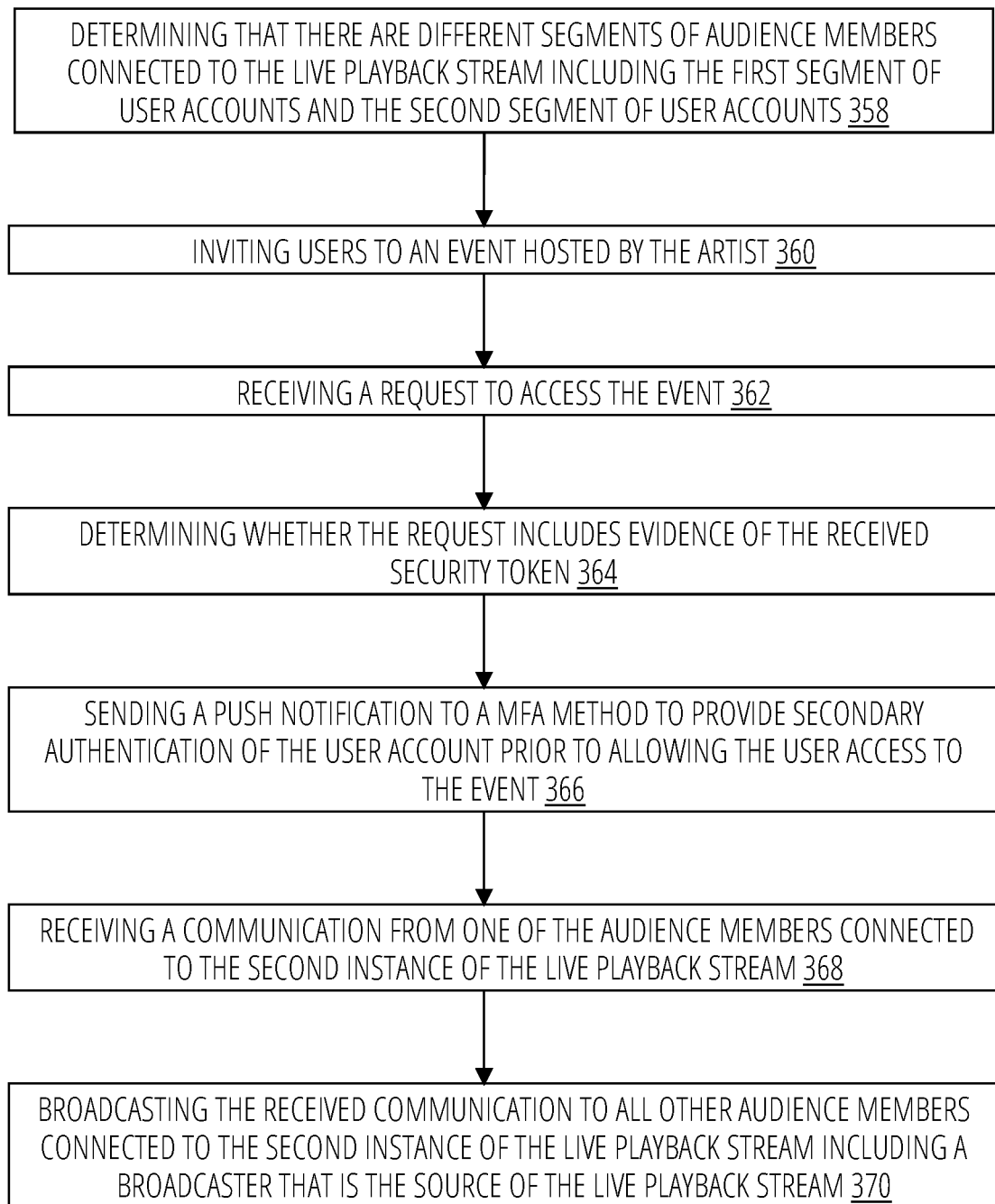

FIG. 3F illustrates an example method of providing differentiated levels of engagement for some users, especially users that are loyal users.

According to some examples, the method includes determining that there are different segments of audience members connected to the live playback stream including a first segment of user accounts and a second segment of user accounts at block 358. For example, the collaboration component 112 illustrated in FIG. 1A may determine that there are different segments of audience members connected to the live playback stream including the first segment of user accounts and the second segment of user accounts.

The second segment of user accounts can be part of a loyal users segment that includes top fans of an artist account that is the source of the live playback stream. A first audience member engagement experience provides a first segment of user accounts with limited engagement options.

According to some examples, multi-media platform 108 illustrated in FIG. 1A may collect information associated with user accounts to identify top fans of an artist account. The information associated with user accounts can include media content preference information, social channel information, and/or purchase information. The media content preference information is derived from explicit data provided by user inputs indicating an affinity for an artist or a media content, and implicit data such playback engagement data including skip counts, play counts, and purchases. The social channel information is received from one or more social platforms and can include data about social contacts and follower information, topic engagement, and content engagement. The purchase information can be received from one or more payment networks indicating spending pertaining to engagement with media content or artists. The media content preference information can be used to identify the loyal users segment of users. A loyal users can be a user account that demonstrates a highest affinity for the artist or one of the media content performed by the artist. A loyal users can also be a user account that demonstrates the highest level of engagement with an artist by joining the most live playback streams, buying the most merchandise, or hosting their own live playback streams that feature the artist.

According to some examples, the method includes inviting users to a second audience member engagement experience hosted by the artist account at block 360. For example, the collaboration component 112 illustrated in FIG. 1A may invite loyal users users to the second audience member engagement experience hosted by the artist account. The second audience member engagement experience can be an enhanced engagement experience reserved for a limited number of loyal users. In some embodiments, the top loyal users connected to the live playback stream can be segmented out and provided the invitation to the second audience member engagement experience.

When the event is a second audience member engagement experience associated with a live playback stream, the invited fans might be given access to a live chat with the artist account or might be granted a temporary privilege as a secondary host.

In some embodiments, the invitation can include a security token to ensure that only the invited user account can join the event. In some embodiments, the event is a second audience member engagement experience associated with a live playback stream. The different segments of the audience members are connected to different instances of the live performance of the broadcast.

According to some examples, the method includes receiving a request to access the second audience member engagement experience at block 362. For example, the collaboration component 112 illustrated in FIG. 1A may receive a request to access the second audience member engagement experience.

According to some examples, the method includes determining whether the request includes evidence of a received security token at block 364. For example, the collaboration component 112 illustrated in FIG. 1A may determine whether the request includes evidence of a received security token. The security token can be used to ensure that any invitations are not shared outside of the user account that has been invited to the event.

According to some examples, the method includes sending a push notification to a multi-factor authentication (MFA) component to provide secondary authentication of the user account prior to allowing the user access to the event at block 366. For example, the collaboration component 112 illustrated in FIG. 1A may send a push notification to a MFA component to provide secondary authentication of the user account prior to allowing the user access to the event.

According to some examples, the method includes receiving a communication from one of the audience members connected to the second instance of the live playback stream at block 368. For example, the collaboration component 112 illustrated in FIG. 1A may receive a communication from one of the audience members connected to the second instance of the live playback stream providing the second audience member engagement experience.

According to some examples, the method includes broadcasting the received communication to all other audience members connected to the second instance of the live playback stream including a broadcaster that is the source of the live playback stream at block 370. For example, the collaboration component 112 illustrated in FIG. 1A may broadcast the received communication to all other audience members connected to the second instance of the live playback stream including a broadcaster that is the source of the live playback stream.

Figure 3G:
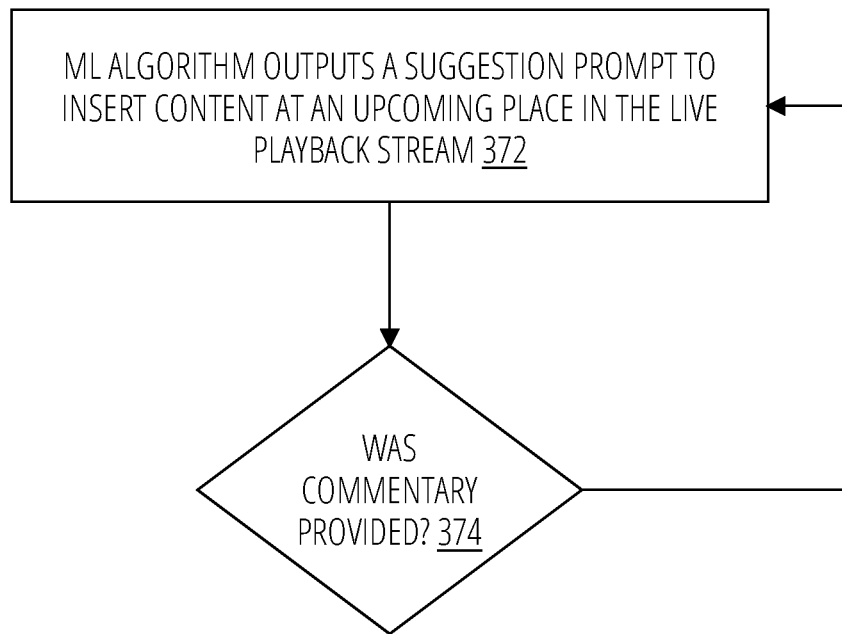

FIG. 3G illustrates an example method wherein a machine learning algorithm can provide suggestions to the host user account during a live playback stream in accordance with some aspects of the present technology.

According to some examples, the method includes providing a suggestion prompt to a host user account of the live playback stream to insert content at a place in the upcoming live playback stream at block 372. For example, the machine learning component 228 can analyze data pertaining to the media content in the live playback queue and/or data pertaining to user accounts of audience members joined to the live playback stream to determine opportunities for the host to insert content at a place in the upcoming live playback stream.

For example, the machine learning component 228 can determine that a loyal fan is one of the audience members or that a loyal fan has a birthday or just bought some merchandise from the host, and the machine learning component 228 can suggest that the host make a shout out to the loyal fan.

In another example, the machine learning component 228 can suggest advertising an item for acquisition. The machine learning component 228 can identify that media content upcoming in the live playback queue is associated with an artist for which a concert is upcoming and the machine learning component 228 can suggest that the host announce that tickets are available. In some embodiments, the machine learning component 228 can suggest that an electronic advertisement or link be presented to the audience members.

In another example, the machine learning component 228 can suggest minting an NFT on the NFT platform 242 and offering it as an item for acquisition, or offering some loyalty reward to engage audience participation in the live media stream.

In some embodiments, the suggestion prompt can include a suggested time to insert commentary or offer an item for acquisition. The suggested time could be between playback of particular media content in the live playback queue, or even at a timestamp within a media content.

According to some examples, the method further includes determining whether the commentary was provided at decision block 374. The multi-media platform 108 can track whether the commentary was provided in order to control how many prompts are offered in the future and to track the performance of advertisements made as a result of the prompts.

Figure 4:
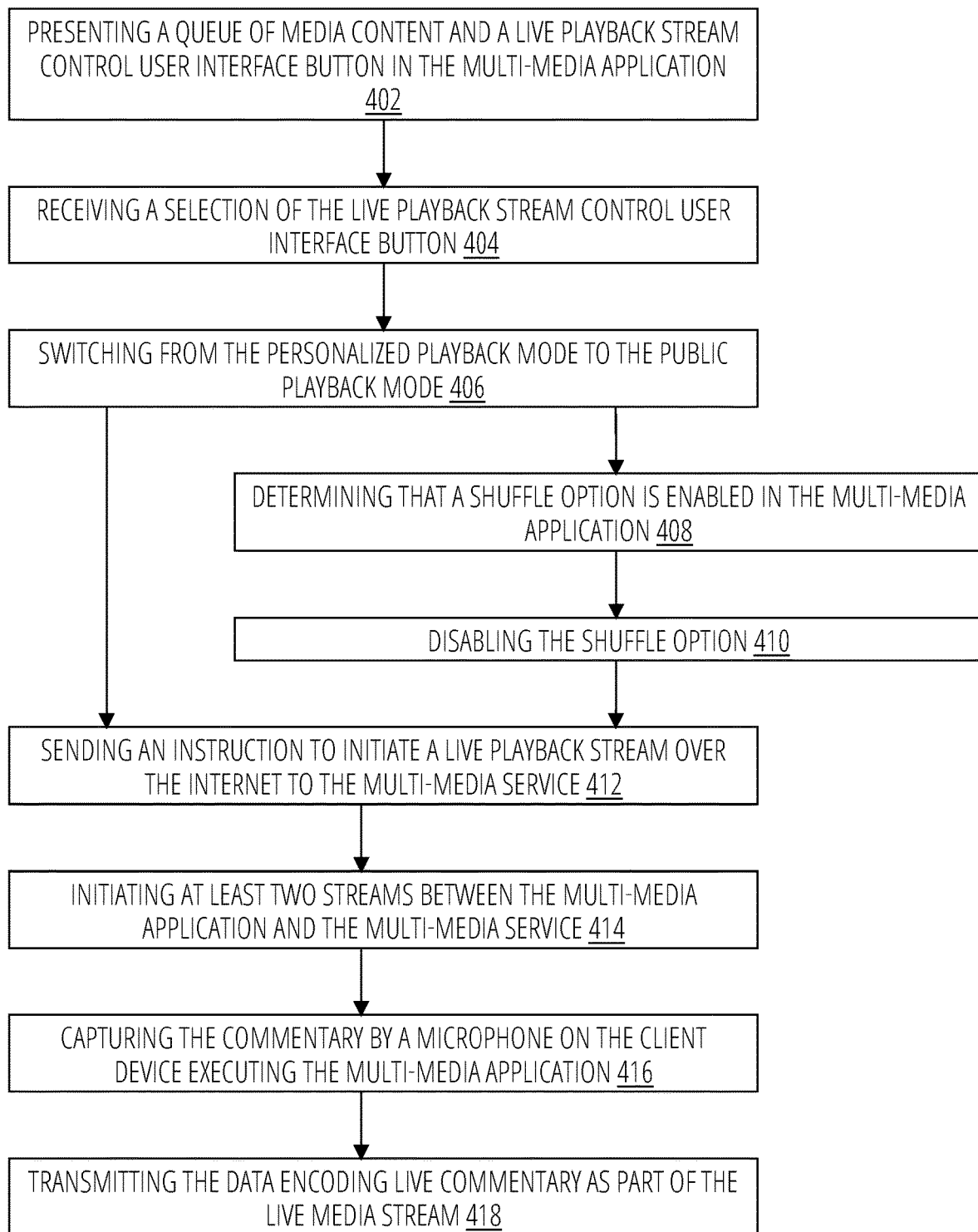
FIG. 4 illustrates an example method for producing a live playback stream by a multi-media application associated with a user account of a multi-media service in accordance with some aspects of the present technology.

FIG. 4 illustrates an example method for producing a live playback stream by a multi-media application associated with a user account of a user-media service. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures and systems described in the examples herein, although the methods may be implemented in a wide variety of other environments, architectures and systems.

According to some examples, the method includes presenting a queue of recorded media content and a live playback stream control user interface button in the multi-media application at block 402. For example, the multi-media application executing on host computing device 102 or artist computing device 224 illustrated in FIG. 2 may present a queue of media content and a public playback control user interface button in the multi-media application.

In some embodiments, the queue of media content in the multi-media application is one of at least two different queues. The two different queues can include a live playback queue and a personal playback queue. The queue of media content is a list of audio or video media content to be played. The purpose of two different queues is to allow a host 202 to be able to playback media content in their personal playback queue without interfering with the curation of the live playback queue.

According to some examples, the method includes receiving a selection of the public playback control user interface button at block 404. For example, the multi-media application executing on host computing device 102 or artist computing device 224 illustrated in FIG. 2 may receive a selection of the public playback control user interface button. The public playback control user interface button is configured to reversibly switch between a personalized playback mode and a public playback mode.

According to some examples, the method includes switching from the personalized playback mode to the public playback mode at block 406. For example, the multi-media application executing on host computing device 102 or artist computing device 224 illustrated in FIG. 2 may switch from the personalized playback mode to the public playback mode in response to receiving the selection of the public playback control user interface button. In the public playback mode the multi-media application controls public playback of media content and a source of live media during the live playback stream.

According to some examples, the method includes determining that a shuffle option is enabled in the multi-media application at block 408. For example, the multi-media application executing on host computing device 102 or artist computing device 224 illustrated in FIG. 2 may determine that a shuffle option is enabled in the multi-media application. According to some examples, the method includes disabling the shuffle option at block 410. For example, the multi-media application executing on host computing device 102 or artist computing device 224 illustrated in FIG. 2 may disable the shuffle option. In embodiments where two queues exist, the queue for the live playback stream might not even have a shuffle option. But where a shuffle option exists, it is unlikely that the host intends to have the media content be shuffled in a live playback stream. In some embodiments, rather than automatically disabling the shuffle mode, the multi-media application can display a prompt when it is determined that the shuffle option is enabled at block 408.

According to some examples, the method includes sending an instruction to initiate a live playback stream over the Internet to the multi-media platform at block 412. For example, the multi-media application executing on host computing device 102 or artist computing device 224 illustrated in FIG. 2 may send an instruction to initiate a live playback stream over the Internet to the multi-media platform.

According to some examples, the method includes initiating at least two streams between the multi-media application and the multi-media platform at block 414. For example, the multi-media application executing on host computing device 102 or artist computing device 224, illustrated in FIG. 2, may initiate at least two streams between the multi-media application and the multi-media platform. One stream is a playback control channel, and another stream is a live media stream for transmitting data encoding live commentary. The playback control channel is for transmitting an identification of a least a portion of the media content in the queue of media content and data regarding playback controls pertaining to the media content.

According to some examples, the method includes capturing the commentary by a microphone or video capture device on the client device executing the multi-media application at block 416. For example, the multi-media application executing on host computing device 102 or artist computing device 224 illustrated in FIG. 2 may capture the commentary by a microphone or video capture device.

According to some examples, the method includes transmitting the data encoding the live performance as part of the live media stream at block 418. For example, the multi-media application executing on host computing device 102 or artist computing device 224 illustrated in FIG. 2 may transmit the data encoding the live performance as part of the live media stream. The live media stream can include encoded markers as reference points along with the live performance recording. The playback control channel can reference the encoded markers to indicate where that portion of the live performance corresponds to the playback of the recorded media content.

Figure 5:
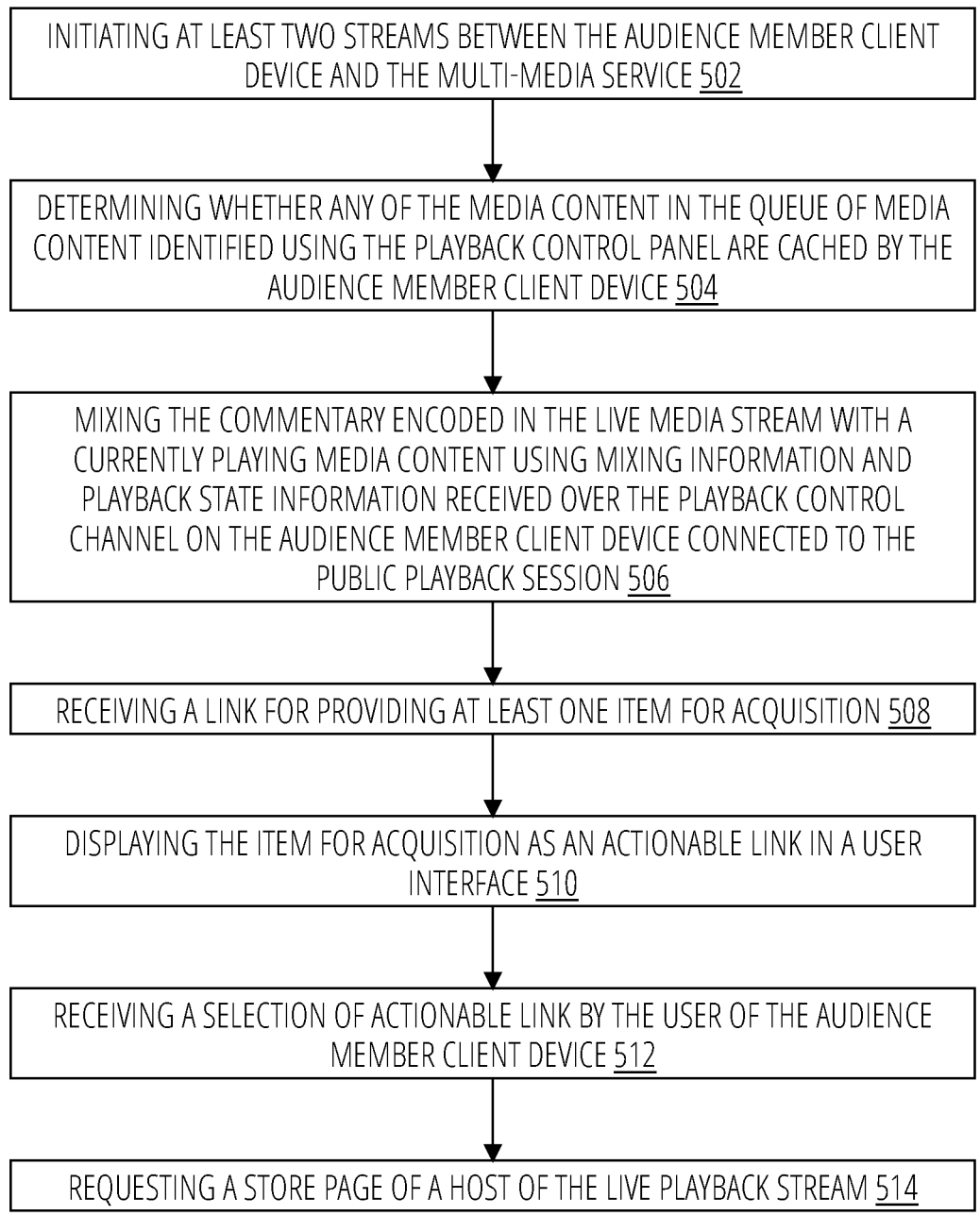
FIG. 5 illustrates an example method for connecting to a live playback stream provided by a multi-media service by an audience member client device in accordance with some aspects of the present technology.

FIG. 5 illustrates an example method for connecting to a live playback stream provided by a multi-media service by an audience member client device. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures and systems described in the examples herein, although the methods may be implemented in a wide variety of other environments, architectures and systems.

According to some examples, the method includes initiating at least two streams between the audience member client device and the multi-media platform at block 502. For example, the audience member client device 110 illustrated in FIG. 1A may initiate at least two streams between the audience member client device 110 and the multi-media platform 108. One stream is a playback control channel, and another stream is a live media stream. The live media stream is for transmitting data encoding a live performance such as commentary. The playback control channel is for transmitting an identification of a least a portion of the media content in a queue of media content and data regarding playback controls pertaining to the media content.

According to some examples, the method includes determining whether any of the media content in the queue of media content identified using the playback control channel are cached by the audience member client device at block 504. For example, the audience member client device 110 illustrated in FIG. 1A may determine whether any media content in the queue of media content identified using the playback control channel are cached by the audience member client device. When the media content are cached at the client device, the connecting client plays the media content from its cache as instructed by data in the playback control channel. When the media content are not cached at the client device, the audience member client device 110 can request the media content from the multi-media service prior to receiving an instruction to play the media content over the playback control channel.

According to some examples, the method includes multiplexing the live performance encoded in the live media stream with a currently playing media content using multiplexing information and playback state information received over the playback control channel on the audience member client device connected to the live playback stream at block 506. For example, the audience member client device 110 illustrated in FIG. 1A may multiplex the live performance encoded in the live media stream with a currently playing media content using multiplexing information and playback state information received over the playback control channel on the audience member client device connected to the live playback stream.

According to some examples, the method includes receiving a link for providing at least one content for acquisition at block 508. For example, the audience member client device 110 illustrated in FIG. 1A may receive a link for providing at least one content for acquisition.

According to some examples, the method includes displaying the content for acquisition as an actionable link in a user interface at block 510. For example, the audience member client device 110 illustrated in FIG. 1A may display the content for acquisition as an actionable link in a user interface.

According to some examples, the method includes receiving a selection of an actionable link by the user of the audience member client device at block 512. For example, the audience member client device 110 illustrated in FIG. 1A may receive a selection of the actionable link by the user of the audience member client device.

According to some examples, the method includes requesting a landing page at block 514. For example, the audience member client device 110 illustrated in FIG. 1A may request a landing page. In some embodiments, the landing page is hosted by an e-commerce platform.

Figure 6A:
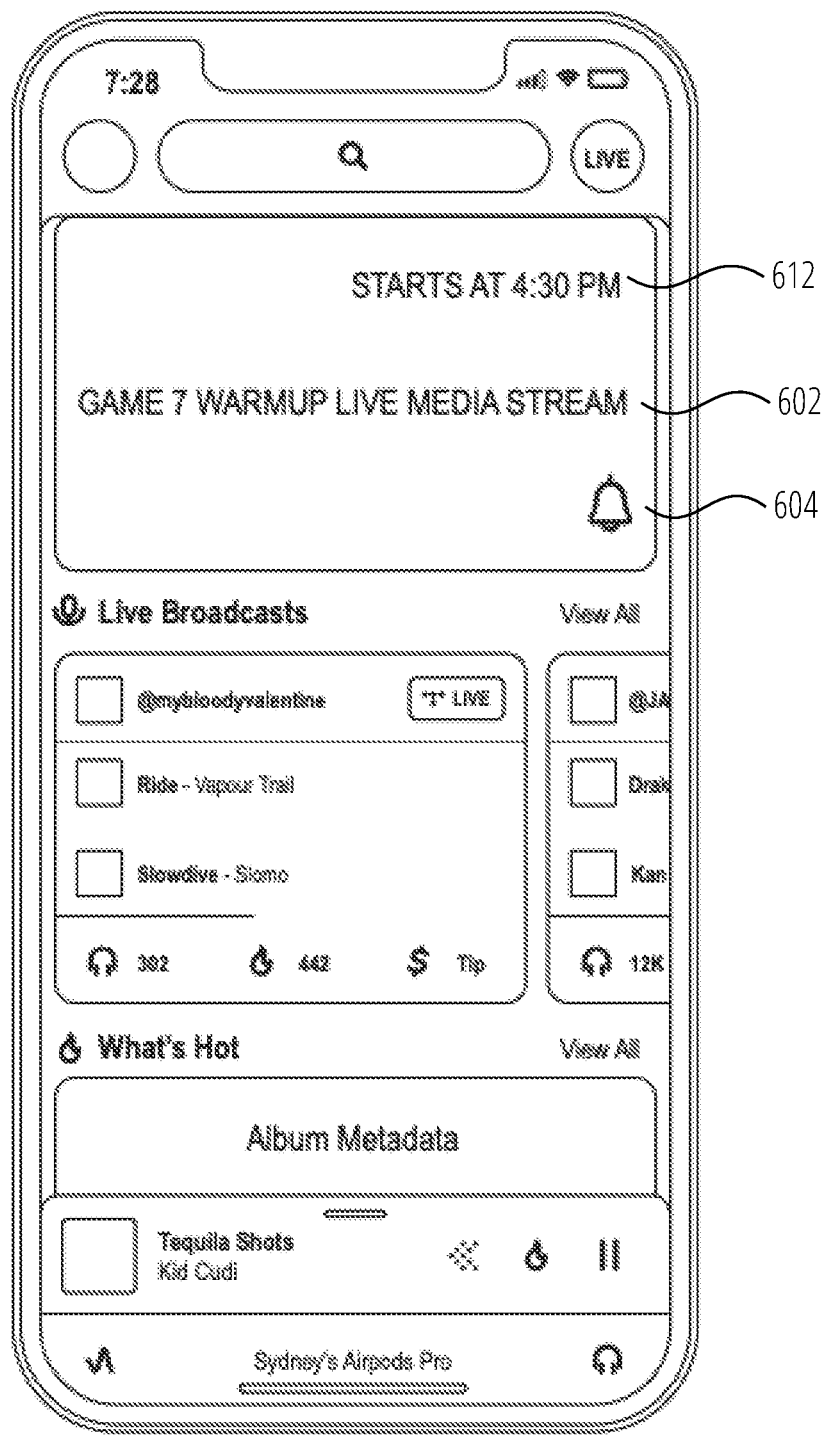
FIG. 6A and FIG. 6B illustrate example user interfaces of the multi-media application pertaining to a live playback stream in accordance with some aspects of the present technology.
Figure 6B:
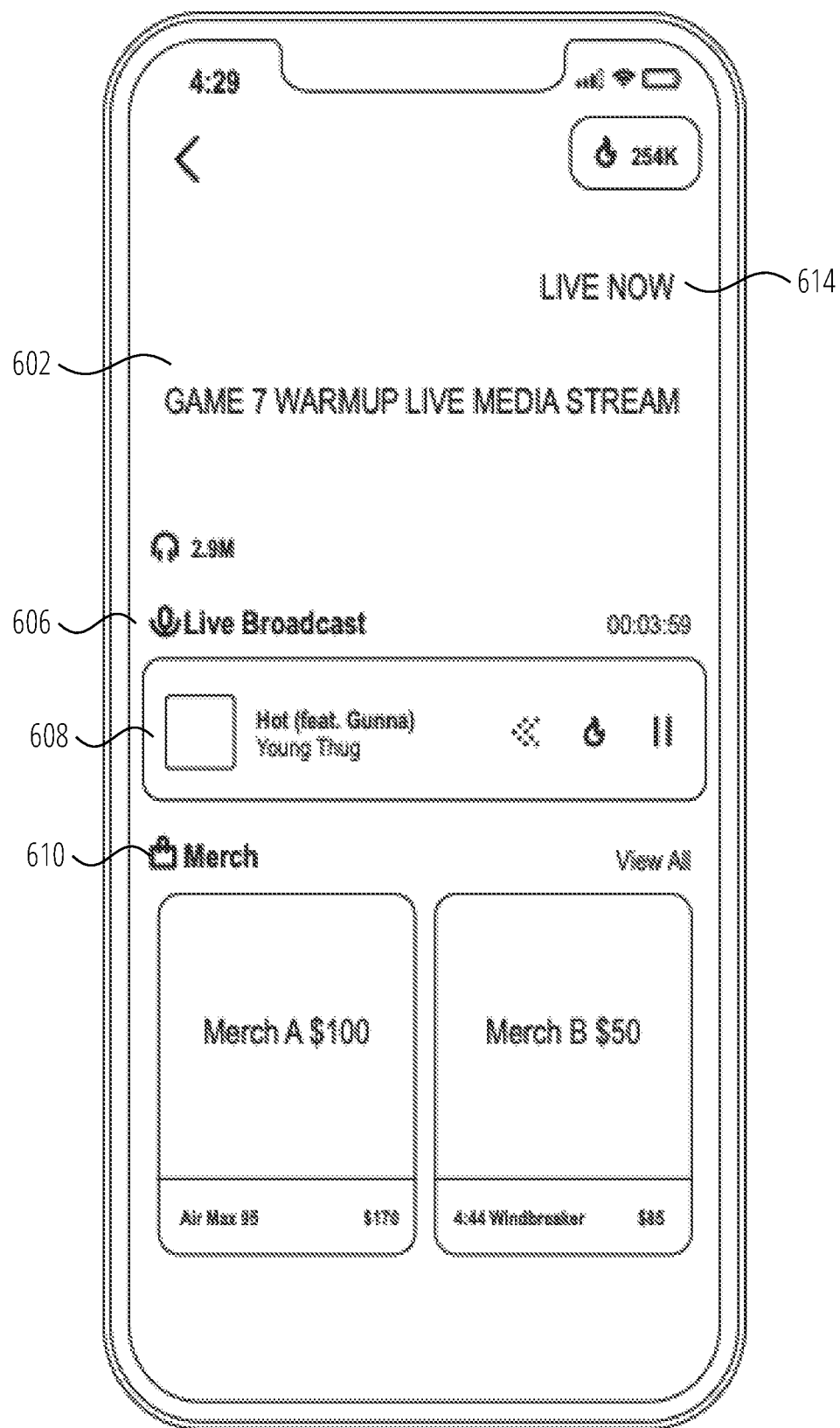

FIG. 6A and FIG. 6B illustrate example user interfaces of multi-media application 106 pertaining to a live playback stream. In FIG. 6A a particular live playback stream 602 is advertised to begin shortly 612. User interface in FIG. 6A can present a selectable user interface option 604 wherein an audience member can select the option 604 in order to subscribe to alerts pertaining to the upcoming live playback stream.

FIG. 6B illustrates an example user interface of multi-media application 106 as the live media stream 602 is currently playing 614. As illustrated in FIG. 6B the multi-media application 106 can present audience statistics 606, a currently playing media content 608, and can also present items available to purchase such as merchandise 610 offered for sale by the host user account.

In some embodiments, host user account can announce that they will host a live media stream to begin at a scheduled time. Once the live media stream has begun, an audience member can connect to the live media stream. In some embodiments, the audience member does not need to have an account with the multi-media platform 108 and might not have the multi-media application 106 downloaded on their audience member client device 110. In such embodiments the multi-media application 106 can be run in a web browser to gain access to the live media stream. During the live media stream the host user account can control playback of recorded media content and can also provide a live performance such as commentary.

The audience member can also interact with the host through one or more communication platforms. For example the audience member can chat, text, or conference with the host.

Figure 7A:
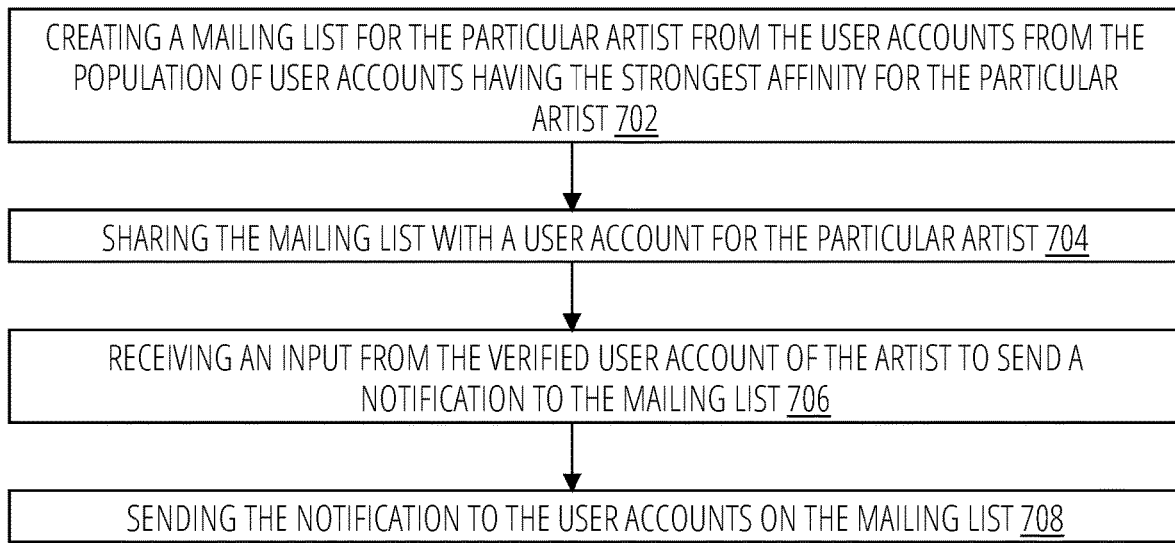
FIG. 7A and FIG. 7B illustrate an example method for engaging fans of artist accounts in accordance with some aspects of the present technology.
Figure 7B:
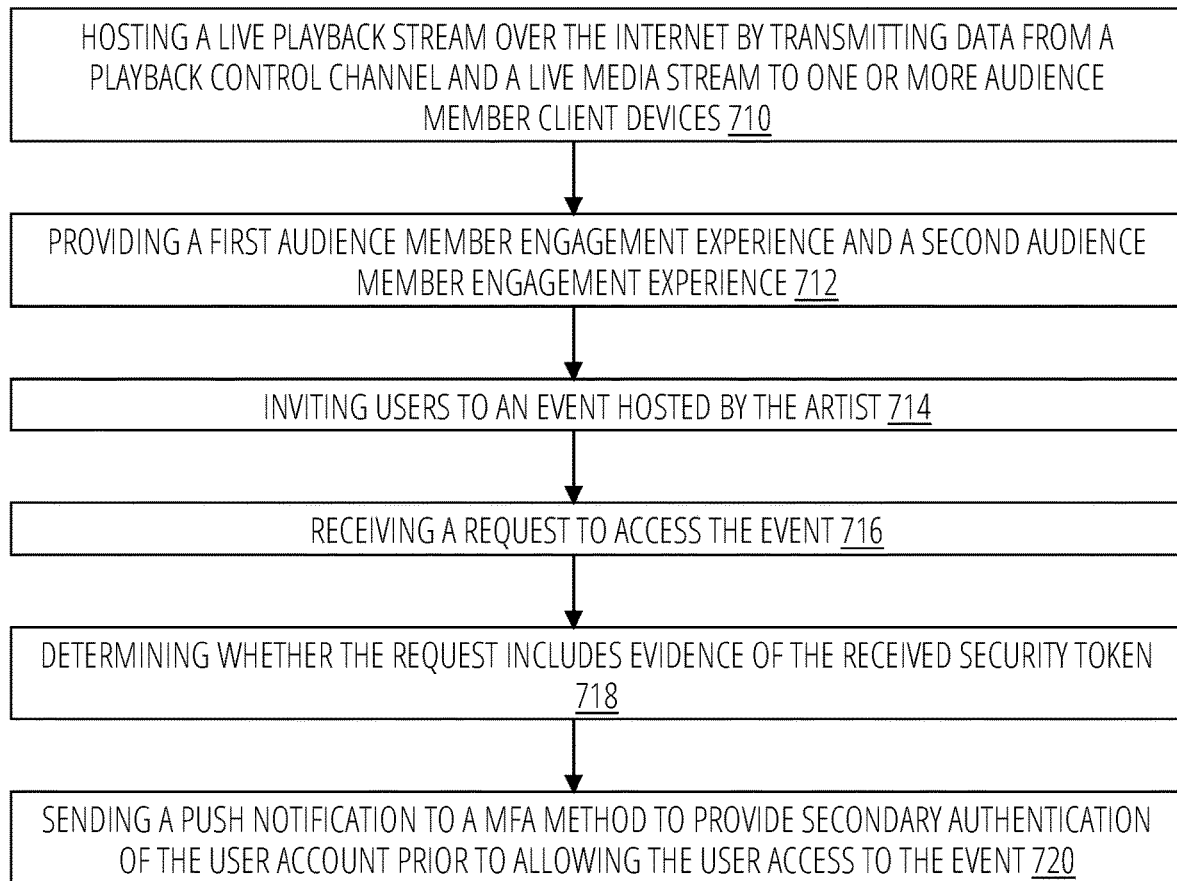

FIG. 7A and FIG. 7B illustrate an example method for engaging fans of artist accounts. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures, and systems described in the examples herein, although the methods may be implemented in a wide variety of other environments, architectures and systems.

The present technology aims to provide a service with a low amount of friction for artists to engage with fans. As described above, the present technology provides for hosting live playback streams where artists can showcase their recorded media content and otherwise engage with fans.

In addition to engaging with fans, artists would also like to receive metrics regarding the users connected to their live playback streams. In some embodiments, artists would further like to be able to contact their fan base outside of informing them of live playback streams. In some embodiments, the ability to communicate with users that have user accounts with the multi-media platform 108 that are fans of an artist account can be valuable enough that the artist accounts might be willing to share portions of the royalty payouts that the multi-media platform 108 makes to the artist accounts for the playback of their recorded media content.

FIG. 7A illustrates an example of creating a mailing list for an artist account.

According to some examples, the method includes creating a mailing list for the particular artist from the user accounts from the population of user accounts having the strongest affinity for the particular artist at block 702. For example, the multi-media platform 108 illustrated in FIG. 1A may create a mailing list for the particular artist from the population of user accounts with the strongest affinity for the particular artist.

According to some examples, the method includes sharing the mailing list with a user account for the particular artist at block 704. For example, the multi-media platform 108 illustrated in FIG. 1A may share the mailing list with a user account for the particular artist. The user account for the particular artist is an artist account. Data from the mailing list can identify the user accounts in the mailing list by an anonymous ID or by a public user name. Contact information and personal identifying information are not shared with the particular artist.

According to some examples, the method includes receiving an input from the verified user account of the artist to send a notification to the mailing list at block 706. For example, the multi-media platform 108 illustrated in FIG. 1A may receive an input from the verified user account of the artist to send a notification to the mailing list.

According to some examples, the method includes sending the notification to the user accounts on the mailing list at block 708. For example, the multi-media platform 108 illustrated in FIG. 1A may send the notification to the user accounts on the mailing list. The notification includes a security token. The notification is sent to the users of the user accounts using a communication channel preference stored with respect to the user account.

FIG. 7B illustrates an example method of providing differentiated levels of engagement for some users, especially users that are loyal users.

According to some examples, the method includes providing additional user engagement options at block 710. For example, the collaboration component 112 illustrated in FIG. 1A may provide additional user engagement options, including sending chat messages to the broadcaster. In some embodiments, the event is a special live playback stream that the artist account uses to provide an intimate live performance to a select subset of fans.

According to some examples, multi-media platform 108, illustrated in FIG. 1A, may collect information associated with user accounts to identify top fans of an artist account. The information associated with user accounts can include media content preference information, social channel information, and/or purchase information. The media content preference information is derived from explicit data provided by user inputs indicating an affinity for an artist or a media content and implicit data such as playback data and engagement data, including skip counts, play counts, and purchases. The social channel information is received from one or more social platforms and can include data about social contacts and follower information, topic engagement, and content engagement. The purchase information can be received from one or more payment networks indicating spending pertaining to engagement with media content or artists. The media content preference information can be used to identify the loyal users segment of users. A loyal user can be a user account that demonstrates a high affinity for the artist or one of the recorded media content performed by the artist. A loyal user can also be a user account that demonstrates a high level of engagement with an artist by joining the most live playback streams, buying the most merchandise, or hosting live playback streams that feature the artist.

According to some examples, the method includes inviting users to an event hosted by the artist account at block 714. For example, the collaboration component 112 illustrated in FIG. 1A may invite loyal users to an event hosted by the artist account. In some embodiments, the invitation can include a security token to ensure that only the invited user account can join the event. In some embodiments, the event is a live chat or video conference. In some embodiments, the event is a special live playback stream that the artist account uses to provide an intimate live performance to a select subset of fans. The event can occur within or outside the multi-media platform such as a social media platform, video conferencing platform, chat platform, etc.

According to some examples, the method includes receiving a request to access the event at block 716. For example, the collaboration component 112 illustrated in FIG. 1A may receive a request to access the event.

According to some examples, the method includes determining whether the request includes a received security token at block 718. For example, the collaboration component 112 illustrated in FIG. 1A may determine whether the request includes the received security token. The security token can be used to ensure that any invitations are not shared outside of the user account that has been invited to the event.

According to some examples, the method includes sending a push notification to a MFA component to provide secondary authentication of the user account prior to allowing the user access to the event at block 720. For example, the collaboration component 112 illustrated in FIG. 1A may send a push notification to a MFA component to provide secondary authentication of the user account prior to allowing the user access to the event.

As described herein, certain examples have been given wherein an artist account can have additional privileges for hosting live playback streams that may not be available to general user accounts hosting live playback streams. However, the present technology acknowledges that some general user accounts may be so successful at hosting live playback streams that they generate a significant following. Accordingly, in some embodiments, the present technology can identify general user accounts for promotion to become an artist account even though that account may not be associated with any recorded media content other than archives of past live playback streams. For example, multimedia platform 108 can determine that one or more past live playback streams from a general user account had a popularity above a threshold. The popularity above a threshold can be a number of audience member accounts connected to the live playback stream. In some embodiments, the popularity above a threshold may be required to be maintained over some number of playback streams to ensure that the number of connected accounts is not somehow artificially inflated.

Figure 8:
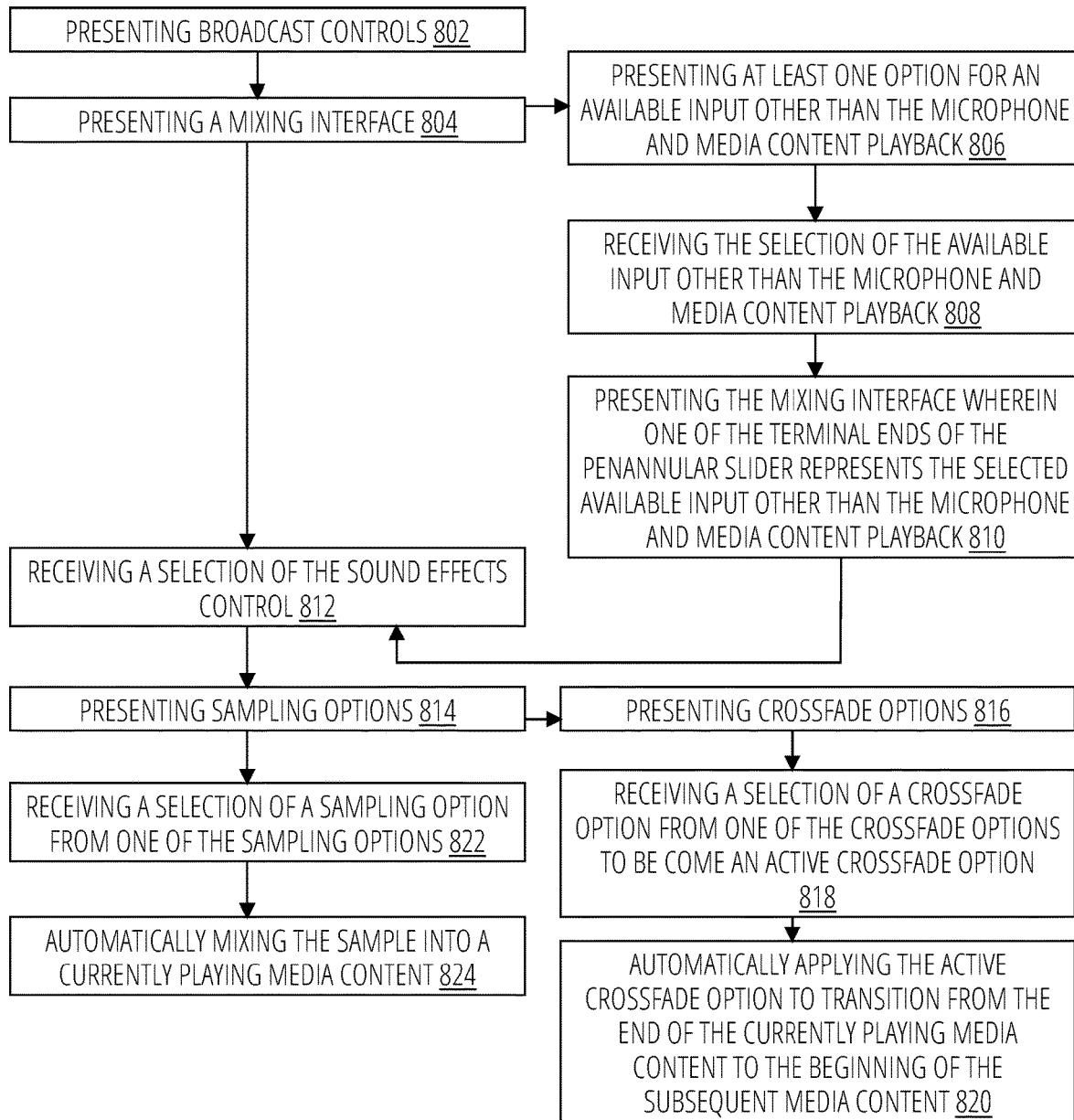
FIG. 8 illustrates an example method for presenting one or more user interfaces associated with live playback streams in accordance with some aspects of the present technology.

FIG. 8 illustrates an example method for presenting one or more user interfaces associated with live playback streams. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures, and systems described in the examples herein, although the methods may be implemented in a wide variety of other environments, architectures and systems.

According to some examples, the method includes presenting broadcast controls at block 802. For example, the multi-media application may present live playback stream controls such as illustrated in FIG. 9B. The live playback stream controls include at least an input switching control 930, a microphone control 906, a sound effects control 928, and listener statistics 912.

According to some examples, the method includes presenting a mixing interface at block 804. For example, the multi-media application may present a mixing interface 920 illustrated in FIG. 9B. The mixing interface includes a penannular slider 920 about a source toggle 906. As illustrated in FIG. 9B, the source toggle is a microphone source 906.

The penannular slider 920 is configured to accept an input to drag an indicator 922 about the penannular slider. A first terminal end 926 of the penannular slider is configured to cause a majority of audio to come from a microphone input. A second terminal end 924 of the penannular slider is configured to cause a majority of audio to come from playback of the media content. Locations between the first terminal end and the second terminal end are configured to mix audio from the microphone source and the playback of media content according to respective distances from each of the terminal ends such that the closer the indicator is to the first terminal end 926, the greater the volume from the microphone source compared to the playback of media content. The closer the indicator is to the second terminal end 924, the greater the volume from the playback of media content compared to the microphone source.

According to some examples, the method includes presenting at least one option for an available input other than the microphone and recorded media content playback at block 806. For example, the multi-media application may present at least an input switching control 930 to select an available input other than the microphone and recorded media content playback.

According to some examples, the method includes receiving the selection of the available input other than the microphone and recorded media content playback at block 808. For example, the multi-media application may receive the selection of the available input other than the microphone and recorded media content playback. Responsive to receiving a selection of the input switching control, the method includes presenting the mixing interface wherein one of the terminal ends of the penannular slider 920 represents the selected available input other than the microphone and recorded media content playback at block 810. For example, the multi-media application may present the mixing interface wherein one of the terminal ends of the penannular slider 920 represents the selected available input other than the microphone and recorded media content playback.

According to some examples, the method includes receiving a selection of the sound effects control at block 812. For example, the multi-media application may receive a selection of the sound effects control 928 illustrated in FIG. 9B.

Responsive to the selection of the sound effects control, the method includes presenting sound effects options at block 814. For example, the multi-media application may present sound effects options 934 illustrated in FIG. 9C. In some embodiments, the sound effects can include a collection of samples.

According to some examples, the method includes receiving a selection of a sample from the sound effects options at block 822. For example, the multi-media application may receive a selection 936 of a sampling option from one of the sampling options.

According to some examples, the method includes automatically mixing the sample into a currently playing media content at block 824. For example, the multi-media application may automatically mix the sample into a currently playing media content.

According to some examples, the method includes presenting transition options at block 816. For example, the multi-media application may present transition options 944 as illustrated in FIG. 9D.

According to some examples, the method includes receiving a selection of a crossfade option from one of the transition options at block 818. For example, the multi-media application may receive a selection of a crossfade option from one of the transition options. An active crossfade option 942 is illustrated in FIG. 9D.

According to some examples, the method includes automatically applying the active crossfade option to transition from the end of the currently playing media content to the beginning of the subsequent media content at block 820. For example, the multi-media application may automatically apply the active crossfade option to transition from the end of the currently playing media content to the beginning of the subsequent media content. At a transition from a currently playing media content to a subsequent media content.

Figure 9A:
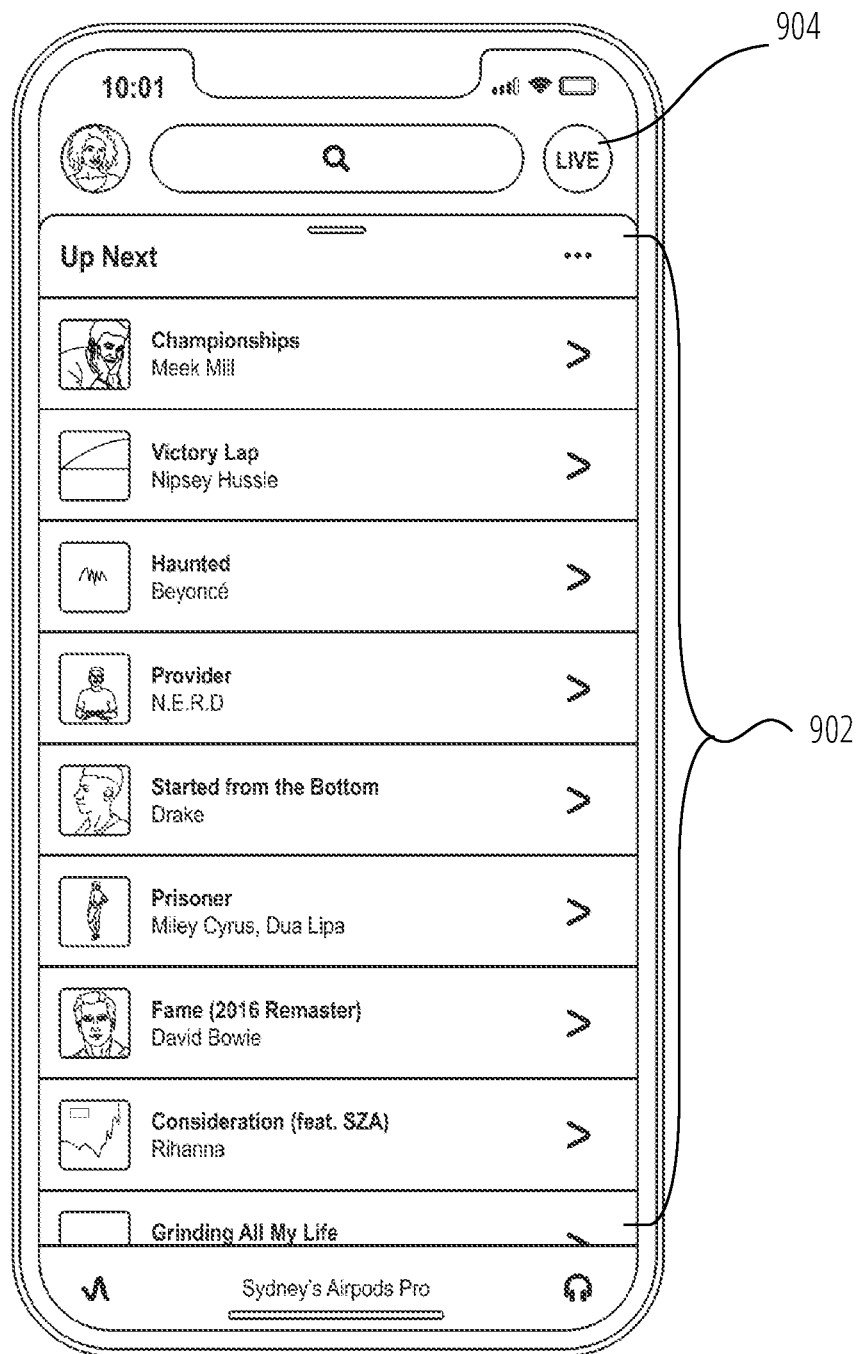
FIG. 9A illustrates an example streaming service user interface of a multi-media application in accordance with some aspects of the present technology.
Figure 9B:
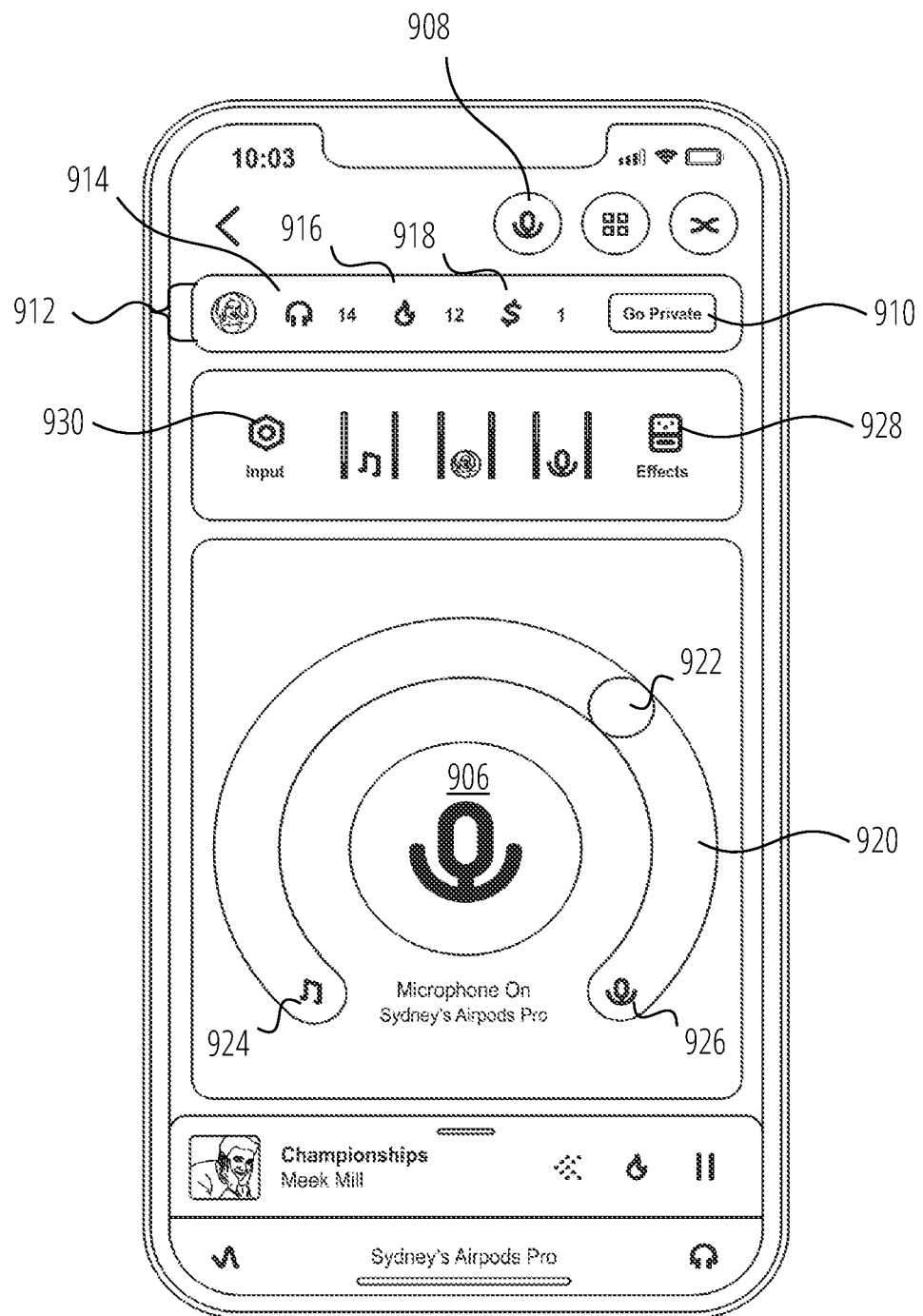
FIG. 9B illustrates an example live playback session management user interface in accordance with some aspects of the present technology.

FIG. 9A illustrates an example streaming service user interface of a multi-media application, according to an embodiment of the present subject matter. As illustrated in FIG. 8A, the playback queue 902 contains a list of media content to be played back. A user of a user account of the multi-media platform 108 can select recorded media content (displayed using metadata, such as artist name, song name, album cover, lyrics, genre, descriptive data, etc.) to populate the playback queue 902 to prepare for a live playback session. When the user of the user account is ready to initiate the live playback session the user can select the live user interface button 904.

In some embodiments, the user interface can be presented via a multi-media application on the host computing device 102, a web browser on the host computing device 102, and/or the like, as a web interface, mobile interface, an instant application, or a progressive web application. In some embodiments, the user interface includes a media player to play media content, such as text, still images, video, and audio, etc. The media player can include graphical elements that, when selected, cause media playback or viewing functions, such as play, pause, stop, skip, etc. A user may select the graphical elements in any appropriate manner, such as a mouse click, a keyboard input, a touch input, a voice input, etc. In some embodiments, media player includes output elements, such as a "now playing" window, that show information about the recorded media content that the media player is currently playing. In some embodiments, the media player includes playback controls, playlist information, and a now playing window. In some embodiments, the media player is capable of displaying other information, such as images (e.g., album art), text (e.g., lyrics), scrolling and/or synchronized text (e.g., karaoke display), videos (e.g., music videos), and the like. Different combinations of media player controls, including different, more, or fewer controls are also possible. Moreover, the type of media player functionalities may change depending on the type of recorded media content being played back.

In some embodiments, a host user may request playback of a media content, e.g., a song. Other audience members subscribing to the host user's live playback stream can experience the playback controlled by the host user. The audience members can "react" to the song choice or initiate communication with the host user in a window, e.g., interstitial (not shown) associated with the user interface. In some embodiments, the user can react by sending a "like" (on fire icon) and sending monetary tips to the host. In some embodiments, the host can modify playlists or otherwise engage with the other users. In some implementations, the other users can be ranked based on "loyal" status. Accordingly, in some examples, the user is able to assign incentives or reactions to the other users, either in the same window or separate window as communication messages.

FIG. 9B illustrates a live playback session management user interface. As illustrated in FIG. 9B, a user can select the live playback session management user interface button 908 to navigate to the session management user interface illustrated in FIG. 9B. The system management user interface includes a menu of listener statistics 912. The listener statistics 912 can include a number of listeners 914, a number of likes 916, and tips 918. The tips can be financial rewards. The management user interface also includes a private listening mode user interface button 910. The private listening mode user interface button 910 can be used by a host to terminate the live playback session.

In some embodiments, the management user interface also includes an interface for mixing multiple sources. As illustrated in FIG. 9B, the interface is a penannular slider 920 where the slider control 922 can be manipulated to move towards media playback source 924 or to the second input source 926. The closer the slider is to one of the sources, the louder that particular source is relative to the other source.

As illustrated in FIG. 9B, the second input source 926 is a microphone. However, a user can select button 930 for the input menu to select other sources. Additionally, a host can add various effects to be mixed in with recorded media content. These effects can be selected from the effects menu button 928.

Figure 9C:
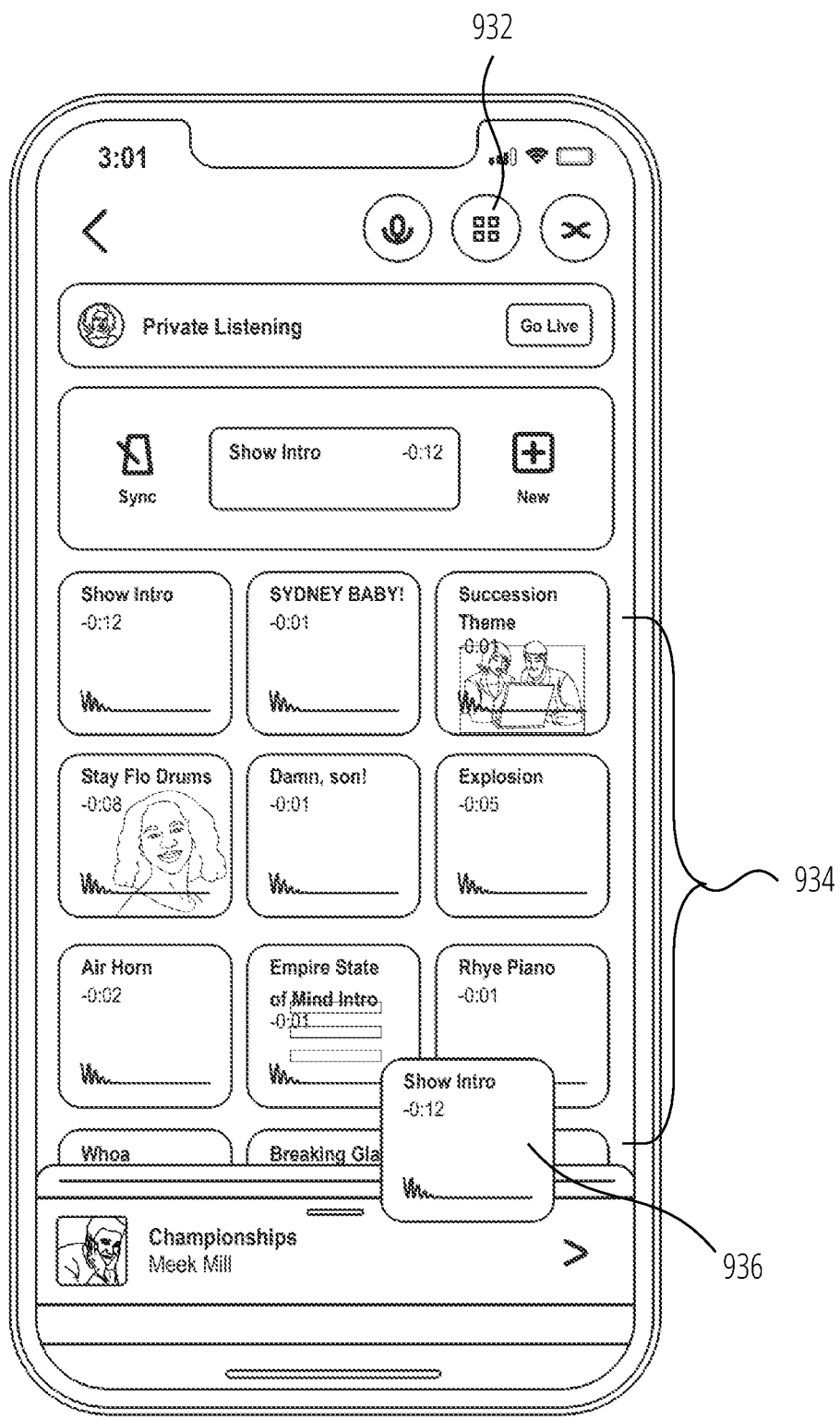
FIG. 9C illustrates an example sound effects menu page in accordance with some aspects of the present technology.
Figure 9D:
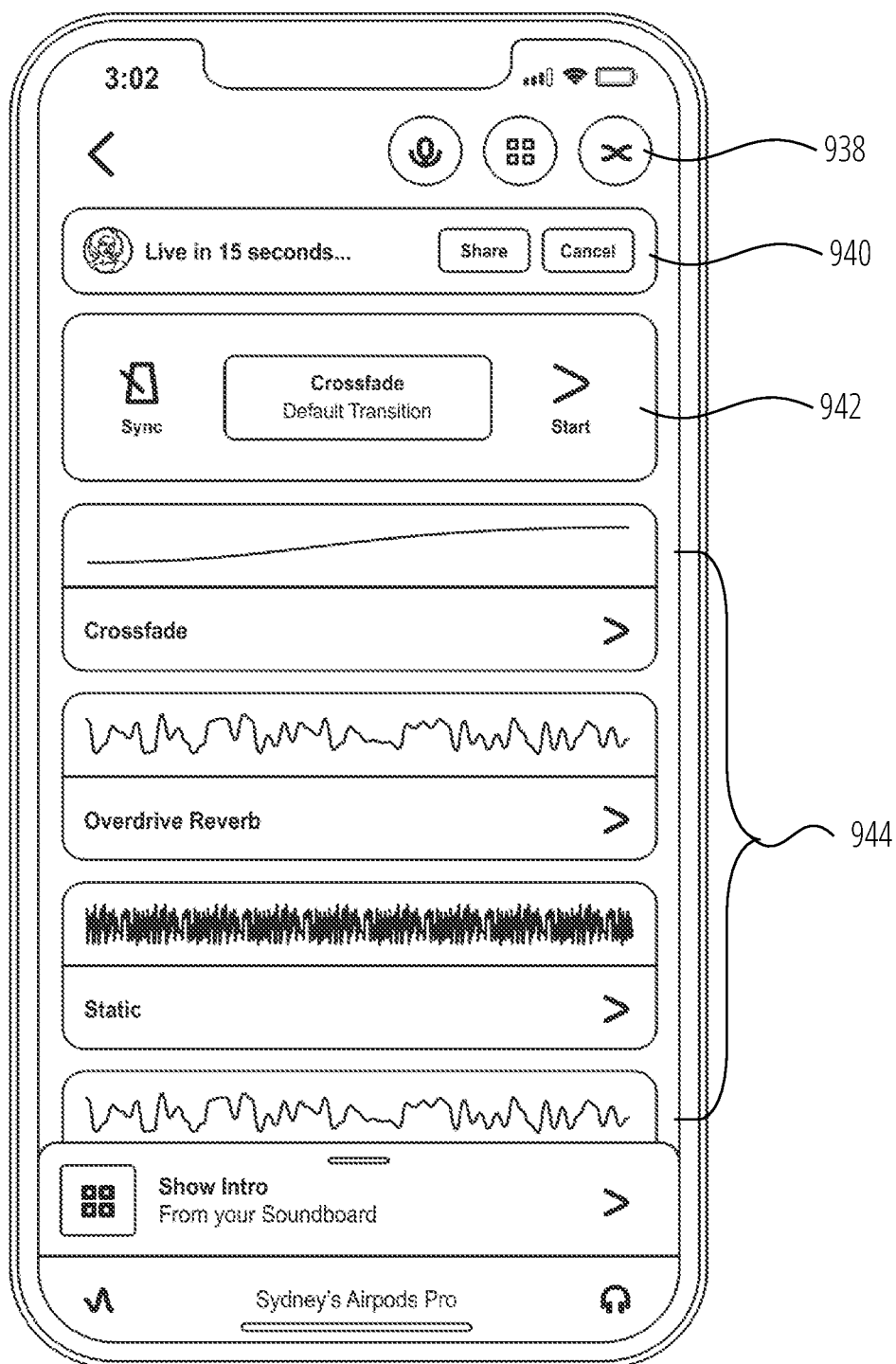
FIG. 9D illustrates a user interface for selecting transition options in accordance with some aspects of the present technology.

FIG. 9C illustrates an example sound effects menu page. A user can navigate to the sound effects menu page by selecting the samples menu navigation button 932. The sound effects menu page includes a samples menu 934. A user can select one of the samples such as selected sample 936 and the sample can be automatically mixed into a recorded media content selected for playback.

FIG. 9D illustrates a user interface for selecting transition options. The user can navigate to this page by selecting the transition option menu navigation button 938. As shown in FIG. 9D the user can select from a menu of transitions 944. In FIG. 9D, a crossfade transition has been selected. The transition can be applied between the playback of two different media content. In some embodiments, the user can select when the transition can begin using the start transition user interface button 942.

The user can also initiate or cancel a live media session using the live playback stream controls 940.

In some embodiments, the user can apply "mix rules" to each of the songs that apply effects to the media content (e.g., flanger, reverb, delay/echo, etc.), generate mixes of the media (e.g., overlays of multiple content items or samples thereof, overlays of additional instruments or sounds, cross-fades between content items, etc.), and adjust playback attributes of the media (e.g., volume, equalizer settings, etc.) based on user selections or system generated rules for playback and/or distribution of the mixed content.

The mix rules can change based on social graphs (e.g., what nearby users, friends, family, or other related users) are using. Mix rules can also be based on how other songs with a similar "fingerprint" have been mixed. "Fingerprinting" is defined herein as converting an unknown music sample, represented as a series of time-domain samples, to a match of a known song, which may be represented by a song identification (ID). The song ID may be used to identify metadata (song title, artist, etc.) and one or more recorded tracks containing the identified song (which may include tracks of different bit rate, compression type, file type, etc.). The term "song" refers to a musical performance as a whole, and the term "track" refers to a specific song in a digital file. Note that, in the case where a specific musical composition is recorded multiple times by the same or different artists, each recording is considered a different "song". The term "sample" refers to audio content presented as a set of digitized samples. A music sample may be all or a portion of a track, or may be all or a portion of a song recorded from a live performance or from an over-the-air broadcast.

In some embodiments, the multi-media platform 108 can provide a dashboard, or an information management tool that enables the artist 222 to visually track, analyze, and/or display key performance indicators (KPI), metrics, and/or key data points to monitor the health of a business, department, or specific process. In some examples, the user interface can be presented via a point-of-sale application (e.g., associated with a payment processing service offered by the service provider) and/or another application associated with a service provided by the service provider. In some examples, the user interface can be presented via a user-facing messaging application. In some embodiments, the functional component configured to present the user interface can obtain communications and/or other data from one or more customer-facing services/platforms and/or communication channels. In some examples, the user interface can be associated with actuation mechanism(s) that enable the user to navigate to other functional component(s) associated with service(s) available via the service provider. In some examples, by actuating one of the actuation mechanism(s), the application, web browser, and/or the like can navigate to a functional component associated with the corresponding service. In some examples, another application or web page can open to provide access to the corresponding service.

In some examples, the user interface can include a section that can present information relevant to the user. In some examples, the section can include activity, KPIs, and/or the like. In some embodiments, the user interface can include one or more elements, which can include text, images, pictures, videos, and/or the like to enable the user to navigate to other functional components, such as an electronic calendar user interface, a consolidated communication user interface, a help user interface, and/or the like. In some embodiments, the content and/or configuration of content associated with the user interface can be customizable to meet the specific needs of the user.

In some embodiments, the one or more elements can be associated with respective actuation mechanisms, such that an input associated with one of the one or more elements can cause a corresponding user interface, or portion thereof, to be presented via the user interface, or a portion thereof.

Figure 10:
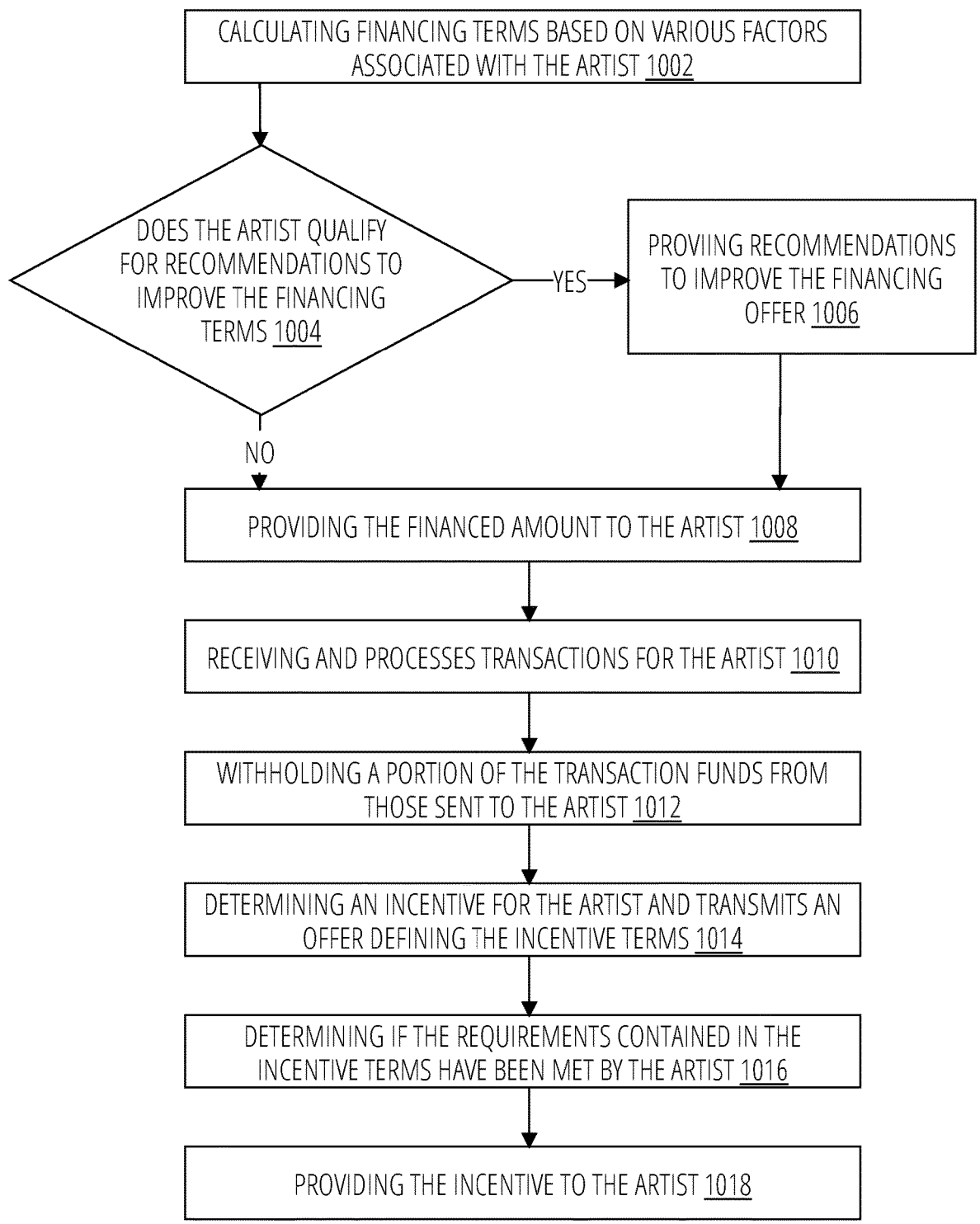
FIG. 10 is a block diagram of an example method for enabling artist financing, reevaluating terms and/or repayment of the financing, and providing an incentive to the artist in accordance with some aspects of the present technology.

FIG. 10 is a block diagram of an example method for enabling artist financing, reevaluating terms and/or repayment of the financing, and providing an incentive to the artist. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures, and systems described in the examples herein, although the methods may be implemented in a wide variety of other environments, architectures, and systems.

According to some examples, the method illustrated in FIG. 10 includes calculating financing terms based on various factors associated with the artist at block 1002. For example, the financing engine 214 illustrated in FIG. 2 may calculate financing terms based on various factors associated with the artist. For example, as described above, some of these factors can be based, in part, on financial transactions conducted by the artist through the payment processing service 220 or by using data/metrics to determine predictors of future success of a media content (using media content value component 204) to provide a cash advance to artists or similar artists for a purpose to which the funds are being used (if provided by the artist), a score associated with their digital rights (in comparison to what other right holders hold, sole author of the song or not), a loyalty score associated with the churn of fans (existing vs new fans), third-party data relating to artist content, the number of artists associated with the track and whether they have requested funds as well, their ability to collect payments via merchandize, tips, tickets, royalties, time-based number of streams (daily, monthly, yearly), engagement during live streams, etc. In some examples, the financing terms are based on the ownership model of the artist and what revenues they will get as dictated by the model and accordingly how soon/late can the loan provider be reimbursed for extending loans as a result of the ownership model. The financing terms may include, for example, a financing amount, a fee for the financing (e.g., a percentage of the amount financed or a fixed fee), and a rate for repayment for the amount financed and the fee (e.g., an amount to be withheld from financial transactions processed for the artist through the payment processing service 220).

According to some examples, the method illustrated in FIG. 10 includes determining whether the artist account qualifies for recommendations to improve the financing terms at decision block 1004. For example, the financing engine 214 can determine one or more actions that the artist could take that would make the financing offer less risky, and if such actions exist, the financing engine 214 can determine that the artist qualifies for recommendations to improve the financing terms. For example, if the artist account has enough followers, the artist account could qualify for improved financing terms if they were to do a promotion with their fans to increase sales.

According to some examples, the method illustrated in FIG. 10 includes providing recommendations on actions that the artist could take to improve the financing terms when it was determined that the artist account qualifies for such offers at block 1006. For example, the financing engine 214 can provide recommended actions that the artist could take to improve the financing terms when it was determined that the artist account qualifies for such offers. For example, financing engine 214 could suggest engaging with fans to do a promotion or offering a targeted engagement with super fans, etc.

According to some examples, the method illustrated in FIG. 10 includes providing the financed amount to the artist at block 1008. For example, the financing engine 214 illustrated in FIG. 2 may provide the financed amount to the artist. For example, the payment processing system may transmit the funds via wire transfer, deposit the funds in a financial account associated with the artist, submit to a peer-to-peer account, and automatically route the funds to an artist's purpose, such as instrument financing or studio booking, or the like.

According to some examples, the method illustrated in FIG. 10 includes receiving and processing transactions for the artist at block 1010. For example, the financing engine 214 illustrated in FIG. 2 may receive and processes transactions for an artist. For example, as described elsewhere herein, the payment processing system may process financial transactions between the artist and customers/streaming users/labels/publishers, e.g., when the artist is paid for their media content, merchandise, concert performances, etc.

According to some examples, the method illustrated in FIG. 10 includes withholding a portion of the transaction funds from those sent to the artist at block 1012. For example, the payment processing service 220 illustrated in FIG. 2 may withhold a portion of the transaction funds from those sent to the artist. For example, for each streaming revenue collected, the server 102 may withhold 10% for repayment of the amount financed according to the calculated loan terms and send the remaining revenue to the artist. In another implementation, the server 102 can obtain revenues through other artist-related acquisition channels, such as merchandise sales, concert tickets, etc.

According to some examples, the method illustrated in FIG. 10 includes determining an incentive for the artist and transmitting an offer defining the incentive terms at block 1014. For example, the service provider or 204 illustrated in FIG. 2 may determine an incentive for the artist and transmit an offer defining the incentive and an action required of the merchant to receive the incentive (e.g., a performance target). For example, as described elsewhere herein, the incentive terms may include the action to be performed by the merchant as well as when and what incentive will be provided in exchange for the artist's actions.

According to some examples, the method illustrated in FIG. 10 includes determining if the artist has met the requirements contained in the incentive terms at block 1016. For example, the service provider or financing engine 214 illustrated in FIG. 2 may determine if the artist has met the requirements contained in the incentive terms. In some embodiments, the financing engine 214 may track an artist's activities until the requirements have been met. For example, the financing engine 214 may monitor the transactions processed for the merchant through the payment processing service 220 to determine if the volume of transactions has increased according to the incentive terms.

According to some examples, the method illustrated in FIG. 10 includes providing the incentive to the artist when the artist has met the requirements contained in the incentive terms at block 1018. For example, the payment processing service 220 illustrated in FIG. 2 may provide the artist incentive when the requirements in the incentive terms have been met.

In some implementations, the financial offers are associated with specific recorded media content. Furthermore, in some examples, the services illustrated in FIG. 2 allow third-party APIs/SDKs to be exposed to multi-media platform 108 to obtain streaming data. In some embodiments, the lending infrastructure is implemented using smart contracts and/or DeFi technologies. In some implementations, the lending provider can be a crowdsourced entity where the artist's audience can be invested in the album, e.g., by gaining interest in the royalty model. In some implementations, an artist can be associated with multi-media platform 108 through their artist account. The lending provider can be the financing engine 214 or an entity that can generate a financial offer backed by an NFT in the media content. The financial offer can be disbursed into a P2P account associated with the multi-media platform 108, and the artist can be given a payment instrument unique to artists and with media-specific rewards and functionalities, with additional rewards that influence spend into a server ecosystem that supports music.

Figure 11:
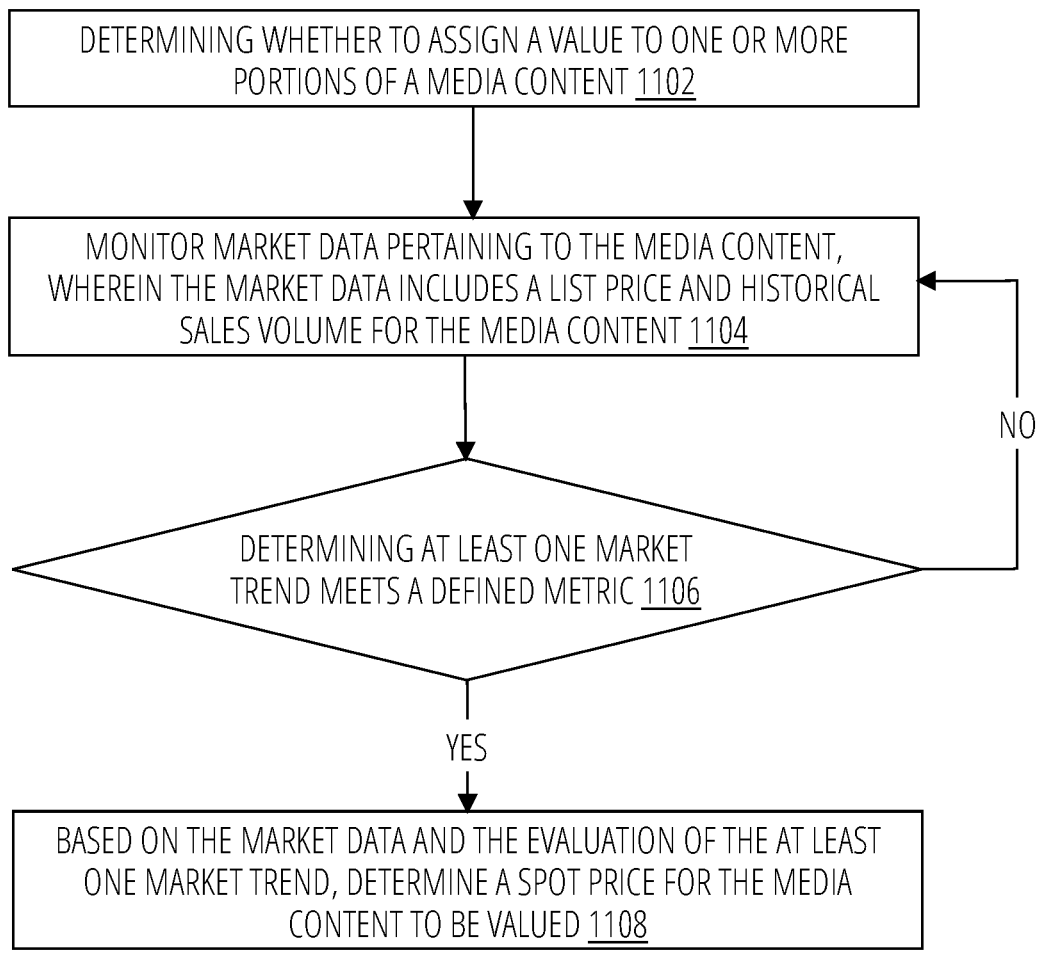
FIG. 11 illustrates an example method for determining a value of media content or a sample of a media content in accordance with some aspects of the present technology.

FIG. 11 illustrates an example method for determining a value of a media content or a sample of media content as described herein. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures, and systems described in the examples herein, although the methods may be implemented in a wide variety of other environments, architectures, and systems.

According to some examples, the method illustrated in FIG. 11 includes determining whether to assign a value to one or more portions of a media content at block 1102. For example, the media content value component 204 illustrated in FIG. 2 may determine whether to assign a value to one or more portions of a recorded media content. In some embodiments, a trigger to determine a value for one or more portions of the recorded media content can be a request to acquire, license, or playback the recorded media content. In some embodiments, the trigger to determine the value for one or more portions of the recorded media content can be the result of a condition specified in a smart contract maintained by a blockchain network.

According to some examples, the method includes monitoring market data pertaining to the recorded media content at block 1104. For example, the media content value component 204 illustrated in FIG. 2 may monitor market data pertaining to the recorded media content. The market data can include a list price and historical sales volume for the media content as reported by multi-media platform 108 or other media services. The monitoring of the market data also pertains to market data relating the a value of portions of a media content, such as a sample of a music content.

According to some examples, the method includes determining whether at least one market trend meets a defined metric at decision block 1106. For example, the media content value component 204 illustrated in FIG. 2 may determine whether at least one market trend meets a defined metric. For example, the media content value component 204 may evaluate at least one market trend pertaining to similar media content to the recorded media content to be valued. The at least one market trend is charts data, critical review scores, and social media interaction with similar media content. For example, a recorded media content may become more valuable when it is the most popular. There are top charts that show how popular the recorded media content such as albums, books, songs, and videos might be. There are earnings charts for some recorded media content that indicate how many people are purchasing or experiencing the recorded media content. For some recorded media content, critics might provide reviews on a scale from 1 to 5. For some recorded media content, social media users might link to the recorded media content or refer to the recorded media content by name or a proxy such as a hashtag. All of these are signals of the value of a recorded media content. When one such trend meets a metric indicating it is substantial enough the present technology can value the media content.

According to some examples, the method includes determining a spot price for the media content to be valued at block 1108. For example, the media content value component 204 illustrated in FIG. 2 may determine a spot price for the recorded media content based on the market data and the evaluation of the at least one market trend. In some embodiments, a spot price can refer to a current value of a recorded media content. Given all of the data available as indicators of a value of a recorded media content, the present technology acknowledges that recorded media content can have a dynamic value, especially when friction to acquiring or licensing the media content can be removed using technologies such as a distributed ledger or blockchain. Thus, a spot price can refer to a market value for a particular type of transaction involving a specific recorded media content at a specific time. The determining of a spot price for the recorded media content to be valued can be performed by a machine learning algorithm receiving the market data and the at least one market trend.

In some embodiments, an artist can define a target value for a recorded media content, and the media content value component 204 can periodically provide an estimated value for the media content. In some embodiments the media content value component 204 can surface this information in a dashboard of the multi-media platform 108 through the dashboard component 246. In some embodiments, media content value component 204 can display key performance indicators used to value the media content to help the artist determine actions that might be taken to improve the performance metrics and thereby the value of the media content.

In some embodiments, a customized token can be associated with each recorded media content such that the value of the token tracks the "success" of the recorded media content (as determined, for example, by stream count, royalty, distribution of rights score, etc.).

There may be a finite number of tokens associated with the recorded media content such that investment towards the tokens is used towards artist financing, artist album purchases, future album purchases, etc.

According to some examples, the method includes identifying possible samples of the media content to be valued at block 140. For example, the media samples component 218 illustrated in FIG. 2 may identify possible samples of the media content to be valued. A sample can be a segment or portion of a media content. The term "sample" is most often used in reference to a portion of an audio track wherein a small time segment, or even just the sound of one instrument or sound in the track, can be extracted for use in other media content. However, samples can also refer to any division of a larger recorded media content, such as a song of an album, a scene of a movie, a segment of a larger picture like a particular mural or portion of a mural (e.g., such as from the ceiling of the Sistine Chapple).

These samples can also be valued. According to some examples, the method includes valuing the spot price of the possible sample using market data for at least one similar sample previously licensed at block 150. For example, the media content value component 204 illustrated in FIG. 2 may value the spot price of the possible sample using market data for at least one similar sample previously licensed. A similar sample is a sample of a recorded media content having similar characteristics or belonging to a similar genre.

In some embodiments, the spot price for the recorded media content to be valued is further based on the spot price of the at least one possible sample of the recorded media content.

Such dynamic spot prices for samples of recorded media content can be surfaced to the artist, who can then promote their media content. In some embodiments, machine learning techniques can also be used to predict future value changes.

Figure 12:
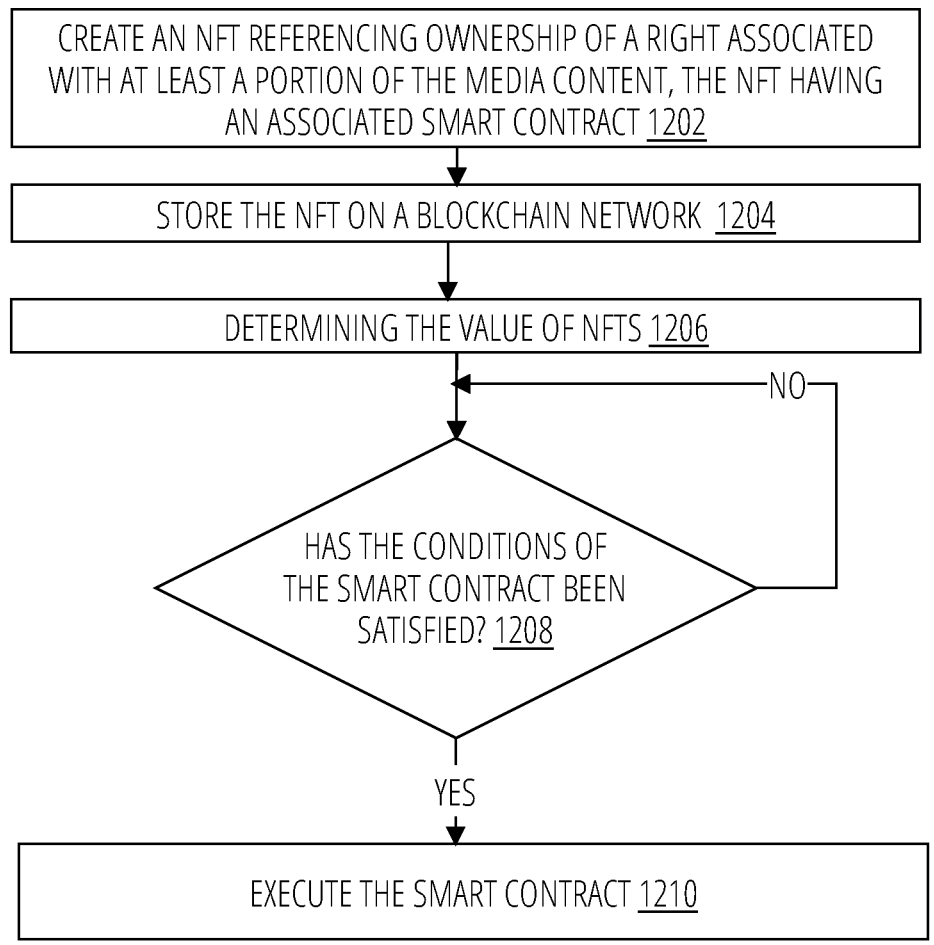
FIG. 12 illustrates an example method for implementing distributed ledger technology in media management in accordance with some aspects of the present technology.

FIG. 12 illustrates an example method for implementing distributed ledger technology in media management as described herein. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence. The example method may be described with reference to the environments, architectures, and systems described in the examples herein, although the methods may be implemented in a wide variety of other environments, architectures, and systems.

Ownership of rights to digital and physical assets or collectibles may be recorded in non-fungible tokens (NFTs), a customized music token, and recorded in a blockchain, such as Ethereum. In some embodiments, smart contracts are provided using chaincode, (e.g., such as system chaincode available in Hyperledger Fabric 1.0) that can track the digital rights (ownership, license, royalty structures, etc., and conditions for transfer of rights) associated with media content. Through a plurality of smart contracts or chain code, the distributed ledger 208 can maintain a consensus between different blockchains with relation to user's wallets and underlying NFTs, route an incoming transaction to one of the blockchain(s), e.g., based on context data, and then enable processing of the transaction on the blockchain.

"Non-fungibility" refers to the uniqueness or non-interchangeability of individual units of an asset. For example, NFTs cannot be replaced with other tokens of the same type. An example format for an NFT on the Ethereum blockchain is a token standard referred to as ERC-721. The ERC-1155 standard offers semi-fungibility. Unlike ERC-721, where the unique identifier represents one asset, the unique identifier of the ERC-1155 token represents a whole class of fungible assets, any number of which the user can transfer to others. Components based on the ERC-998 standard are the templates according to which NFTs can be either non-fungible or fungible assets. While Ethereum is a popular choice for NFT marketplaces, there are non-Ethereum NFT marketplaces as well, belonging to other blockchain networks like Cosmos, Polkadot, International Blockchain Consulting (IBC), Interledger, Binance Smart Chain, etc. Each of the NFT marketplaces operates slightly differently and has its specific instructions, standards, formats, and/or the like. For example, some of the NFTs are curated while others are self-service based. Creating NFTs on some platforms have substantial transaction fees to mint, while some marketplaces do not support specific file formats or sizes of assets. Some platforms are user-friendly, while others have a complex user interface that takes significant training.

According to some examples, the method includes minting or transferring an NFT referencing ownership of a right associated with at least a portion of the recorded media content at block 1202. For example, the NFT component 206 illustrated in FIG. 2 may mint an NFT on a specific blockchain if one doesn't exist already on distributed ledger 208 (e.g., per user preferences) referencing ownership of a right associated with at least a portion of the recorded media content. At least one condition is an agreement to pay a spot price for the value of the assignment. The smart contract references one or more conditions for acquiring an assignment of the copyright to control the recorded media content. The smart contract references one or more conditions for acquiring a copy of a recorded media content for personal playback. The smart contract references one or more conditions for licensing a recorded media content for public playback. The smart contract references one or more conditions for licensing the recorded media content for use of a sample of the media content in another media content. The NFT component 206 can be configured to mint an NFT for one or more media content in near real time, according to user's preferences (e.g., specific blockchain, expiration time, user's preferences, user's location (e.g., if it is detected that a user is operating in a wallet on a different blockchain) and the context of the conversation (or live media content) between the host and the connected user.

According to some examples, the method includes storing the NFT on a blockchain network at block 1204. For example, the NFT component 206 illustrated in FIG. 2 may store the NFT on a blockchain network 208.

According to some examples, the method illustrated in FIG. 12 includes determining a value of a non-fungible token at block 1206. In some embodiments, the value of an NFT can be determined from its spot price, as addressed with respect to FIG. 11. In other examples, the value of an NFT can be a traded value determined by open market trading, wherein the price of an NFT is determined by the junction of buy and sell prices, just as in any open market.

According to some examples, the method illustrated in FIG. 12 includes determining whether the conditions associated with a smart contract have been satisfied at decision block 1208. For example, the smart contract arbiter component 212 illustrated in FIG. 2 may determine whether the conditions associated with a smart contract have been satisfied.

A smart contract relating to an NFT can include any of the following terms: a user subscribes to the media content; the acquires a license to playback the recorded media content during a specified period; the user downloads the recorded media content and acquires rights to playback the media content for the personal or family user for an undetermined period of time; or the user acquires rights to control future licensing of the recorded media content. In an example use case, a recorded media content (e.g., a behind the scene photo of an artist shot by a photographer, or a limited release song) can be sold by an artist to a fan using smart contracts such that the artist is paid each time the photo is subsequently sold/distributed.

According to some examples, the method illustrated in FIG. 12 includes executing the terms of a smart contract at block 1210. For example, the smart contract arbiter component 212 illustrated in FIG. 2 may execute the terms of a smart contract. The smart contract has embedded therein rights to the recorded media content such that execution of the smart contract in response to the request causes assignment of the rights to the user generating the request and automatic disbursement of instant payments to the right holders as per terms of the smart contract to offer decentralized management of recorded media content In some embodiments, the requests can be requested by users willing to buy or rent/stream the recorded media content. In some examples, the request can be automatically triggered when a certain portion or 30 seconds (for example) of the recorded media content is accessed.

In some examples, the financing engine 214 provides funds for creating the recorded media content, records it as a smart contract, tracks the usage of the recorded media content and revenue associated with it, and then keeps a portion of the revenue towards the funding while releases the rest of the revenue to the artist. In some embodiments, if the artist has requested the financial offer, the financing engine 214 checks to determine if there are any other contributors (the songwriters, producers, engineers, band members and studio musicians, background vocalists, and programmers) connected to the user/artist. If there are, the financing engine 214 can check if those contributors have applied for financial offers for the same album/different album, and bundle similar offers (e.g., applied for the same song/album/track) for different financial terms and distinct revenue streams coming from artist and/or contributors. In this case, the smart contract is between multi-media platform 108 and artist and contributors.

In some examples, the present technology described herein can also use NFTs to demonstrate ownership of unique recorded media content. One of the big advantaged of distributed ledger is a public and agreed upon chain of title. Accordingly, the present technology can be used to track ownership of a recorded media content and to verify a number of copies of the recorded media content in existence. In this way, the present technology can be used to transfer unique recorded media content as collectibles.

In some embodiments, an artist account can offer users of the multi-media platform 108 a unique recorded media content associated with an NFT. The users can be allowed to bid on the unique media content.

In some embodiments, an artist account can utilize NFTs can be for personalized media content made for users as rewards/appreciation.

In some embodiments, the server provider allows owners of different NFTs of the same album to collaborate and create the single album from the different puzzle pieces and release the whole album, or even create a public/private musical experience. The NFTs can also be time-restricted such that during the time the user has access that other users do not, but at the lapse of the time, the underlying asset is available for everyone to use.

In some examples, "my collection" tab in the music service associated with multi-media platform 108 can be used to digitally showcase the purchased NFT, e.g., music users cannot hear anyone else, owned by a user. The digital showcase of NFTs can be used to assign a "loyal" status as mentioned before.

Figure 13:
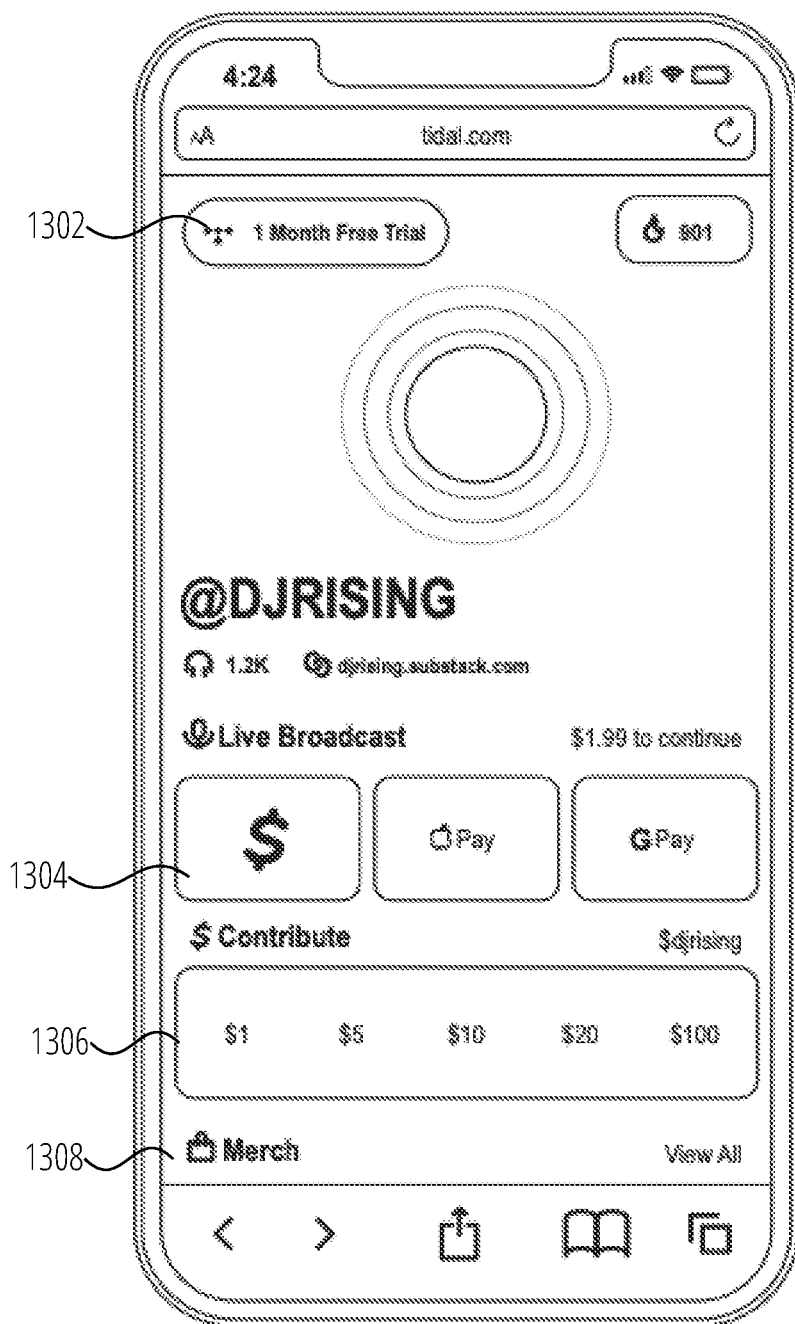
FIG. 13 illustrates an example user interface that advertises a currently playing live playback stream in accordance with some aspects of the present technology.

FIG. 13 illustrates an example user interface that advertises a currently playing live playback stream. In some embodiments, when an audience member does not have a user account that entitles them to connect to the live playback stream the user interface illustrated in FIG. 13 can offer a free trial by presenting selectable option 1302. The audience member could choose instead to purchase a subscription to multi-media platform 108, or purchase rights to connect to the particular live playback stream.

The user interface illustrated in FIG. 13 can also provide payment options 1304 such as to pay through payment services such as CASH APP, APPLE PAY, GOOGLE PAY.

Additionally, the audience member could decide to provide a tip using menu options 1306 to support the host user account that is the host of the live playback stream. The user interface illustrated in FIG. 13 can also provide a selectable option 1308 to view merchandise offered by the host user account.

Figure 14:
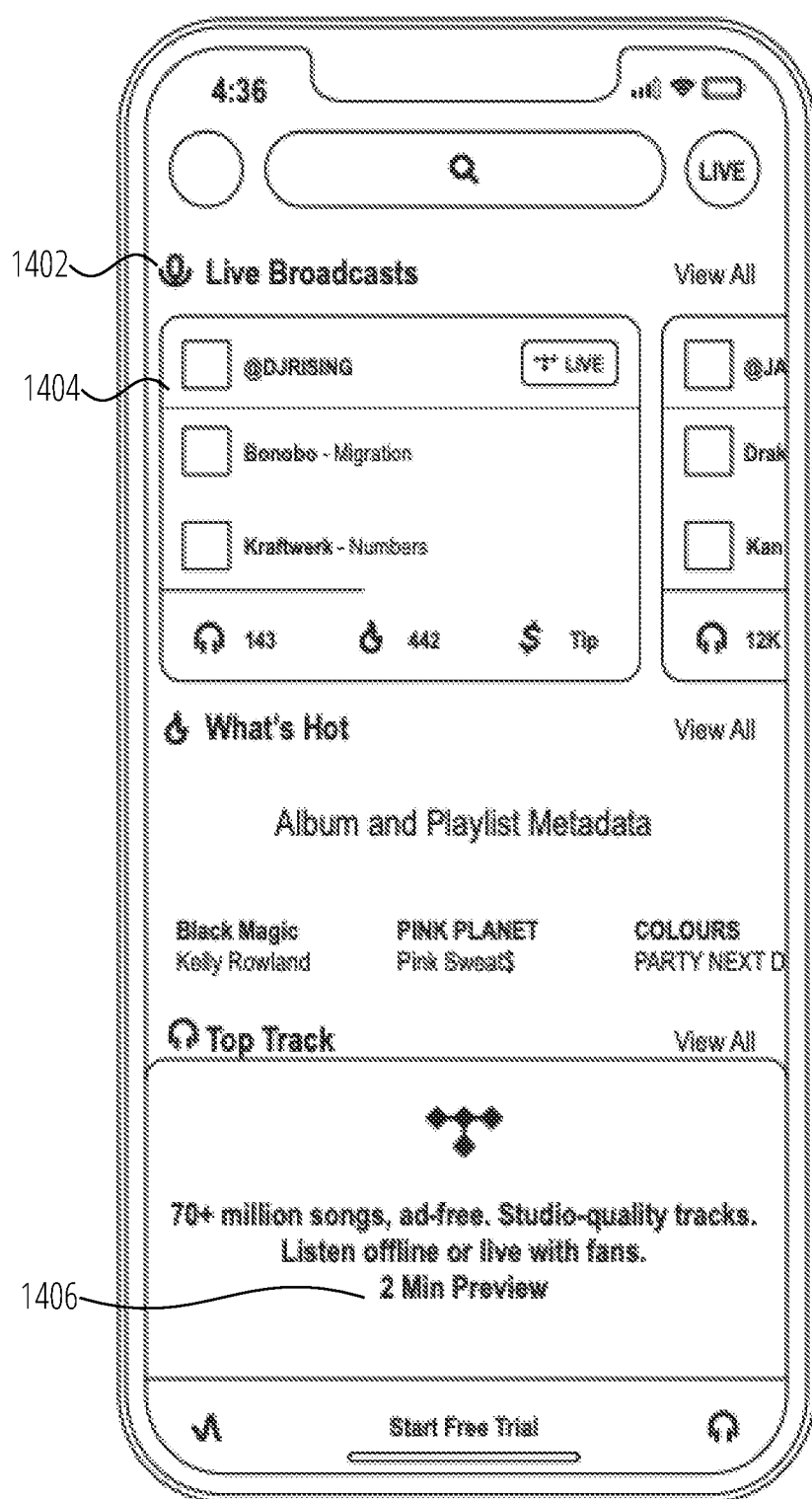
FIG. 14 illustrates another example user interface of the multi-media application in accordance with some aspects of the present technology.

FIG. 14 illustrates another example user interface of the multi-media application 106. The user interface illustrated in FIG. 14 shows currently playing live media streams 1402. In some embodiments, the most popular currently playing live media stream 1404 can automatically begin playback and the user interface can display an amount of time 1406 remaining in a free preview of the live media stream 1404 that is automatically playing.

Figure 15A:
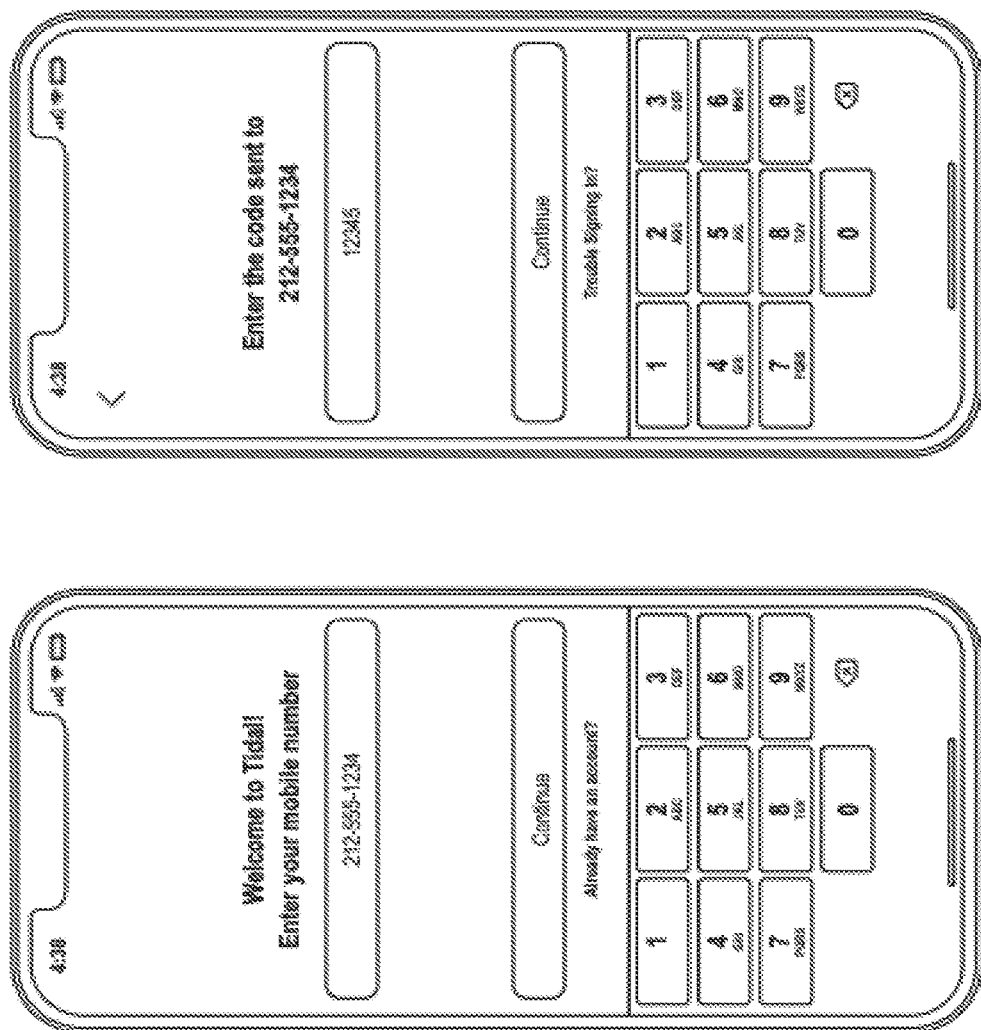
FIG. 15A and FIG. 15B illustrate example user interfaces for creating a user account with the multi-media platform in accordance with some aspects of the present technology.
Figure 15B:
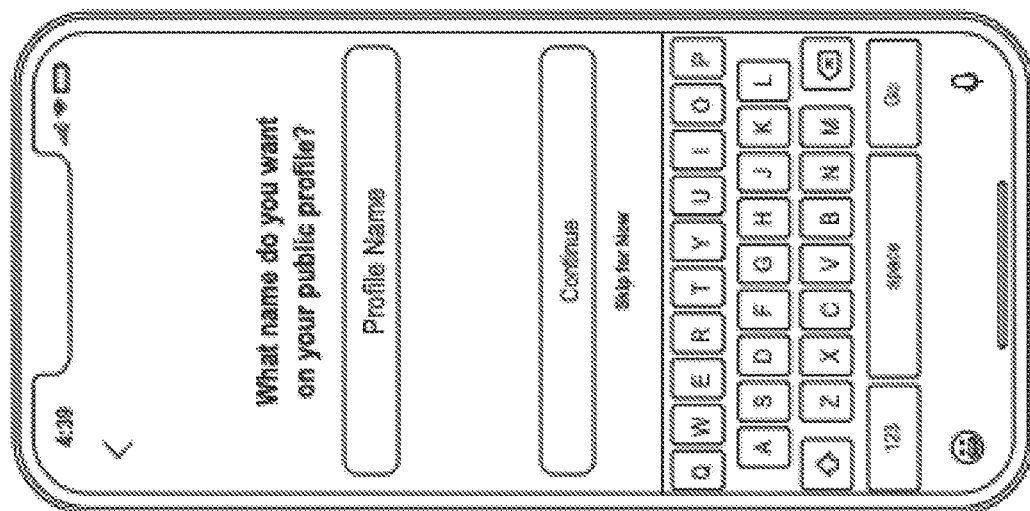
Figure 15B:
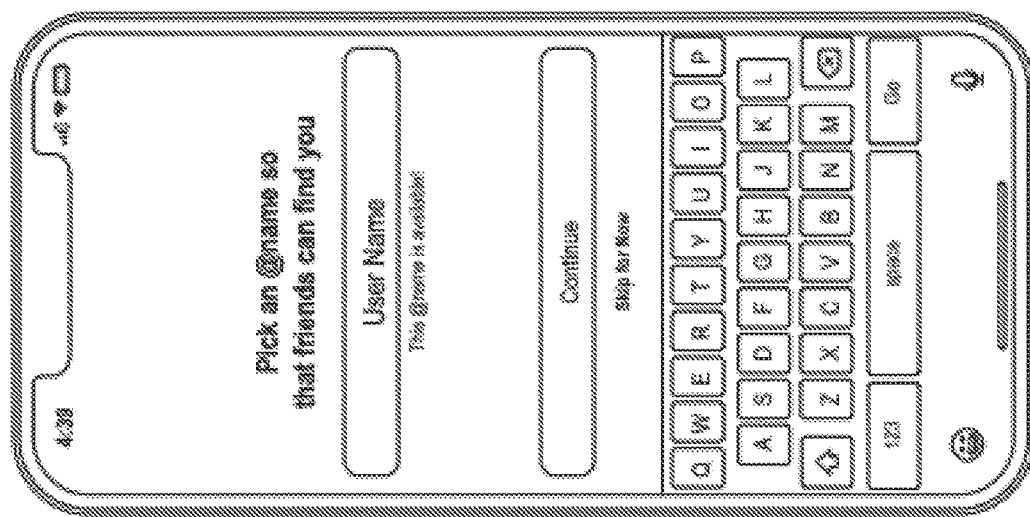

FIG. 15A and FIG. 15B illustrate example user interfaces for creating a user account with the multi-media platform 108.

Figure 16A:
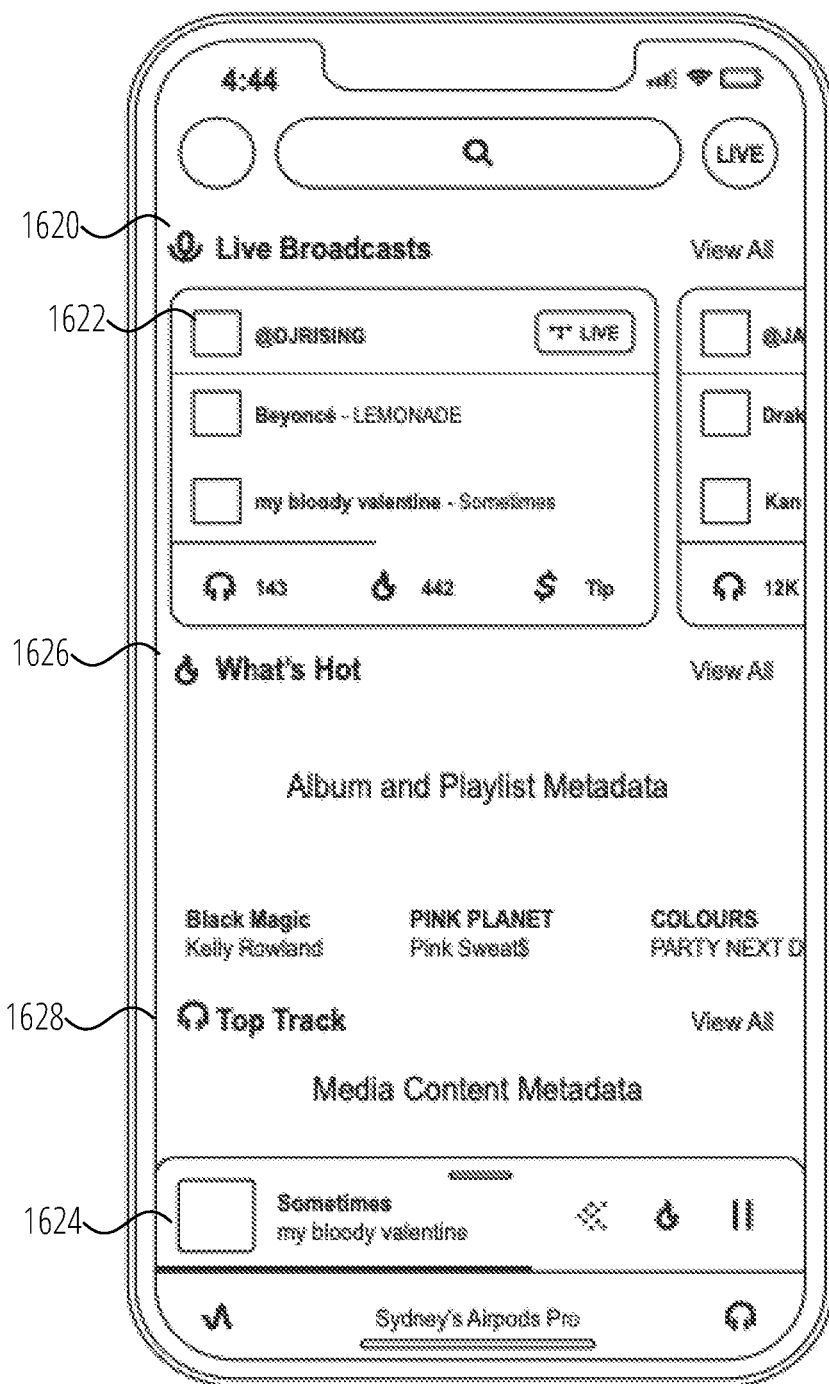
FIG. 16A, FIG. 16B, FIG. 16C, FIG. 16D, and FIG. 16E collectively illustrate a flow of user interface screens of multi-media application in accordance with some aspects of the present technology.

FIG. 16A, FIG. 16B, FIG. 16C, FIG. 16D, and FIG. 16E collectively illustrate a flow of user interface screens of multi-media application 106. In FIG. 16A, the multi-media application 106 is navigated to a home screen showing a plurality of live playback streams 1620, trending media content collections 1626 (such as playlists and albums), and trending media content 1628 that is available for selection and playback. In addition, the home stream of the multi-media application 106 shows it currently playing media content 1624. As illustrated in FIG. 16A the currently playing media content 1624 same media item from the currently playing live playback stream 1622.

Figure 16B:
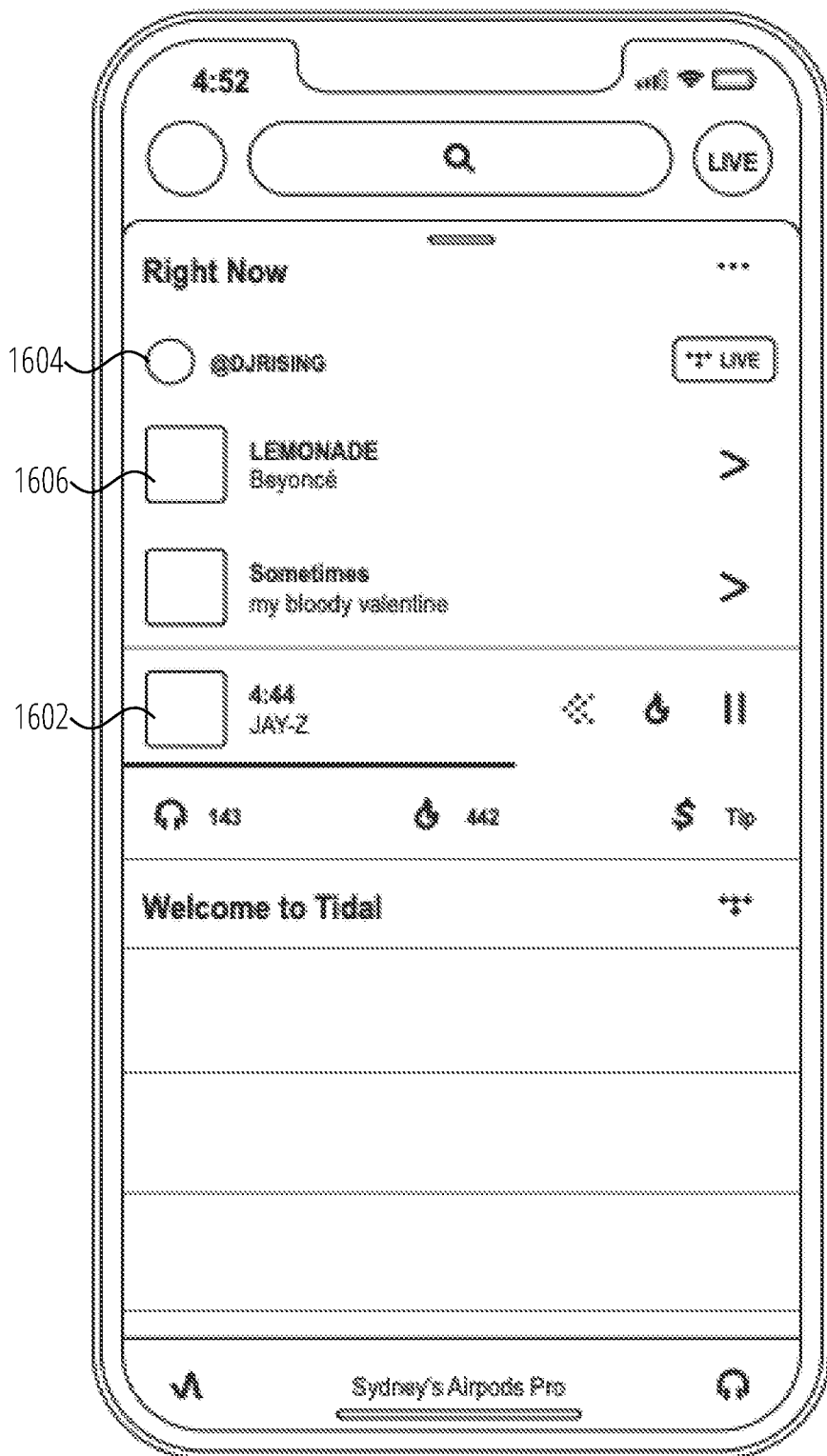

FIG. 16B illustrates a user interface showing a list of currently playing and previously played media content. For example FIG. 16B shows an expanded view of the currently playing media content 1602 that is part of the currently playing live media stream 1604. Media items 1606 represent media content that were recently played.

Figure 16C:
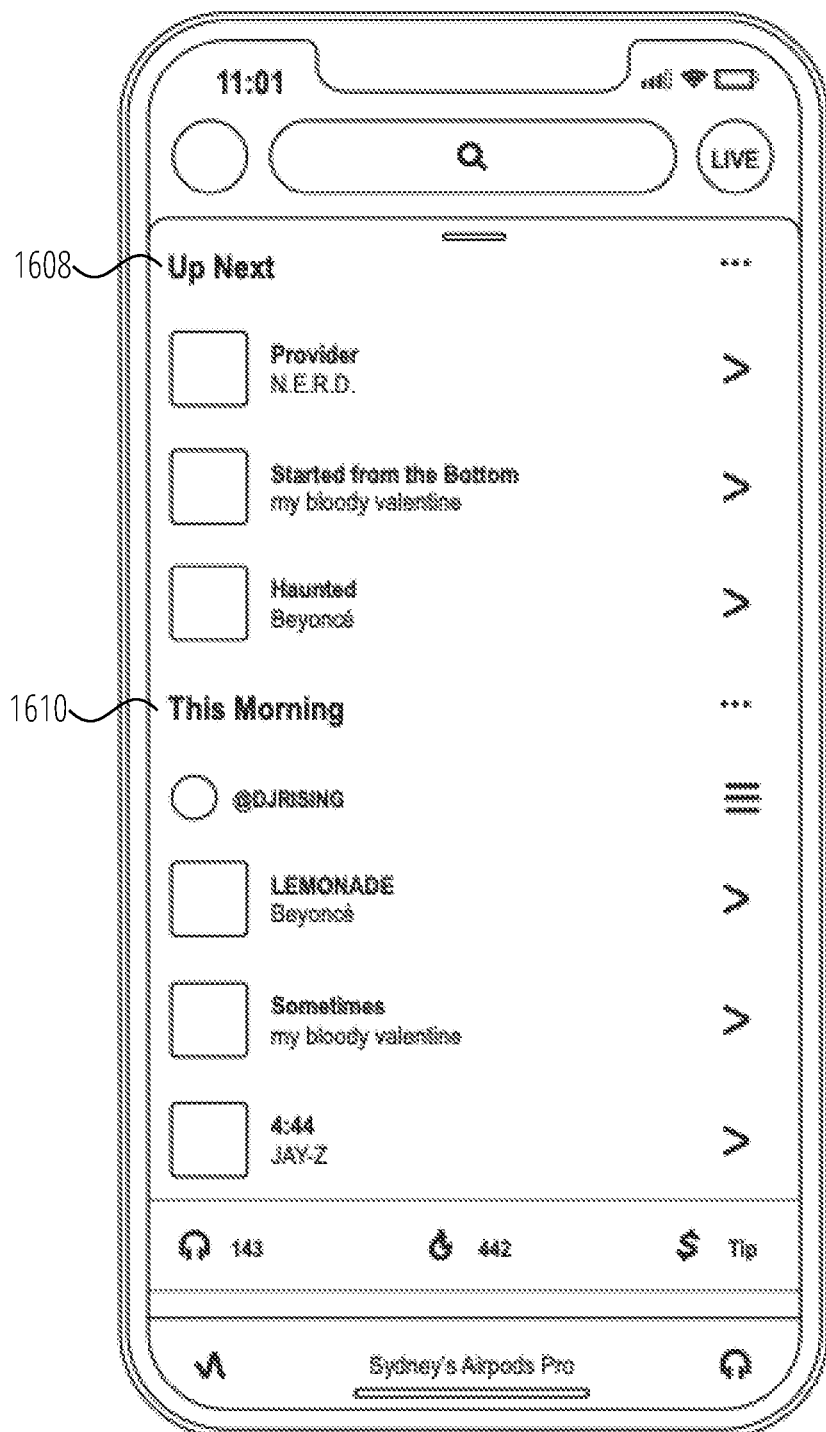

As more playback history is developed a timeline of previously played and queued to play media content has developed. FIG. 16C illustrates a timeline user interface showing media items queued to play 1608 and media items previously played 1610.

Figure 16D:
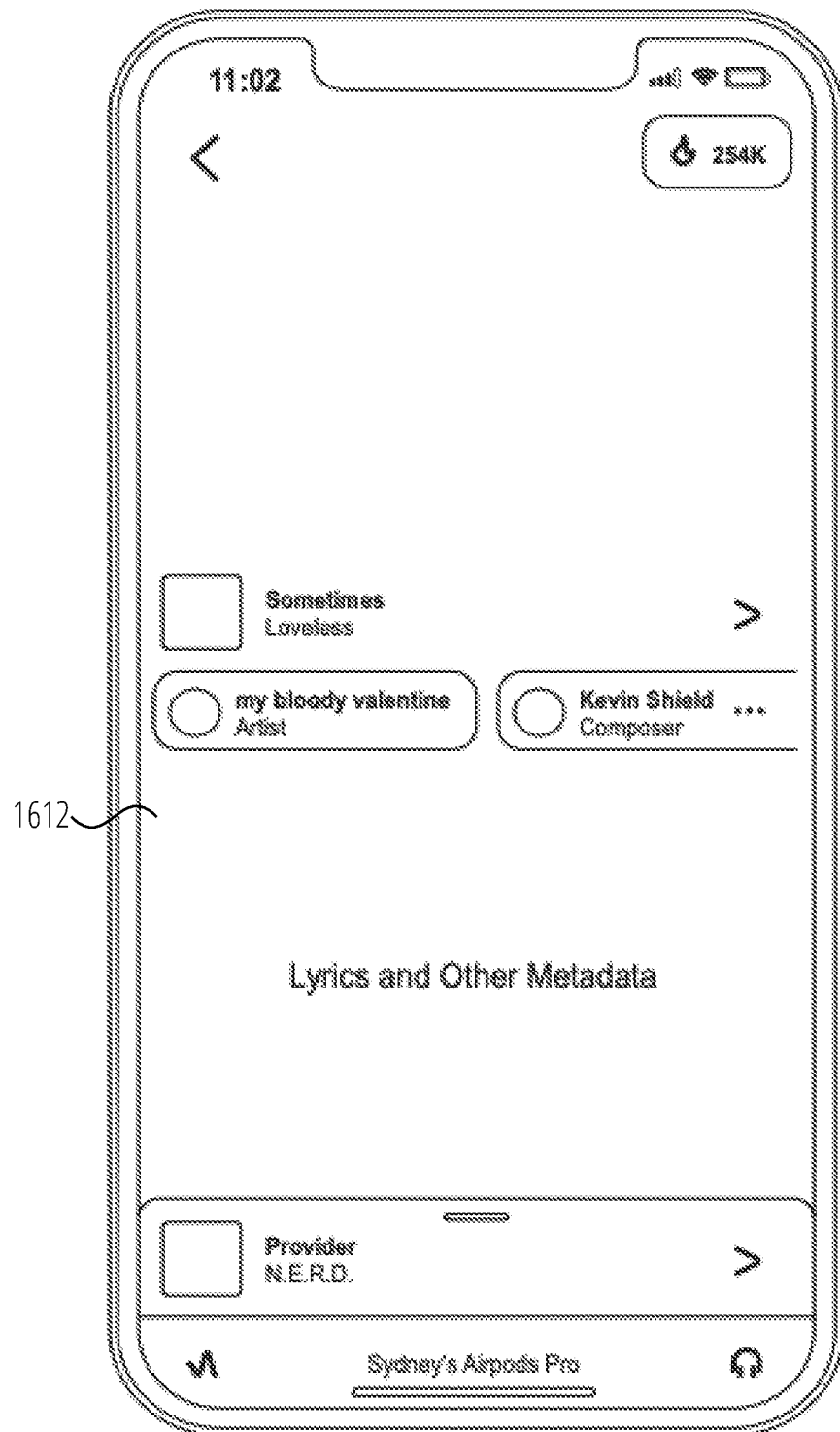

FIG. 16D illustrates an example detailed view pertaining to particular media content. For example, an audience member may have selected a particular media content which results in the navigation to the interface illustrated in FIG. 16D where we lyrics 1612 and other media content information are displayed.

Figure 16E:
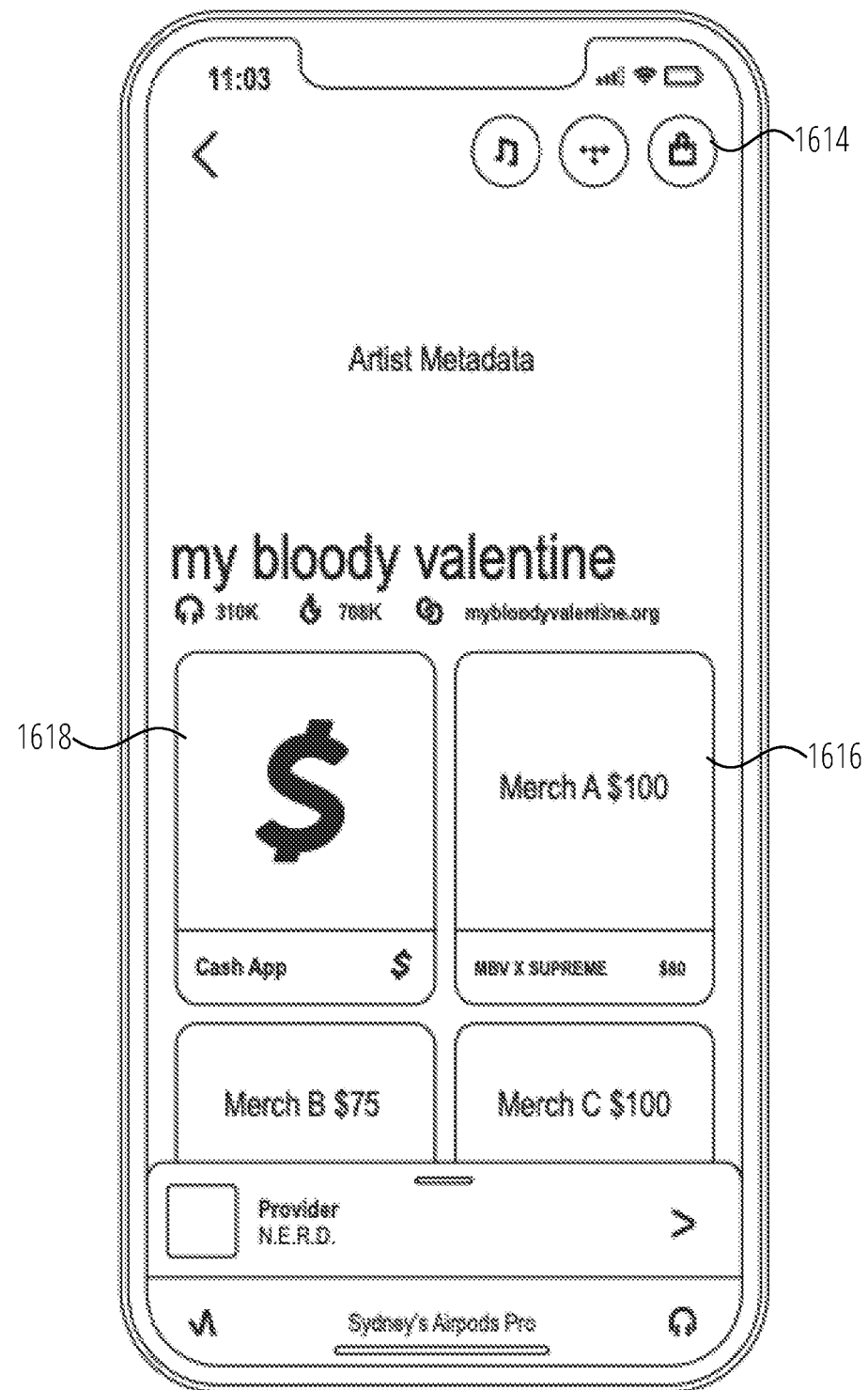

FIG. 16E illustrates a further user interface offered by multi-media application 106 wherein the user can select user interface option 1614 to navigate to a merchandise page or other landing page. In some embodiments, the audience member can select an option 1616 to purchase merchandise or can select an option 1618 to make a donation to the artist account.

Figure 17:
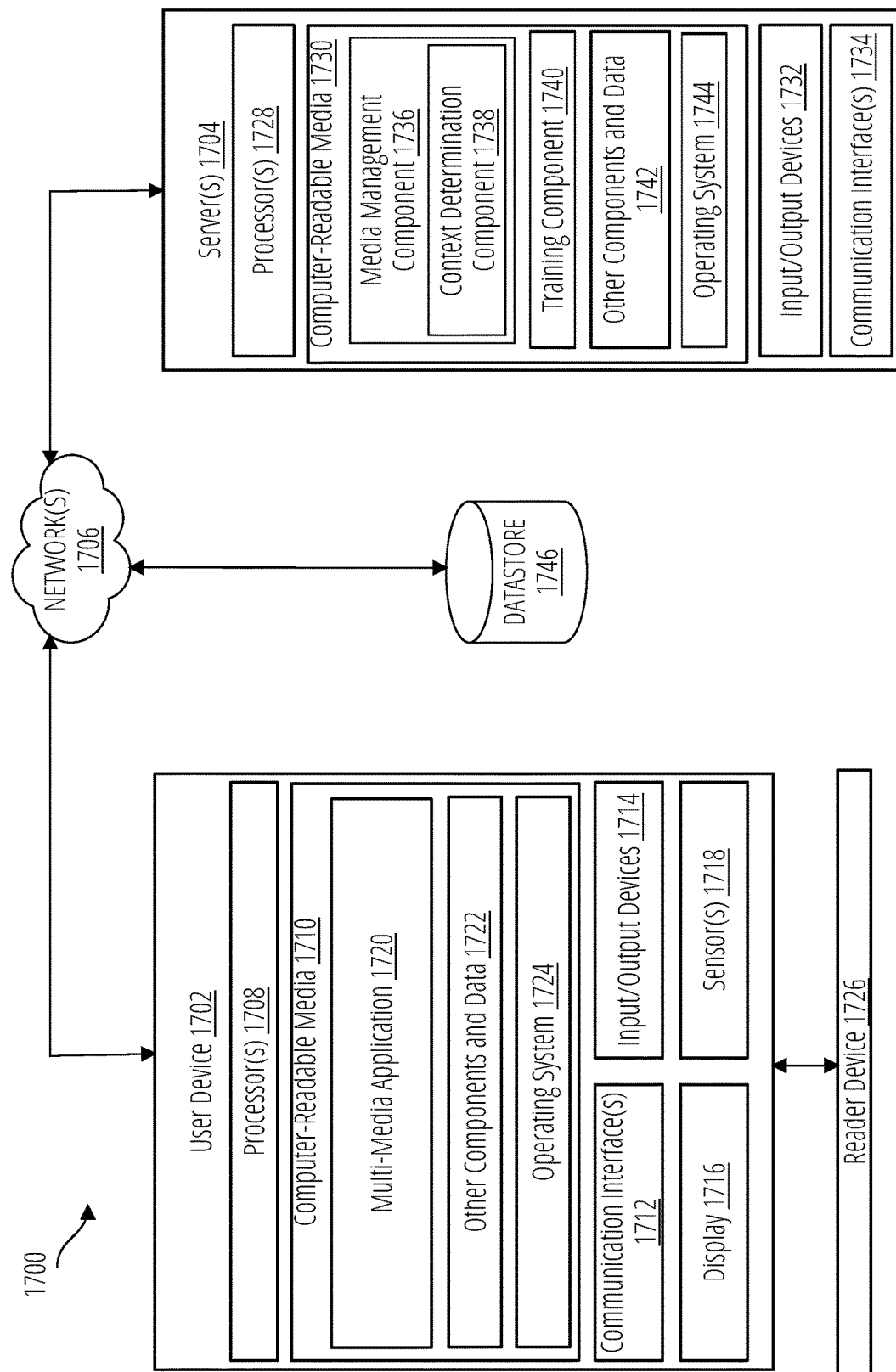
FIG. 17 depicts an illustrative block diagram illustrating a system for performing techniques described herein in accordance with some aspects of the present technology.

FIG. 17 is a block diagram illustrating a system for performing techniques described herein, according to an embodiment of the present subject matter. The system 1700 includes a user device 1702, that communicates with server computing device(s) (e.g., server(s) 1704) via network(s) 1706 (e.g., the Internet, cable network(s), cellular network (s), cloud network(s), wireless network(s) (e.g., Wi-Fi) and wired network(s), as well as close-range communications such as Bluetooth®, Bluetooth® low energy (BLE), and the like). While a single user device 1702 is illustrated, in additional or alternate examples, the system can have multiple user devices. In some embodiments, the user device 1702 can correspond to the host computing device 102, audience member client device 110 and/or the artist computing device 224 of FIG. 2, the server(s) 1704 can correspond to the multi-media platform 108, social media platform 230, NFT platform 242, or finance platform 244 of FIG. 2, and the network(s) 1706 can correspond to the network 216 of FIG. 2. In one implementation, the system offers media management, specifically media content platforms that support lending, machine-learning driven social engagement, collaborative media experiences, and distributed ledger-driven licensing and media content management models.

In some embodiments, the user device 1702 can be any suitable type of computing device, e.g., portable, semi-portable, semi-stationary, or stationary. Some examples of the user device 1702 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1702 can be any computing device capable of sending communications and performing the functions according to the techniques described herein. The user device 1702 can include devices, e.g., payment card readers, or components capable of accepting payments, as described below.

In the illustrated example, the user device 1702 includes one or more processors 1708, one or more computer-readable media 1710, one or more communication interface(s) 1712, one or more input/output (I/O) devices 1714, a display 1716, and sensor(s) 1718.

In some embodiments, each processor 1708 can itself comprise one or more processors or processing cores. For example, the processor(s) 1708 can be implemented as one or more microprocessors, microcomputers, microcontrollers, digital signal processors, central processing units, state machines, logic circuitries, and/or any devices that manipulate signals based on operational instructions. In some examples, the processor(s) 1708 can be one or more hardware processors and/or logic circuits of any suitable type specifically programmed or configured to execute the algorithms and processes described herein. The processor(s) 1708 can be configured to fetch and execute computer-readable processor-executable instructions stored in the computer-readable media 1710.

Depending on the configuration of the user device 1702, the computer-readable media 1710 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1710 can include, but is not limited to, RAM, ROM, EEPROM, flash memory, solid-state storage, magnetic disk storage, optical storage, and/or other computer-readable media technology. Further, in some examples, the user device 1702 can access external storage, such as RAID storage systems, storage arrays, network attached storage, storage area networks, cloud storage, or any other medium that can be used to store information and that can be accessed by the processor(s) 1708 directly or through another computing device or network. Accordingly, the computer-readable media 1710 can be computer storage media able to store instructions, components or components that can be executed by the processor(s) 1708. Further, when mentioned, non-transitory computer-readable media exclude media such as energy, carrier signals, electromagnetic waves, and signals per se.

The computer-readable media 1710 can be used to store and maintain any number of functional components that are executable by the processor(s) 1708. In some implementations, these functional components comprise instructions or programs that are executable by the processor(s) 1708 and that, when executed, implement operational logic for performing the actions and services attributed above to the user device 1702. Functional components stored in the computer-readable media 1710 can include a multi-media application 1720 that can include a user interface to enable users to interact with the user device 1702, and thus the server(s) 1704 and/or other networked devices. In some embodiments, the multi-media application 1720 can be presented via a web browser, or the like. In some embodiments, the 1720 is the multi-media application 106, such as a mobile application or desktop application, which can be provided by multi-media platform 108 associated with the server(s) 1704, or which can be an otherwise dedicated application. In some examples, the multi-media application 1720 can display the user interfaces described above with reference to FIG. 6A-FIG. 6B, FIG. 9A-FIG. 9D, FIG. 13, FIG. 14, FIG. 15A, FIG. 15B, FIG. 16A and FIG. 16E. In some embodiments, the user interface 1702 can present a consolidated communication user interface, or portion thereof. In some embodiments, a user can interact with the user interface via touch input, spoken input, gesture, or any other type of input. The word "input" is also used to describe "contextual" input that may not be directly provided by the user via the user interface. For example, user's interactions with the user interface are analyzed using, e.g., natural language processing techniques, to determine context or intent of the user, which may be treated in a manner similar to "direct" user input.

Depending on the type of the user device 1702, the computer-readable media 1710 can also optionally include other functional components and data, such as other components and data 1722, which can include programs, drivers, etc., and the data used or generated by the functional components. In addition, the computer-readable media 1710 can also store data, data structures and the like, that are used by the functional components. Further, the user device 1702 can include many other logical, programmatic and physical components, of which those described are merely examples that are related to the discussion herein.

In some embodiments, the computer-readable media 1710 can include additional functional components, such as an operating system 1724 for controlling and managing various functions of the user device 1702 and for enabling basic user interactions.

The communication interface(s) 1712 can include one or more interfaces and hardware components for enabling communication with various other devices, such as over the network(s) 1706 or directly. For example, communication interface(s) 1712 can enable communication through one or more network(s) 1706, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1702 can further include one or more input/output (I/O) devices 1714. The I/O devices 1714 can include speakers, a microphone, a camera, and various user controls (e.g., buttons, a joystick, a keyboard, a keypad, etc.), a haptic output device, and so forth. The I/O devices 1714 can also include attachments that leverage the accessories (audio-jack, USB-C, Bluetooth, etc.) to connect with the user device 1702.

In some embodiments, user device 1702 can include a display 1716. Depending on the type of computing device(s) used as the user device 1702, the display 1716 can employ any suitable display technology. For example, the display 1716 can be a liquid crystal display, a plasma display, a light emitting diode display, an OLED (organic light-emitting diode) display, an electronic paper display, or any other suitable type of display able to present digital content thereon. In some embodiments, the display 1716 can be an augmented reality display, a virtually reality display, or any other display able to present and/or project digital content. In some examples, the display 1716 can have a touch sensor associated with the display 1716 to provide a touchscreen display configured to receive touch inputs for enabling interaction with a graphic interface presented on the display 1716. Accordingly, implementations herein are not limited to any particular display technology. Alternatively, in some examples, the user device 1702 may not include the display 1716, and information can be presented by other means, such as aurally, haptically, etc.

In addition, the user device 1702 can include sensor(s) 1718. The sensor(s) 1718 can include a GPS device able to indicate location information. Further, the sensor(s) 1718 can include, but are not limited to, an accelerometer, gyroscope, compass, proximity sensor, camera, microphone, and/or a switch.

In some example, the GPS device can be used to identify a location of a user. In some embodiments, the location of the user can be used by the service provider 712, described above, to provide one or more services. That is, in some examples, the service provider 712 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 714 and/or for sending users 714 notifications regarding available appointments with user(s) located proximate to the users 714. In some embodiments, location can be used for taking payments from nearby customers when they leave a geofence, or location can be used to initiate an action responsive to users 714 enter a brick-and-mortar store of a user. Location can be used in additional or alternative ways as well.

Additionally, the user device 1702 can include various other components that are not shown, examples of which include removable storage, a power source, such as a battery and power control unit, a barcode scanner, a printer, a cash drawer, and so forth.

In addition, in some examples, the user device 1702 can include, be connectable to, or otherwise be coupled to a reader device 1726, for reading payment instruments and/or identifiers associated with payment objects. In some examples, as described above, the reader device 1726 can plug in to a port in the user device 1702, such as a microphone port, a headphone port, an audio-jack, a data port, or other suitable port. In additional or alternative examples, the reader device 1726 can be coupled to the user device 1702 via another wired or wireless connection, such as via a Bluetooth®, BLE, and so on. The reader device 1726 can include a read head for reading a magnetic strip of a payment card, and further can include encryption technology for encrypting the information read from the magnetic strip. Additionally or alternatively, the reader device 1726 can be an EMV payment reader, which in some examples, can be embedded in the user device 1702. Moreover, numerous other types of readers can be employed with the user device 1702 herein, depending on the type and configuration of the user device 1702.

The reader device 1726 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1726 may include hardware implementation, such as slots, magnetic tracks, and rails with one or more sensors or electrical contacts to facilitate detection and acceptance of a payment instrument. That is, the reader device 1726 may include hardware implementations to enable the reader device 1726 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1726 may also include a biometric sensor to receive and process biometric characteristics and process them as payment instruments, given that such biometric characteristics are registered with the payment service system 100 and connected to a financial account with a bank server.

The reader device 1726 may include processing unit(s), computer-readable media, a reader chip, a transaction chip, a timer, a clock, a network interface, a power supply, and so on. The processing unit(s) of the reader device 1726 may execute one or more components and/or processes to cause the reader device 1726 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1726, the computer-readable media may include volatile memory (such as RAM), non-volatile memory (such as ROM, flash memory, miniature hard drive, memory card, or the like), or some combination thereof. In some embodiments, the computer-readable media of the reader device 1726 may include at least one component for performing various functions as described herein.

The reader chip may perform functionalities to control the operations and processing of the reader device 1726. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1712, which may provide a clock signal indicating a time. Furthermore, the reader chip may perform functionality to control the network interface, which may interface with the network(s) 1706, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1726. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1702, which can be a POS terminal, and the reader device 1726 are shown as separate devices, in additional or alternative examples, the user device 1702 and the reader device 1726 can be part of a single device, which may be a battery-operated device. In such an example, components of both the user device 1702 and the reader device 1726 may be associated with the single device. In some examples, the reader device 1726 can have a display integrated therewith, which can be in addition to (or as an alternative of) the display 1716 associated with the user device 1702.

The server(s) 1704 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1704 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1704 can be located together or separately, and organized, for example, as virtual servers, server banks and/or server farms. The described functionality can be provided by the servers of a single user or enterprise, or can be provided by the servers and/or services of multiple different customers or enterprises.

In the illustrated example, the server(s) 1704 can include one or more processors 1728, one or more computer-readable media 1730, one or more I/O devices 1732, and one or more communication interfaces 1734. Each processor 1728 can be a single processing unit or a number of processing units, and can include single or multiple computing units or multiple processing cores. The processor(s) 1728 can be implemented as one or more microprocessors, microcomputers, microcontrollers, digital signal processors, central processing units, state machines, logic circuitries, and/or any devices that manipulate signals based on operational instructions. For example, the processor(s) 1728 can be one or more hardware processors and/or logic circuits of any suitable type specifically programmed or configured to execute the algorithms and processes described herein. The processor(s) 1728 can be configured to fetch and execute computer-readable instructions stored in the computer-readable media 1730, which can program the processor(s) 1728 to perform the functions described herein.

The computer-readable media 1730 can include volatile and nonvolatile memory and/or removable and non-removable media implemented in any type of technology for storage of information, such as computer-readable instructions, data structures, program components, or other data. Such computer-readable media 1730 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1704, the computer-readable media 1730 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1730 can be used to store any number of functional components that are executable by the processor(s) 1728. In many implementations, these functional components comprise instructions or programs that are executable by the processors 1728 and that, when executed, specifically configure the one or more processors 1728 to perform the actions attributed above to the service provider 712 and/or payment processing service. Functional components stored in the computer-readable media 1730 can optionally include a media management component 1736, which can include a context determination component 1738, a training component 1740, one or more other components and data 1742, and an operating system 1744.

The functionality of the media management component 1736, the context determination component 1738, and the training component 1740 are described above with reference to the multi-media platform 108, the context determination component 226, and the machine learning component 228 of FIG. 2.

The one or more other components and data 1742 can include a user component. The user component can be configured to receive transaction data from POS systems, such as the POS system 624 described above with reference to FIG. 6. The user component can transmit requests (e.g., authorization, capture, settlement, etc.) to payment service server computing device(s) to facilitate POS transactions between users and customers. The user component can communicate the successes or failures of payments associated with the POS transactions to the POS systems. Further, the one or more other components and data 1742 can include programs, drivers, etc., and the data used or generated by the functional components. Further, the server(s) 1704 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In some embodiments, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. Further, SDK(s) and/or API(s) can be used by various platforms/services to enable the various platforms/services (first-party or third-party) to send and/or receive messages via techniques described herein.

The computer-readable media 1730 can additionally include an operating system 1744 for controlling and managing various functions of the server(s) 1704.

The communication interface(s) 1734 can include one or more interfaces and hardware components for enabling communication with various other devices, such as over the network(s) 1706 or directly. For example, communication interface(s) 1734 can enable communication through one or more network(s) 1706, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1702 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1704 can further be equipped with various I/O devices 1732. Such I/O devices 1732 can include a display, various user interface controls (e.g., buttons, joystick, keyboard, mouse, touch screen, biometric or sensory input devices, etc.), audio speakers, connection ports and so forth.

In some embodiments, the system can include data store(s) 1746 that can be configured to store data that is accessible, manageable, and updatable. In some examples, the data store(s) 1746 can be integrated with the user device 1702 and/or the server(s) 1704. In other examples, as shown in FIG. 17, the data store(s) 1746 can be located remotely from the server(s) 1704 and can be accessible to the server(s) 1704. The data store(s) 1746 can comprise multiple databases and/or servers connected locally and/or remotely via the network(s) 1706. In some embodiments, the data store(s) 1746 can correspond to the data store(s) 114, which are described above as storing user profiles, permission(s), rule(s), and/or the like. In some embodiments, the data store(s) 1746 can store inventory database(s) and/or catalog database(s), messaging database(s), and/or the like. As described above, an inventory database can store data associated with a quantity of each media content that a user has available to the user. Furthermore, a catalog database can store data associated with items that a user has available for acquisition. A communication database can store communications and/or other communications exchanged via the service provider. The data store(s) 1746 can store additional or alternative types of data as described herein.

The phrases "in some examples," "according to various examples," "in the examples shown," "In some embodiments," "in other examples," "various examples," "some examples," and the like generally mean the particular feature, structure, or characteristic following the phrase is included in some embodiments of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects of the present technology:

Aspect 1. A method of facilitating a live playback stream by a multi-media platform, the multi-media platform hosting a plurality of multi-media content, the method comprising: receiving an instruction to initiate a live playback stream over the Internet, wherein the client device controls public playback of media content from a client device and is a source of commentary during the live playback stream; initiating at least two streams between the client device and the multi-media platform, wherein one stream is a playback control channel between the multi-media platform and the client device for transmitting data regarding playback controls pertaining to media content and another stream is a live media stream for transmitting data encoding live commentary; hosting the live playback stream over the Internet by transmitting at least a portion of the data from the playback control channel and the live media stream to a connecting client device.

Aspect 2. The method of Aspect 1, further comprising: receiving data identifying media content in at least a portion of an up next queue from the client device, the up next queue including at least one media content planned for playback during the live playback stream; for each audience member client device, sending the data identifying media content, whereby the client devices can determine whether any of the identified media content are already stored or cached at the client device, and request the media content not stored on the client device from the multi-media platform.

Aspect 3. The method of any of Aspects 1 to 2, wherein the data encoding live commentary in the live media stream is audio captured by a microphone of the client device.

Aspect 4. The method of any of Aspects 1 to 3, wherein the playback control channel includes multiplexing information that maps the audio captured by the microphone to a time-domain associated with a currently playing media content.

Aspect 5. The method of any of Aspects 1 to 4, wherein the live media stream can include audio or audio-video media.

Aspect 6. The method of any of Aspects 1 to 5, wherein the audio captured by the microphone and the currently playing media content are multiplexed using data from the playback control channel on an instance of the multi-media application running on user device of a user account connected to the live playback stream.

Aspect 7. The method of any of Aspects 1 to 6, wherein the data regarding playback controls of the playback control channel includes playback synchronization information for the playback of the media content such as play, skip, pause commands.

Aspect 8. The method of any of Aspects 1 to 7, further comprising: multiplexing, at the multi-media platform, audio data for a media content with the live commentary; and transmitting a single combined media stream including the media content for live playback with the live commentary.

Aspect 9. The method of any of Aspects 1 to 8, wherein the playback control channel includes data describing custom mixing or transitions to apply to media content in the portion of the up next queue.

Aspect 10. The method of any of Aspects 1 to 9, further comprising: receiving an identification of specified user account(s) to join the live playback stream; and inviting the specified user account(s) to connect to the live playback stream.

Aspect 11. The method of any of Aspects 1 to 10, further comprising: collecting metrics regarding user accounts connected to the live playback stream; sending real-time listener data including at least a user name and at least one statistic regarding engagement by a respective real-time listener to the user account controlling the broadcast.

Aspect 12. The method of any of Aspects 1 to 11, further comprising: receiving a request to join the live playback stream as a secondary-host, wherein the request to join the live playback stream as the secondary-host includes a token identifying the live playback steam and a rights object issued by either the client device of a primary host of the playback stream or the multi-media platform; initiating a secondary-host live media stream with the secondary host; receiving commentary from the secondary host and transmitting it to the primary host and to the audience member client device.

Aspect 13. The method of any of Aspects 1 to 12, further comprising: receiving an instruction from the primary host to terminate the secondary-host live media stream.

Aspect 14. The method of any of Aspects 1 to 13, wherein the multi-media application is associated with a multi-media platform, the multi-media platform including a plurality of user accounts, the user accounts including general user accounts, and artist account, the method comprising: receiving a user interface input to send a notification announcing a live playback stream; determining whether the user account is one of the verified artist user accounts; sending the notification announcing the live playback stream only to user accounts that follow the user account, and over social media channels linked to the user account.

Aspect 15. The method of any of Aspects 1 to 14, further comprising: providing at least one content for acquisition by a user of the audience member client device, the content for acquisition to be displayed as an actionable link in a user interface at the connecting device; receiving a request from the audience member client device as a result of actuation of the actionable link by the user of the audience member client device; redirecting the audience member client device to a store page of a host of the live playback stream, wherein the store page of the host of the live playback stream includes the at least one content for acquisition.

Aspect 16. The method of any of Aspects 1 to 15, further comprising: receiving from an e-commerce service reporting data indicating that the user of the connecting device acquired the at least one content for acquisition.

Aspect 17. The method of any of Aspects 1 to 16, further comprising: performing natural language processing on the live media stream; detecting a statement in the live media stream informing the user of the audience member client device of a purchase opportunity; providing a link for providing at least one content for acquisition by a user of the audience member client device corresponding to the purchase opportunity, wherein the at least one content for acquisition includes tickets to a live show, a media content, merchandise, etc.

Aspect 18. The method of any of Aspects 1 to 17, further comprising: determining that there are different segments of audience members connected to the live playback stream including the first segment of user accounts and the second segment of user accounts; whereby the different segments of the audience members are connected to different instances of the live performance of the broadcast.

Aspect 19. The method of any of Aspects 1 to 18, further comprising: receiving a communication from one of the audience members connected to the second instance of the live playback stream; broadcasting the received communication all other audience members connected to the second instance of the live playback stream including a broadcaster that is the source of the live playback stream.

Aspect 20. A method of producing a live playback stream by a multi-media application associated with user account of a multi-media platform, the method comprising: presenting a queue of media content and a live playback stream control user interface button in the multi-media application, wherein the queue of media content is a list of audio or video media content to be played; receiving a selection of the live playback stream control user interface button, wherein the live playback stream control user interface button is configured to reversibly switch between a personalized playback mode and a public playback mode; responsive to receiving the selection of the broadcast control user interface button switching from the personalized playback mode to the public playback mode, wherein in the public playback mode the client device controls public playback of media content and is a source of commentary during the live playback stream; sending an instruction to initiate a live playback stream over the Internet to the multi-media platform; initiating at least two streams between the multi-media application and the multi-media platform, wherein one stream is a playback control channel and another stream is a live media stream for transmitting data encoding live commentary, wherein the playback control channel is for transmitting an identification of a least a portion of the media content in the queue of media content and data regarding playback controls pertaining to the media content.

Aspect 21. The method of Aspect 20, further comprising: capturing the commentary by a microphone on the client device executing the multi-media application; transmitting the data encoding live commentary as part of the live media stream.

Aspect 22. The method of any of Aspects 20 to 21, further comprising: transmitting time domain information to map the commentary captured by the microphone to a time-domain associated with a currently playing media content over the playback control channel.

Aspect 23. The method of any of Aspects 20 to 22, further comprising: after receiving the selection of the live playback stream control user interface button switching from the personalized playback mode to the public playback mode; determining that a shuffle option is enabled in the multi-media application; disabling the shuffle option.

Aspect 24. The method of any of Aspects 20 to 23, wherein the queue of media content in the multi-media application is two different queues, the two different queues include a broadcast queue and a personal listening queue, the method further comprising: while playing back media content in the personal listening queue receiving inputs to add media content and transitions to the live playback queue for playback during when the multi-media application is in the public playback mode.

Aspect 25. A method of connecting to a live playback stream provided by a multi-media platform by an audience member client device, wherein the multi-media platform is a source of multi-media content to be played during the live playback stream while a host user device is a source of commentary provided during the live playback stream, the method comprising: initiating at least two streams between the audience member client device and the multi-media platform, wherein one stream is a playback control channel and another stream is a live media stream, wherein the live media stream for transmitting data encoding live commentary, wherein the playback control channel is for transmitting an identification of a least a portion of the media content in a queue of media content and data regarding playback controls pertaining to the media content; determining whether any of the media content in the queue of media content identified using the playback control panel are cached by the audience member client device, wherein when the media content are cached at the client device, the connecting client plays the media content from its cache as instructed by the playback control channel; when the media content are not cached at the client device, requesting the media content from the multi-media platform prior receiving an instruction to play the media content by the playback control channel.

Aspect 26. The method of Aspect 25, further comprising: multiplexing the commentary encoded in the live media stream with a currently playing media content using multi-plexing information and playback state information received over the playback control channel on the audience member client device connected to the live playback stream.

Aspect 27. The method of any of Aspects 25 to 26, further comprising: receiving a link for providing at least one content for acquisition; displaying the content for acquisition as an actionable link in a user interface; receiving a selection of actionable link by the user of the audience member client device; requesting a store page of a host of the live playback stream, wherein the store page of the host of the live playback stream includes the at least one content for acquisition.

Aspect 28. The method of any of Aspects 25 to 27, wherein the store page is hosted by an e-commerce platform.

Aspect 29. A method comprising: hosting a live playback stream over the Internet by transmitting data from a playback control channel and a live media stream to one or more connecting client devices; providing a first audience member engagement experience and a second audience member engagement experience, wherein a first audience member engagement experience provides a first segment of user accounts with limited engagement options, wherein the second audience member engagement experience provides a second segment of user accounts with additional engagement options.

Aspect 30. The method of Aspect 29, wherein the second segment of user accounts are part of a superfan segment that includes superfans of a broadcaster that is the source of the live playback stream, wherein the additional user engagement options include options to send chat messages to the broadcaster, to send voice recordings to the broadcaster, etc.

Aspect 31. The method of any of Aspects 29 to 30, further comprising: collecting information associated with user accounts, the information includes media content preference information, social channel information, and/or purchase information, the media content preference information derived from explicit data provided by user inputs indicating an affinity for an artist or a media content, and implicit data such playback engagement data including skip counts, play counts, and purchases; the social channel information received from one or more social platforms, the social channel information can include friends and follower information, topic engagement, and content engagement, and the purchase information received from one or more payment networks, the payment information indicating spending pertaining to engagement with media content or artists.

Aspect 32. The method of any of Aspects 29 to 31, further comprising: analyzing the information associated with the user accounts to generate the media content preference information including one or representations of an affinity of a user of a user account for a media content.

Aspect 33. The method of any of Aspects 29 to 32, further comprising: determining that a past live playback stream from a user account had a popularity above a threshold; comparing a media content preference of the user account with other user accounts to identify other user accounts with similiar media content preferences; sending the notification announcing the live playback stream to the other user accounts with the similar media content preferences.

Aspect 34. The method of any of Aspects 29 to 33, further comprising: determining that a past live playback stream from a user account had a popularity above a threshold; comparing the media content in the queue of media content with media content preferences of other user accounts to identify other user accounts whose media content preferences indicate that would enjoy joining the live playback stream; sending the notification announcing the live playback stream to the other user accounts whose media content preferences indicate that would enjoy joining the live playback stream.

Aspect 35. The method of any of Aspects 29 to 34, further comprising; analyzing the information associated with the user accounts to generate an artist affinity profile, the artist affinity profile including a score of an affinity for a particular artist for a user of a user account.

Aspect 36. The method of any of Aspects 29 to 35, further comprising: comparing scores in the artist affinity profiles in respective user accounts; determining user accounts from the population of user accounts having the strongest affinity for the particular artist; inviting the user accounts from the population of user accounts having the strongest affinity for the particular artist to an event hosted by the artist.

Aspect 37. The method of any of Aspects 29 to 36, wherein the event hosted by the artist is a live playback stream.

Aspect 38. The method of any of Aspects 29 to 37, further comprising: creating a mailing list for the particular artist from the user accounts from the population of user accounts having the strongest affinity for the particular artist; sharing the mailing list with a user account for the particular artist, wherein the user account for the particular artist is a verified user account, wherein data from the mailing list that identifies the user accounts in the mailing list by an anonymous ID or by a public user name is shared with the particular artist, but contact information and personal identifying information is not shared with the particular artist.

Aspect 39. The method of any of Aspects 29 to 38, further comprising: receiving an input from the verified user account of the artist to send a notification to the mailing list; sending the notification to the user accounts on the mailing list, the notification being sent to the users of the user accounts using a communication channel preference stored with respect to the user account.

Aspect 40. The method of any of Aspects 29 to 39, wherein the notification includes a security token, the method comprising: receiving a request to access the event; determining whether the request includes evidence of the received security token; sending a push notification to a MFA method to provide secondary authentication of the user account prior to allowing the user access to the event.

Aspect 41. The method of any of Aspects 29 to 40, wherein the event hosted by the artist is a live chat or video conference.

Aspect 42. The method of any of Aspects 29 to 41, wherein the event takes place outside of the multi-media platform such as a social media platform, video conferencing platform, chat platform, etc.

Aspect 43. A method of facilitating a live playback stream by a multi-media service, the multi-media platform hosting a plurality of multi-media content, the method comprising: presenting broadcast controls, the broadcast controls including at least an input switching control, a microphone control, a sound effects control, and listener statistics; responsive to receiving a selection of the microphone control, presenting a mixing interface, wherein the mixing interface includes a penannular slider about a microphone toggle, the penannular slider configured to accept an input to drag an indicator about the penannular slider, wherein a first terminal end of the penannular slider is configured to cause a majority of audio to come from a microphone input, and a second terminal end of the penannular slider is configured to cause a majority of audio to come from playback of the media content, and locations between the first terminal end and the second terminal end are configured to multiplex audio from the microphone source and the playback of media content according to respective distances from each of the terminal ends such that the closer the indicator is to the first terminal end the greater the volume from the microphone source compared to the playback of media content, and the closer the indicator is to the second terminal end the greater the volume from the playback of media content compared to the microphone source.

Aspect 44. The method of Aspect 43, further comprising: receiving a selection of the sound effects control; responsive to the selection of the sound effects control, presenting sampling options; receiving a selection of a sampling option from one of the sampling options; automatically mixing the sample into a currently playing media content.

Aspect 45. The method of any of Aspects 43 to 44, further comprising: receiving a selection of the sound effects control; responsive to the selection of the sound effects control, presenting crossfade options; receiving a selection of a crossfade option from one of the crossfade options to become an active crossfade option; at a transition from a currently playing media content to a subsequent media content automatically applying the active crossfade option to transition from the end of the currently playing media content to the beginning of the subsequent media content.

Aspect 46. The method of any of Aspects 43 to 45, further comprising: responsive to receiving a selection of the input switching control, presenting at least one option for an available input other than the microphone and media content playback; receiving the selection of the available input other than the microphone and media content playback; presenting the mixing interface wherein one of the terminal ends of the penannular slider represents the selected available input other than the microphone and media content playback.

Aspect 47. A method for valuing at least a sample of a media content to be valued, the method comprising: evaluating market data pertaining to the media content, wherein the market data includes a list price and historical sales volume for the media content; evaluating at least one market trend pertaining to similar media content to the media content to be valued, wherein the at least one market trend is charts data, critical review scores, and social media interaction with the similar media content; and based on the market data and the evaluation of the at least one market trend, determining a spot price for the media content to be valued.

Aspect 48. The method of Aspect 47, wherein the determining a spot price for the media content to be valued is performed by a machine learning algorithm receiving the market data and the at least one market trend.

Aspect 49. The method of any of Aspects 47 to 49, further comprising: identifying possible samples of the media content to be valued; and for at least one of the possible samples, valuing the spot price of the possible sample using market data for at least one similar sample previously licensed, wherein a similar sample is a sample of a media content having similar characteristics or belonging to a similar genre, or having a similar popularity.

Aspect 50. The method of any of Aspects 47 to 50, wherein the determining the spot price for the media content to be valued is further based on the spot price of the at least one possible sample of the media content.

Aspect 51. The method of any of Aspects 47 to 51, wherein there are different spot prices associated with rights for acquiring a copy of a media content for personal playback, licensing a media content for public playback, licensing the media content for use of a sample of the media content in another media content, acquiring an assignment of a copyright to control the media content.

Aspect 52. A method for managing at least a portion of a media content using an NFT and an associated smart contract, the method comprising: creating an NFT referencing ownership of a right associated with at least a portion of the media content, the NFT having an associated smart contract; storing the NFT on a blockchain network.

Aspect 53. The method of Aspect 52, wherein the smart contract references one or more conditions for acquiring an assignment of the copyright to control the media content.

Aspect 54. The method of any of Aspects 52 to 53, wherein at least one condition is an agreement to pay a spot price for the value of the assignment.

Aspect 55. The method of any of Aspects 52 to 54, wherein the smart contract references one or more conditions for acquiring a copy of a media content for personal playback.

Aspect 56. The method of any of Aspects 52 to 55, wherein the smart contract references one or more conditions for licensing a media content for public playback.

Aspect 57. The method of any of Aspects 52 to 56, wherein the smart contract references one or more conditions for licensing the media content for use of a sample of the media content in another media content.

Aspect 58. The method of any of Aspects 52 to 57, transferring a right associated with at least a portion of a media content that is defined by the smart contract when the conditions of the smart contract have been satisfied.

Aspect 59. A method of of facilitating a live playback stream by a multi-media platform, the multi-media platform hosting a plurality of recorded media content, wherein during the live playback stream a client device of the host controls public playback of media content and is a source of commentary, the method comprising: presenting a queue of media content and a live playback stream control user interface button in the multi-media application, wherein the queue of media content is a list of audio or video media content to be played; receiving a selection of the live playback stream control user interface button, wherein the live playback stream control user interface button is configured to reversibly switch between a personalized playback mode and a public playback mode; responsive to receiving the selection of the broadcast control user interface button switching from the personalized playback mode to the public playback mode, wherein in the public playback mode the client device controls public playback of media content and is a source of commentary during the live playback stream; sending an instruction to initiate a live playback stream over the Internet to the multi-media platform; receiving data identifying recorded media content in at least a portion of an up next queue from the client device of the host, the up next queue including at least one of the plurality of the recorded media content planned for playback during the live playback stream; receiving the instruction to initiate the live playback stream over the Internet; initiating at least two streams between the client device of the host and the multi-media platform, wherein one stream is a playback control channel and another stream is a live media stream; receiving data over the playback control channel including data regarding playback controls pertaining to playback of the recorded media content in the at least the portion of the up next queue; receiving the data encoding the live commentary over the live media stream; and hosting the live playback stream over the Internet by transmitting data from the playback control channel and the live media stream to one or more connecting client devices; determining whether any of the media content in the queue of media content identified using the playback control panel are cached by the audience member client device, wherein when the media content are cached at the client device, the connecting client plays the media content from its cache as instructed by the playback control channel; when the media content are not cached at the client device, requesting the media content from the multi-media platform prior receiving an instruction to play the media content by the playback control channel; multiplexing the commentary encoded in the live media stream with a currently playing media content using multiplexing information and playback state information received over the playback control channel on the audience member client device connected to the live playback stream.

Aspect 60. A method of recommending an item to purchase associated with media content, the method comprising: storing metadata associated with items of media content, the metadata comprising one or more analytical and descriptive data describing at least one of a tempo, genre, or mood of the media content, user information and artist information; during playback of a media stream which includes a selection of the media content, from the media server to a media device, evaluating in real time/near real time during a period of play, at least one of: the metadata associated with the particular items of media content that are being provided in the media stream to the media device, or a context associated with the media device or the user thereof; using an evaluation of the at least one of the metadata or context, recommending an associated item to purchase; and sending a link to allow purchase.

Aspect 61. A method, implemented at least in part by a server computing device of a service provider, the method comprising: receiving, from a computing device of a first customer, a first communication for a financial offer for generating media content via a first communication channel; determining context data associated with the first communication, wherein context data includes data related to usage of media content; receiving, by a payment processing system, from a plurality of customers, information of revenue and/or rights associated with other media content, wherein other media content is comparable to the media content; generating, using one or more trained machine learning classifiers, a request to a plurality of financial systems, the one or more trained machine learning classifiers having been trained based on at least a portion of the information received from the plurality of artists; exposing an application programming interface (API) of one or more APIs to at least one financial system of the plurality of financial systems for electronic communication of financial information at least one of to or from the at least one financial system; and generating, using the one or more trained machine learning classifiers and based at least on information obtained from the at least one financial system, context data, and/or information of the media content, user interface including the offer for the financing, wherein the offer specifies terms for the financing and the particular amount of the financing determined based at least in part on an evaluation of an amount collected by the first customer from usage of the media content by others, and wherein repayment terms include a portion of revenue as a result of the usage of the media content; sending, by the computing device to the payment processing system, an indication of an acceptance of the offer for the financing received via the user interface; and receiving, to the first customer device, an indication that a financed amount has been provided to an account associated with the first customer.

Aspect 62. A computer implemented method comprising: determining whether to assign a value to one or more portions of a media content; determining a total value of non-fungible tokens for the media content based on the assignment to the one or more portion of the song/track; determining a digital right to associate to each of the non-fungible tokens; entering the value of non-fungible tokens using a user interface associated with a user that provides access to a distributed ledger network; generating non-fungible tokens on distributed ledger network and storing ownership of the non-fungible tokens in a database; and executing a smart contract that assigns the ownership of non-fungible tokens and/or assignment of digital rights when at least one of the following occurs: a user subscribes to the media content; the user rents the media content; the user downloads the media content; or the user purchases the media content.

Aspect 63. A computer implemented method comprising: receiving a request from a second user to subscribe to a media content stream of a first user; synchronizing broadcast of the media content stream to the second user's device such that the media content stream is at the same instance as the instance where the first user is; and enabling provisional communication between the first user and the second user.

Aspect 64. The method of aspect 63, wherein the provisional communication enables the second user to control the media content stream and modify the media content stream.

Aspect 65. The method of anyone of aspects 63-64 wherein the provisional communication enables the first user and the second user to engage in transactions, including one of merchandise sales, media content sales, media content feedback, media content NFT purchases, incentives, rewards, ticket sales, payment transactions, tipping transaction, and media content playlist generation.

Aspect 66. The method of aspects 63-65, where the request is in response to an initial request generated by the first user on a music service platform, a third party platform, or a social networking platform, and wherein a device associated with the first user visually displays status of the second user and other users in terms of their engagement with the media content of the first user, and wherein a heat map indicates strength of their engagement.

What is claimed is:

1. A method comprising:
   determining a first segment of user accounts on a media platform based on a first engagement amount with an artist;
   determining a second segment of user accounts on the media platform based on a second engagement amount with the artist;
   providing media content on the media platform to the first segment of user accounts and the second segment of user accounts, wherein the first segment of user accounts has first engagement options with the media content, wherein the first engagement options include a control that, when selected, causes a first connection to a playback stream accessible by the first segment of user accounts and the second segment of user accounts, and the second segment of user accounts has the first engagement options and additional engagement options;
   monitoring engagement of a user account included in the first segment of user accounts with the media content;
   based on the engagement of the user account, transferring the user account from the first segment of user accounts to the second segment of user accounts and providing the additional engagement options to the user account, wherein the additional engagement options include a second connection to a communication channel with the artist, wherein the second connection to the communication channel permits the user account included in the second segment of user accounts to provide a communication to the artist;
   receiving the communication from the user account included in the second segment of user accounts over the communication channel with the artist; and
   surfacing the received communication to the first segment of user accounts and the second segment of user accounts.

2. The method of claim 1, wherein the second segment of user accounts is part of a top fan segment that includes top fans of the artist, wherein the artist initiated the playback stream, wherein the additional user engagement options include a first option to send a chat message to the artist or a second option to send a voice recording to the artist.

3. The method of claim 1, further comprising:
collecting engagement information associated with the engagement of the user account, the engagement information comprising media item preference information,
the media item preference information derived from explicit data provided by user inputs indicating an affinity for the artist or a media item by the artist, and implicit data including one or more of skip counts, play counts, and purchases;
wherein the transferring the user account from the first segment of user accounts to the second segment of user accounts is based on the engagement information.

4. The method of claim 3, further comprising:
analyzing the engagement information associated with the engagement of the user account with the artist to determine a first score associated with the affinity for the artist by the user account;
comparing the first score associated with the affinity for the artist by the user account with scores for other user accounts in the first segment of user accounts where the scores for the other users represent a respective affinity for the artist by the other user accounts;
determining that the first score is higher than the scores for a determined portion of the other user accounts, wherein the transferring the user account from the first segment of user accounts to the second segment of user accounts is further based on the first score being higher than the scores for the determined portion of the other user accounts; and
inviting the second segment of user accounts to an event hosted by the artist, wherein the event hosted by the artist is one of the additional engagement options.

5. The method of claim 1, further comprising:
creating a mailing list for the artist from the second segment of user accounts;
determining that an artist account for the artist on the media platform is a verified user account;
based on determining that the artist account is the verified user account, sharing the mailing list with the artist account, wherein data from the mailing list identifies user accounts in the mailing list by an anonymous identifier (ID) or by a public user name on the media platform.

6. The method of claim 4, wherein the invitation to the event includes a security token, the method further comprising:
receiving a request to access the event from the user account at a time that the user account is included in the second segment of user accounts;
determining that the request includes evidence of the security token;
sending a notification to a multi-factor authentication ("MFA") service to provide secondary authentication of the user account; and
granting entry to the event based on a presence of the security token and receipt of a confirmation of the secondary authentication from the MFA service.

7. The method of claim 1, wherein the monitoring the engagement of the user account comprises:
collecting engagement information associated with the engagement of the user account, the engagement information comprising social channel information received from a social platform, the social channel information including one or more of friends information, follower information, topic engagement, and content engagement.

8. The method of claim 1, wherein the monitoring the engagement of the user account comprises:
collecting engagement information associated with the engagement of the user account, the engagement information comprising purchase information received from a payment network, the purchase information indicating a purchase of one or more of media items or merchandise.

9. A computing system comprising:
a processor; and
a memory coupled to the processor and storing instructions that, when executed by the processor, configure the system to:
determine a first segment of user accounts on a media platform based on a first engagement amount with an artist;
determine a second segment of user accounts on the media platform based on a second engagement amount with the artist;
provide media content on the media platform to the first segment of user accounts and the second segment of user accounts, wherein the first segment of user accounts has first engagement options with the media content and the second segment of user accounts has the first engagement options and additional engagement options;
monitor engagement of a user account included in the first segment of user accounts with the media content;
based on the engagement of the user account, transfer the user account from the first segment of user accounts to the second segment of user accounts and provide the additional engagement options to the user account;
analyze engagement information associated with the engagement of the user account to determine a first score associated with an affinity for the artist by the user account;
compare the first score associated with the affinity for the artist by the user account with scores for other user accounts in the first segment of user accounts where the scores for the other users represent a respective affinity for the artist by the other user accounts;
determine that the first score is higher than the scores for a determined portion of the other user accounts, wherein the transferring the user account from the first segment of user accounts to the second segment of user accounts is based on the first score being higher than the scores for the determined portion of the other user accounts; and
invite the second segment of user accounts to an event hosted by the artist, wherein the event hosted by the artist is one of the additional engagement options.

10. The computing system of claim 9, wherein monitoring the engagement of the user account comprises:
collect the engagement information associated with the engagement of the user account, the engagement information comprising media item preference information, the media item preference information derived from explicit data provided by user inputs indicating an affinity for the artist or a media item by the artist, and implicit data including one or more of skip counts, play counts, and purchases.

11. The computing system of claim 9, wherein the invitation to the event includes a security token, and wherein the instructions further configure the system to:

receive a request to access the event from the user account at a time that the user account is included in the second segment of user accounts;

determine that the request includes evidence of the security token;

send a notification to a multi-factor authentication ("MFA") service to provide secondary authentication of the user account; and grant entry to the event based on a presence of the security token and receipt of a confirmation of the secondary authentication from the MFA service.

12. The computing system of claim 9, wherein monitoring the engagement of the user account comprises:

collect the engagement information associated with the engagement of the user account, the engagement information comprising social channel information received from a social platform, the social channel information including one or more of friends information, follower information, topic engagement, and content engagement.

13. The computing system of claim 9, wherein monitoring the engagement of the user account comprises:

collect the engagement information associated with the engagement of the user account with the artist, the engagement information comprising purchase information received from a payment network, the purchase information indicating a purchase of one or more of media items or merchandise.

14. A non-transitory computer-readable storage medium, the computer-readable storage medium including instructions that when executed by a computer, cause the computer to:

determine a first segment of user accounts on a media platform based on a first engagement amount with an artist;

determine a second segment of user accounts on the media platform based on a second engagement amount with the artist;

provide media content on the media platform to the first segment of user accounts and the second segment of user accounts, wherein the first segment of user accounts has first engagement options with the media content and the second segment of user accounts has the first engagement options and additional engagement options;

monitor engagement of a user account included in the first segment of user accounts with the media content;

based on the engagement of the user account, transfer the user account from the first segment of user accounts to the second segment of user accounts and provide the additional engagement options to the user account;

analyze engagement information associated with the engagement of the user account to determine a first score associated with an affinity for the artist by the user account;

compare the first score associated with the affinity for the artist by the user account with scores for other user accounts in the first segment of user accounts where the scores for the other users represent a respective affinity for the artist by the other user accounts;

determine that the first score is higher than the scores for a determined portion of the other user accounts, wherein the transferring the user account from the first segment of user accounts to the second segment of user accounts is based on the first score being higher than the scores for the determined portion of the other user accounts; and invite the second segment of user accounts to an event hosted by the artist, wherein the event hosted by the artist is one of the additional engagement options.

15. The computer-readable storage medium of claim 14, wherein monitoring the engagement of the user account comprises:

collect the engagement information associated with the engagement of the user account with the artist, the engagement information comprising media item preference information, the media item preference information derived from explicit data provided by user inputs indicating an affinity for the artist or a media item by the artist, and implicit data including one or more of skip counts, play counts, and purchases.

16. The computer-readable storage medium of claim 14, wherein monitoring the engagement of the user account comprises:

collect the engagement information associated with the engagement of the user account with the artist, the engagement information comprising social channel information received from a social platform, the social channel information including one or more of friends information, follower information, topic engagement, and content engagement.

17. The computer-readable storage medium of claim 14, wherein monitoring the engagement of the user account comprises:

collect the engagement information associated with the engagement of the user account with the artist, the engagement information comprising purchase information received from a payment network, the purchase information indicating a purchase of one or more of media items or merchandise.

\* \* \* \* \*